US012370805B2

(12) United States Patent
Kawakita et al.

(10) Patent No.: US 12,370,805 B2
(45) Date of Patent: Jul. 29, 2025

(54) LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

(71) Applicant: BROTHER KOGYO KABUSHIKI KAISHA, Nagoya (JP)

(72) Inventors: Akihiro Kawakita, Nagoya (JP); Hisaaki Yoshimoto, Nukata (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 183 days.

(21) Appl. No.: 18/080,303

(22) Filed: Dec. 13, 2022

(65) Prior Publication Data

US 2023/0182479 A1 Jun. 15, 2023

(30) Foreign Application Priority Data

Dec. 13, 2021 (JP) ................................. 2021-201759

(51) Int. Cl.
*B41J 2/175* (2006.01)
*B41J 2/18* (2006.01)

(52) U.S. Cl.
CPC ....... *B41J 2/17596* (2013.01); *B41J 2/17566* (2013.01); *B41J 2/18* (2013.01)

(58) Field of Classification Search
CPC ....... B41J 2/17566; B41J 2/17596; B41J 2/18
See application file for complete search history.

(56) References Cited

U.S. PATENT DOCUMENTS

| | | | | |
|---|---|---|---|---|
| 9,365,046 | B2 | 6/2016 | Sugitani et al. | |
| 2010/0295905 | A1 | 11/2010 | Tamaki | |
| 2019/0193408 | A1 | 6/2019 | Kuno | |
| 2019/0299626 | A1 | 10/2019 | Shimizu | |
| 2019/0358961 | A1 | 11/2019 | Nishida | |
| 2020/0108624 | A1 * | 4/2020 | Takahashi | B41J 2/17566 |
| 2022/0212476 | A1 | 7/2022 | Nishida et al. | |

FOREIGN PATENT DOCUMENTS

| | | | | |
|---|---|---|---|---|
| EP | 3199356 | A1 | 8/2017 | |
| JP | 2004314392 | A * | 11/2004 | |
| JP | 2021160282 | A | 10/2021 | |
| WO | WO-2015190200 | A1 * | 12/2015 | B01D 19/00 |

OTHER PUBLICATIONS

Extended European Search Report issued in related European Patent Application No. 22212560.1, dated May 8, 2023. (9 pages.).

* cited by examiner

*Primary Examiner* — Geoffrey S Mruk
(74) *Attorney, Agent, or Firm* — K&L Gates LLP

(57) ABSTRACT

A liquid supply system includes one or a plurality of tubes, a liquid delivery mechanism, and a processor. The one or plurality of tubes is connected to a tank. The tank is configured to store the liquid and is provided further upstream than the printer. The liquid delivery mechanism is provided in the one or plurality of tubes and configured to switch between a liquid delivery state and a stopped state. The processor performs liquid delivery processing of controlling the liquid delivery mechanism to be in the liquid delivery state and the stopped state based on a remaining amount indicated by a signal from a sensor. The sensor is configured to detect the remaining amount of the liquid inside the tank or inside the printer.

9 Claims, 31 Drawing Sheets

LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

REFERENCE TO RELATED APPLICATIONS

This application claims priority from Japanese Patent Application No. 2021-201759 filed on Dec. 13, 2021. The entire content of the priority application is incorporated herein by reference.

BACKGROUND ART

The present disclosure relates to a liquid supply system, a control method, a non-transitory computer-readable medium storing computer-readable instructions, and a liquid supply device.

A liquid supply system is provided with a tank. The tank houses a liquid, and a tube is connected. In the liquid supply system, the liquid flows between the tank and a printer via the tube by driving a delivery mechanism by a predetermined amount.

DESCRIPTION

In the above-described liquid supply system, if the liquid attaches to the inside of the tank tube, for example, an inner diameter of the tube varies. In this way, in the above-described liquid supply system, there is a case in which a flow path resistance changes due to variations in a flow path configuration of the inner diameter, the whole length, and the like of the tube. In this case, since the delivery mechanism is driven by the predetermined amount in the above-described liquid supply system, there is a possibility that a liquid delivery amount between the tank and the printer may fluctuate.

Embodiments of the broad principles derived herein provide a liquid supply system, a control method, a non-transitory computer-readable medium storing computer-readable instructions, and a liquid supply device capable of suppressing a liquid delivery amount between a tank and a printer from fluctuating.

A first aspect of the present disclosure relates to a liquid supply system supplying a liquid to a printer. The liquid supply system includes one or a plurality of tubes configuring a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid supply system includes a liquid delivery mechanism being a mechanism provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes. The liquid supply system includes a processor and a memory storing computer-readable instructions that, when executed by the processor, cause the processor to perform a process. The process includes liquid delivery processing of controlling the liquid delivery mechanism to be in the liquid delivery state and the stopped state based on a remaining amount indicated by a signal from a sensor. The sensor is configured to detect the remaining amount of the liquid inside the tank or inside the printer.

According to the first aspect, in the liquid delivery processing, the processor controls the liquid delivery mechanism to be in the liquid delivery state and the stopped state based on the remaining amount of the liquid inside the tank or inside the printer. In this way, the processor can control a liquid delivery amount between the tank and the printer based on the remaining amount inside the tank or inside the printer. Thus, the liquid supply system can suppress the liquid delivery amount between the tank and the printer from fluctuating.

A second aspect of the present disclosure relates to a control method by a liquid supply system supplying a liquid to a printer. The liquid supply system includes one or a plurality of tubes configuring a supply flow path of the liquid to the printer. The liquid supply system includes the one or plurality of tubes being connected to a tank configured to store the liquid. The tank is provided further upstream than the printer in the supply flow path. The liquid flows through the one or plurality of tubes between the tank and the printer. The liquid supply system includes a liquid delivery mechanism being a mechanism provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes. the control method includes liquid delivery processing of controlling the liquid delivery mechanism to be in the liquid delivery state and the stopped state based on a remaining amount indicated by a signal from a sensor. The sensor is configured to detect the remaining amount of the liquid inside the tank or inside the printer.

The second aspect can achieve the same effects as those of the first aspect.

A third aspect of the present disclosure relates to a non-transitory computer-readable medium storing computer-readable instructions executed by a computer of a liquid supply system supplying a liquid to a printer. The liquid supply system includes one or a plurality of tubes configuring a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid supply system includes a liquid delivery mechanism being a mechanism provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes. The instructions, when executed by the computer, cause the computer to perform a process. The process includes liquid delivery processing of controlling the liquid delivery mechanism to be in the liquid delivery state and the stopped state based on a remaining amount indicated by a signal from a sensor. The sensor is configured to detect the remaining amount of the liquid inside the tank or inside the printer.

The third aspect can achieve the same effects as those of the first aspect.

A fourth aspect of the present disclosure relates to a liquid supply device supplying a liquid to a printer. The liquid supply device includes one or a plurality of tubes configuring a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid supply device includes a liquid delivery mechanism being a mechanism provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes. The liquid supply device includes a processor and a memory storing computer-readable instructions that, when executed by the processor, cause the processor to perform a process. The process includes liquid delivery processing of controlling the liquid delivery mechanism to be in the liquid delivery state and the stopped state based on a remaining amount indicated by a signal from a sensor. The sensor is configured to detect the remaining amount of the liquid inside the tank or inside the printer.

The fourth aspect can achieve the same effects as those of the first aspect.

<Overall Configuration of Liquid Supply System 100>

Figure 1:
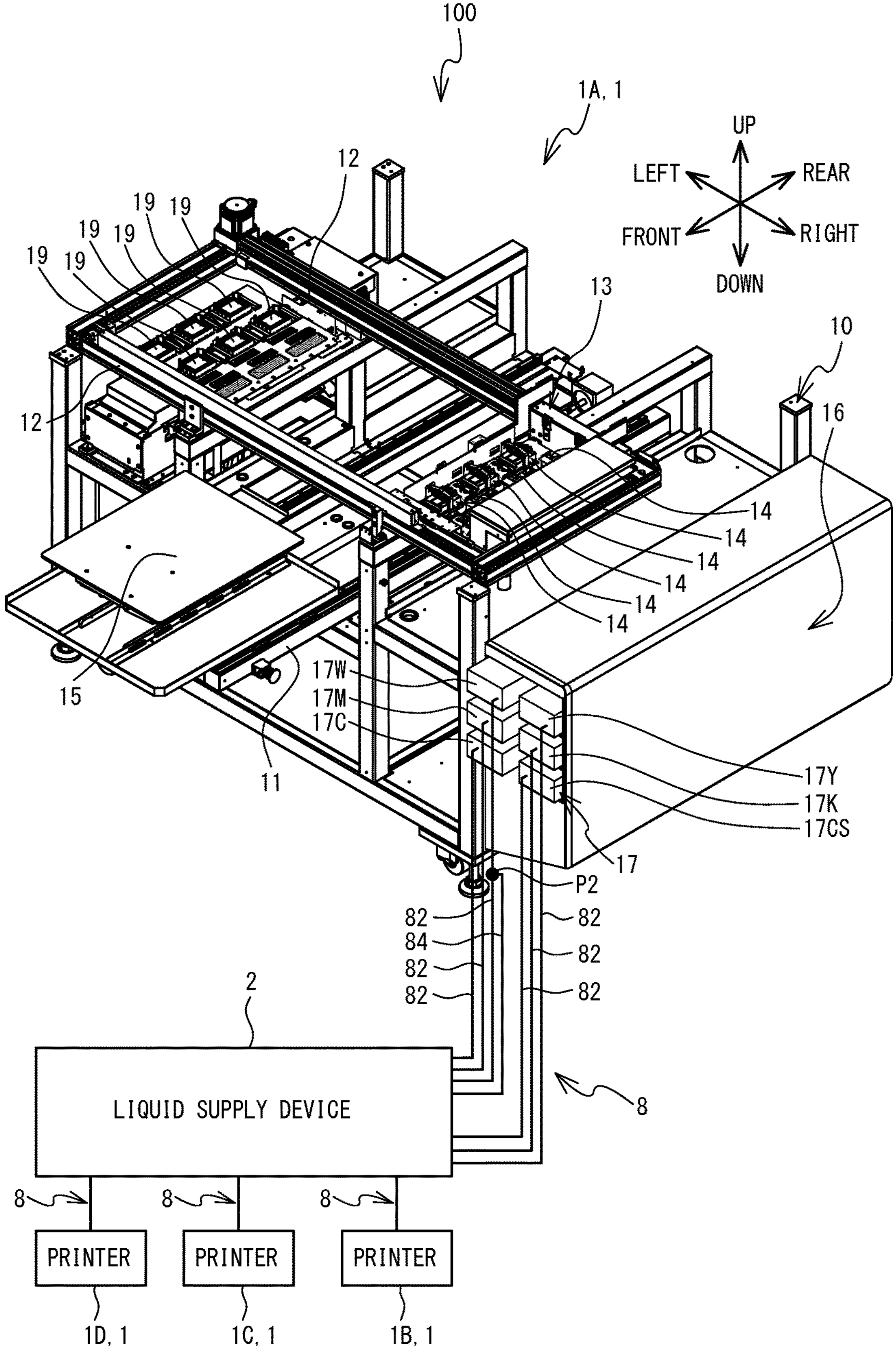
FIG. 1 is an overall view of a liquid supply system.

A liquid supply system 100 according to an embodiment of the present disclosure will be described with reference to the appended drawings. In the present embodiment, mechanical elements in the drawings show an actual scale in each of the drawings. As shown in FIG. 1, the liquid supply system 100 includes a plurality of printers 1, and a liquid supply device 2. The liquid supply system 100 supplies an ink or a pretreatment agent, for example, as a liquid, to each of the plurality of printers 1, from the liquid supply device 2.

A number of the plurality of printers 1 is not limited to a particular number, and, for example, four printers 1A, 1B, 1C, and 1D are connected to the single liquid supply device 2, using tubes 8. The printer 1 is an inkjet printer, for example, and performs printing by ejecting the ink onto a print medium (not shown in the drawings). The print medium is a cloth, paper, or the like, and is a T-shirt, for example.

The ink is, for example, white (W), black (K), yellow (Y), cyan (C), or magenta (M). Hereinafter, of the five colors of the ink, the white color ink will be referred to as “white ink,”

and when the four colors of the black, cyan, yellow and magenta inks are collectively referred to, or when one of the inks is not particularly specified, they will be referred to as "color inks."

The white ink is used in printing as a portion representing white in an image, or as a base for the color inks. The color inks are ejected directly onto the print medium, or onto the base created using the white ink, and are used in printing of a color image.

The pretreatment agent is, for example, an aqueous solution containing a cationic polymer and a multivalent metal salt. The pretreatment agent is a base coat agent, for example, and is applied to the print medium before the printing using the color inks or the white ink. The pretreatment agent improves fixing of the ink to the print medium, or improves color development of the inks.

<Mechanical Configuration of Printer 1>

Hereinafter, the upper left direction, the lower right direction, the lower left direction, the upper right direction, the upper direction, and the lower direction in FIG. 1 are, respectively, a left direction, a right direction, a front direction, a rear direction, an upper direction, and a lower direction of the printer 1.

As shown in FIG. 1, the printer 1 is provided with a frame body 10, a conveyor 11, a platen 15, a pair of guide rails 12, a carriage 13, a plurality of heads 14, a plurality of caps 19, and a housing 16. The frame body 10 is configured in a lattice shape by a plurality of shafts, and is fixed inside a cabinet (not shown in the drawings). The conveyor 11 is fixed to a lower portion of the frame body 10, and includes a shaft extending in the front-rear direction, for example.

The platen 15 is positioned above the conveyor 11, and is supported by the conveyor 11. The platen 15 is plate shaped, and extends in the front-rear direction and the left-right direction. The print medium (not shown in the drawings) is placed on the upper surface of the platen 15. The platen 15 is driven by a sub-scanning motor 182 shown in FIG. 11, and is conveyed in the front-rear direction along the conveyor 11. Thus, in the present embodiment, the front-rear direction of the printer 1 is a sub-scanning direction.

The pair of guide rails 12 are respectively fixed to the upper portion of the frame body 10, with an interval between therebetween in the front-rear direction, and each extends in the left-right direction. The carriage 13 is positioned between the pair of guide rails 12 in the front-rear direction, and is supported by the pair of guide rails 12. The carriage 13 is plate shaped, and extends in the front-rear direction and the left-right direction. The plurality of heads 14 are mounted to the carriage 13. A number of the plurality of heads 14 is not limited to a particular number, and there are six of the heads 14, for example.

The head 14 has a cuboid shape. A nozzle surface (not shown in the drawings) is provided on the lower surface of the head 14. The nozzle surface is positioned higher than the platen 15, and is exposed downward from the carriage 13. The head 14 is driven by a head driver 183 shown in FIG. 11, and ejects the ink or the pretreatment agent from the nozzle surface. The head driver 183 is configured by piezoelectric elements or by heater elements, for example. The plurality of heads 14 include the heads 14 for ejecting the white ink, the heads 14 for ejecting the color ink, and the heads 14 for ejecting the pretreatment agent, for example.

Figure 3:
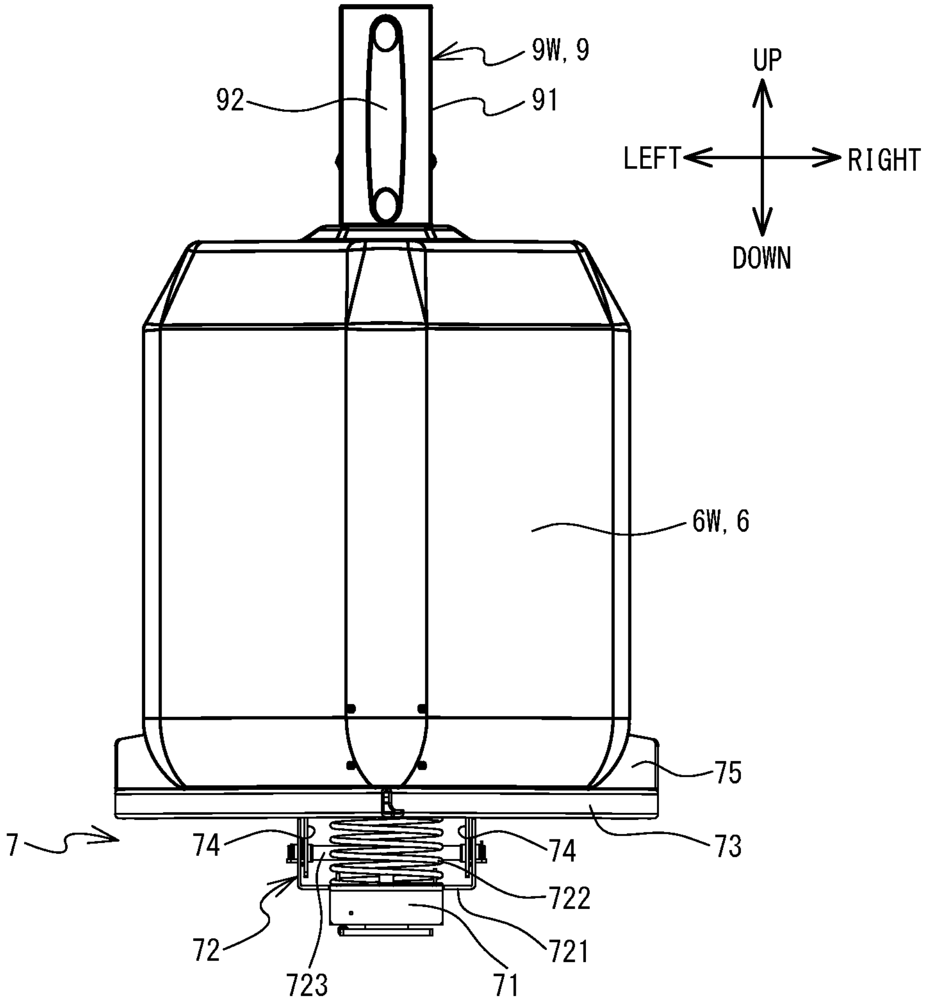
FIG. 3 is a front view of a placement unit and a server tank.

As a result of the carriage 13 being driven by a main scanning motor 181 shown in FIG. 3, the carriage 13 is conveyed in the left-right direction along the pair of guide rails 12. In this way, the heads 14 are also conveyed in the left-right direction. Thus, in the present embodiment, the left-right direction of the printer 1 is a main scanning direction.

The plurality of caps 19 are provided to the left of a movement path of the platen 15 and below a movement path of the plurality of heads 14. A number of the plurality of caps 19 is not limited to a particular number, and is six, for example, which is the same number as the plurality of heads 14. The plurality of caps 19 are disposed at positions corresponding to arrangement positions of the plurality of heads 14.

As a result of the plurality of caps 19 moving upward in a state in which the plurality of heads 14 are positioned above the plurality of caps 19, the caps 19 respectively closely adhere to the nozzle surfaces of the corresponding heads 14. As a result of the plurality of caps 19 moving downward, the caps 19 respectively separate from the nozzle surfaces of the corresponding heads 14.

The housing 16 is fixed to a right portion of the frame body 10. A plurality of main tanks 17 are housed inside the housing 16. A number of the main tanks 17 is not limited to a particular number, and there are six main tanks 17W, 17M, 17C, 17Y, 17K, and 17CS, for example. The main tank 17 may be configured by a cartridge.

The plurality of main tanks 17 respectively receive the supply of the liquid from the liquid supply device 2, and store the supplied liquid. For example, the main tanks 17W, 17M, 17C, 17Y, 17K, and 17CS respectively receive the supply of the white (W) ink, the magenta (M) ink, the cyan (C) ink, the yellow (Y) ink, and the black (K) ink, and the pretreatment agent from the liquid supply device 2.

The plurality of main tanks 17 are respectively connected to one or a plurality of the plurality of heads 14, via sub pouches (not shown in the drawings). As a result of the driving of a supply mechanism 184 shown in FIG. 11, the printer 1 supplies the inks or the pretreatment agent from each of the plurality of main tanks 17 to the plurality of heads 14, via the sub pouches. The supply mechanism 184 is configured by one or both of a pump and a valve, and is provided in each of flow paths between the main tanks 17 and the heads 14.

For example, the printer 1 supplies the white ink from the main tank 17W, via the sub pouch, to the heads 14, of the plurality of heads 14, for ejecting the white ink. The printer 1 supplies the color inks from the main tanks 17M, 17C, 17Y, and 17K, via the sub pouches, to the heads 14, of the plurality of heads 14, for ejecting the color inks. The printer 1 supplies the pretreatment agent from the main tank 17CS, via the sub pouch, to the heads 14, of the plurality of heads 14, for ejecting the pretreatment agent.

In the above-described configuration, the printer 1 performs pretreatment processing before printing processing, for example. For example, in the pretreatment processing, the printer 1 causes the carriage 13 to reciprocate in the left-right direction by the driving of the main scanning motor 181 shown in FIG. 11, while causing the platen 15 to move in the front-rear direction by the driving of the sub-scanning motor 182 shown in FIG. 11. The heads 14 eject the pretreatment agent supplied from the main tank 17CS, while moving in the left-right direction.

After the pretreatment processing, the printer 1 prints a print image on the print medium by the print processing. For example, in the print processing, the printer 1 causes the carriage 13 to reciprocate in the left-right direction by the driving of the main scanning motor 181 shown in FIG. 11, while causing the platen 15 to move in the front-rear direction by the driving of the sub-scanning motor 182 shown in FIG. 11. The heads 14 eject the inks supplied from the main tanks 17W, 17M, 17C, 17Y, and 17K, while moving in the left-right direction. In this way, the print image is printed on the print medium.

<Mechanical Configuration of Liquid Supply Device 2>

Figure 2:
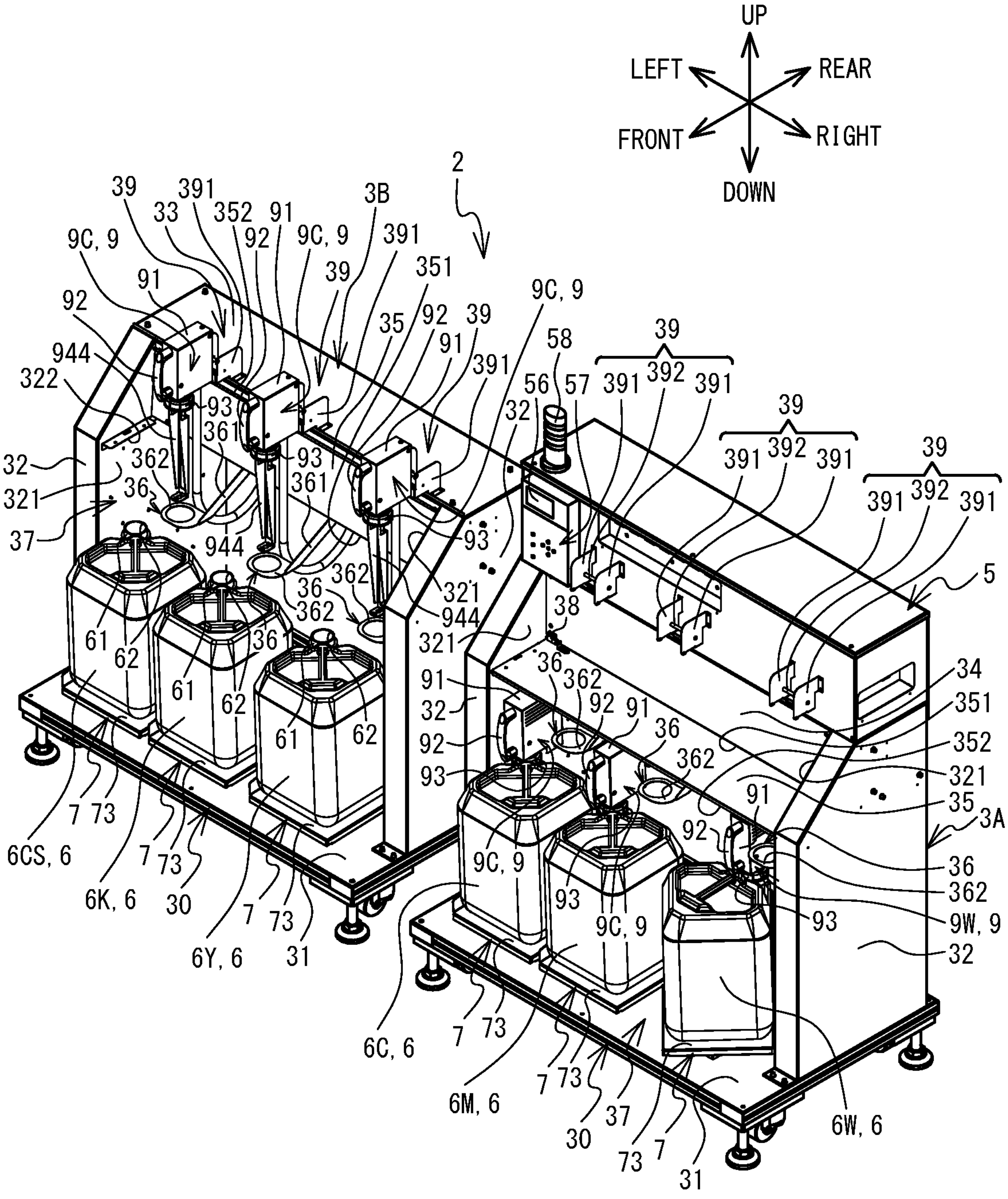
FIG. 2 is a perspective view of a liquid supply device.

Hereinafter, the upper left direction, the lower right direction, the lower left direction, the upper right direction, the upper direction, and the lower direction in FIG. 2 are, respectively, a left direction, a right direction, a front direction, a rear direction, an upper direction, and a lower direction of the liquid supply device 2. The left-right direction and the front-rear direction of the liquid supply device 2 may be respectively aligned with, or may intersect, the left-right direction and the front-rear direction of the printer 1.

The liquid supply device 2 is provided with a main unit 3A and a sub-unit 3B. In the present embodiment, the main unit 3A and the sub-unit 3B differ from each other in the presence or absence of a control box 5 to be described later, a type of the liquid stored in a server tank 6 to be described later, and a configuration of a mount mechanism 9W to be described later. Hereinafter, the structure of the main unit 3A will be described in detail, and where, of the configuration of the sub-unit 3B, the configuration is the same as that of the main unit 3A, the same reference signs will be assigned as for the main unit 3A, and the description thereof will be omitted or simplified.

The main unit 3A includes a placement base 30, the control box 5, a plurality of placement units 7, a plurality of the server tanks 6, and a plurality of the mount mechanisms 9. The placement base 30 includes a bottom plate 31, a pair of pillars 32, a top plate 33 (refer to the sub-unit 3B), a fixed plate 34, and a movable plate 35. The bottom plate 31 is positioned at a lower portion of the placement base 30, and extends in the front-rear direction and the left-right direction. The pair of pillars 32 extend upward from a left end a right end, respectively, of the bottom plate 31.

Hereinafter, a space enclosed by the bottom plate 31 and the pair of pillars 32 will be referred to as a "placement space 37". The top plate 33 (refer to the sub-unit 3B), extends in the left-right direction between the respective upper ends of the pair of pillars 32. The front end of the top plate 33 is positioned at a central portion of the placement space 37, in the front-rear direction.

The fixed plate 34 and the movable plate 35 are respectively provided at an upper portion of the placement space 37. The fixed plate 34 extends in the left-right direction between the pair of pillars 32, and extends downward from the front end of the top plate 33 (refer to the sub-unit 3B). The fixed plate 34 is fixed to the top plate 33.

A first end 351 of the movable plate 35 extends in the left-right direction, and is coupled to the lower end of the fixed plate 34 via a hinge (not shown in the drawings). The movable plate 35 moves between an open position and a closed position as a result of rotating around the first end 351 as an axis. Note that FIG. 2 shows a state in which the movable plate 35 of the sub-unit 3B is positioned at the open position, and shows a state in which the movable plate 35 of the main unit 3A is positioned at the closed position.

When the movable plate 35 is positioned at the open position (refer to the sub-unit 3B), the movable plate 35 extends in the up-down direction and the left-right direction, and a second end 352 of the movable plate 35 is positioned higher than the first end 351 of the movable plate 35. In this case, of the placement space 37, a portion further to the front than the top plate 33 is open upward.

When the movable plate 35 is positioned at the closed position (refer to the main unit 3A), the movable plate 35 extends in the front-rear direction and the left-right direction, and the second end 352 of the movable plate 35 is positioned to the front of the first end 351 of the movable plate 35. In this case, of the placement space 37, the portion further to the front than the top plate 33 is covered, from above, by the movable plate 35.

When the movable plate 35 rotates in the clockwise direction in a right side view from the closed position (refer to the main unit 3A), the movable plate 35 comes into contact with the fixed plate 34, from the front, at the open position (refer to the sub-unit 3B). As a result of the fixed plate 34 coming into contact with the movable plate 35, the movable plate 35 is suppressed from rotating further in the clockwise direction in the right side view from the open position (refer to the sub-unit 3B).

Each of the pair of pillars 32 includes a facing surface 321. The pair of facing surfaces 321 face each other in the left-right direction. Stoppers 322 are provided on each of the pair of facing surfaces 321. FIG. 2 shows one of the pair of stoppers 322, in the sub-unit 3B. The pair of stoppers 322 respectively protrude from the facing surfaces 321 so as to face each other in the left-right direction.

The stoppers 322 are positioned further to the front than the fixed plate 34, and are positioned at a position of the lower end of the fixed plate 34 in the up-down direction. When the movable plate 35 rotates in the counterclockwise direction in the right side view from the open position (refer to the sub-unit 3B), the movable plate 35 comes into contact, from above, with the stoppers 322, at the closed position (refer to the main unit 3A). As a result of the stoppers 322 coming into contact with the movable plate 35, the movable plate 35 is suppressed from rotating further in the counterclockwise direction in the right side view from the closed position (refer to the main unit 3A).

An open/closed sensor 38 is provided at the lower left portion of the fixed plate 34. The open/closed sensor 38 is a proximity switch, and detects whether or not the movable plate 35 is positioned at the open position (refer to the sub-unit 3B). A plurality of receptors 36 are provided at the lower end of the fixed plate 34. A number of the plurality of receptors 36 is not limited to a particular number, and is the same number as a number of the placement units 7 to be described later, for example, which is three. The plurality of receptors 36 are aligned alongside each other in the left-right direction.

The receptor 36 is provided with an extension plate 361 (refer to the sub-unit 3B) and a receptacle 362. The extension plate 361 extends from the lower end of the fixed plate 34 so as to extend to the left and downward the further toward the front. The receptacle 362 is fixed to the lower end of the extension plate 361. The receptacle 362 is positioned further to the front than the fixed plate 34. The receptacle 362 receives the liquid dripping from the mount mechanism 9 to be described later, when replacing the server tank 6.

The control box 5 is provided at the upper surface of the top plate 33 in the main unit 3A. Note that the sub-unit 3B is not provided with the control box 5. A control device 50 (refer to FIG. 12) to be described later is provided inside the control box 5.

A display 56, an operation portion 57, and a warning light 58 are provided at the control box 5. The display 56 is positioned at the upper left portion of the front surface of the control box 5, and displays various information. The operation portion 57 includes a plurality of buttons, for example, and is positioned below the display 56 at the front surface of the control box 5. A user inputs various information to the liquid supply device 2 by operating the operation portion 57.

The warning light 58 is positioned at the left end of the upper surface of the control box 5. The warning light 58 is, for example, a three-color layered light, and emits light in various light emission modes in accordance with a state of the liquid supply system 100. The state of the liquid supply system 100 includes a normal operation state, an error state, and the like. The user can ascertain the state of the liquid supply system 100 by the light emission mode of the warning light 58.

A plurality of support portions 39 are provided at the front surface of the control box 5. A number of the plurality of support portions 39 is not limited to a particular number and is, for example, the same number as the number of the placement units 7 to be described later, which is three. The plurality of support portions 39 are aligned alongside each other in the left-right direction. The plurality of support portions 39 are respectively positioned above placement plates 73 to be described later, and overlap the placement plates 73 to be described later, in the up-down direction. Note that in the present embodiment, "a certain member overlaps another member in a specific direction" means that, when the certain member is seen from the specific direction, at least a part of the certain member can be seen to be overlapping at least a part of the other member.

The support portion 39 includes a pair of plates 391 and an engagement shaft 392. The pair of plates 391 respectively extend to the front from the front surface of the control box 5 and face each other in the left-right direction. The engagement shaft 392 extends in the left-right direction between the pair of plates 391. When replacing the server tank 6, the user removes the mount mechanism 9 to be described later from the server tank 6, and hooks the removed mount mechanism 9 onto the support portion 39. Note that, in the sub-unit 3B, the plurality of support portions 39 are respectively provided at the front end of the top plate 33.

The plurality of placement units 7 are respectively provided on the bottom plate 31, and are aligned alongside each other in the left-right direction. A number of the plurality of placement units 7 is not limited to a particular number and is three, for example. A structure of the placement unit 7 will be described in detail later.

The server tanks 6 are positioned outside the plurality of printers 1 shown in FIG. 1, and are placed on the placement units 7, for example. The server tank 6 is a cuboid shape, and stores the liquid. The server tank 6 includes a protrusion 61. The protrusion 61 protrudes upward from a corner of the upper surface of the server tank 6. An external shape of the protrusion 61 is a circular shape as seen from above. An external screw thread is formed in the outer peripheral surface of the protrusion 61. An opening 62 is formed in the upper end of the protrusion 61. The opening 62 has a circular shape as seen from above. The interior and exterior of the server tank 6 are linked via the opening 62.

A number of the plurality of server tanks 6 is not limited to a particular number, and is three in the main unit 3A, for example. The plurality of server tanks 6 includes server tanks 6W, 6M, and 6C. The server tanks 6W, 6M, and 6C are aligned in order of the server tanks 6W, 6M, and 6C from the right toward the left. The server tanks 6W, 6M, and 6C respectively store the white (W), magenta (M), and cyan (C) inks.

Note that in the sub-unit 3B, a number of the plurality of server tanks 6 is not limited to a particular number, and is three, for example. In the sub-unit 3B, the plurality of server tanks 6 includes server tanks 6Y, 6K, and 6CS. The server tanks 6Y, 6K, and 6CS are aligned in order of the server tanks 6Y, 6K, and 6CS from the right toward the left. The server tanks 6Y, 6K, and 6CS respectively store the yellow (Y) and black (K) inks, and the pretreatment agent.

A maximum capacity of the liquid that the server tank 6 can store is not limited to a particular capacity, and is greater than a maximum capacity of the liquid that can be stored by the main tank 17, for example. For example, the maximum capacity of the liquid that can be stored by the server tank 6W is greater than the maximum capacity of the liquid that can be stored by the single main tank 17W, and is greater than a total maximum capacity that can be stored by the respective main tanks 17W of the printers 1A, 1B, 1C, and 1D.

The mount mechanism 9 is mounted to the server tank 6 and removed from the server tank 6 via the opening 62. Note that FIG. 2 shows a state in which the mount mechanism 9 is mounted to the server tank 6 in the main unit 3A, and shows a state in which the mount mechanism 9 is removed from the server tank 6 in the sub-unit 3B. The structure of the mount mechanism 9 will be described in detail later.

<Detailed Structure of Placement Unit 7>

As shown in FIG. 2, of the plurality of placement units 7, an orientation of the placement unit 7 on which the server tank 6W is placed is different, by 45° in the clockwise direction, with respect to the other placement units 7, as seen from above. Hereinafter, the placement unit 7 will be described while taking the orientation of the placement unit 7 on which the server tank 6W is placed will be taken as a reference. Note that the orientations of each of the plurality of placement units 7 may be the same as each other as seen from above.

Figure 4:
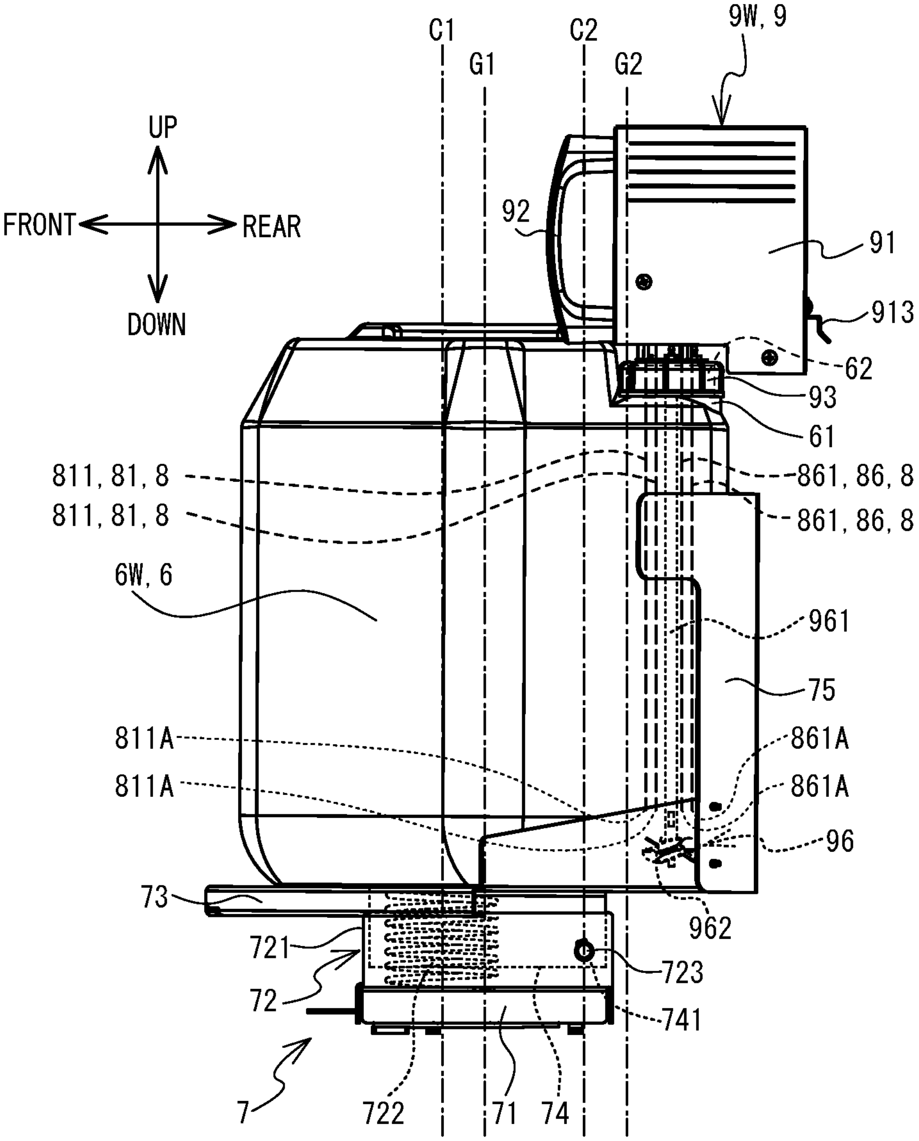
FIG. 4 is a right side view of the placement unit and the server tank in a state in which the server tank is in a horizontal posture.
Figure 5:
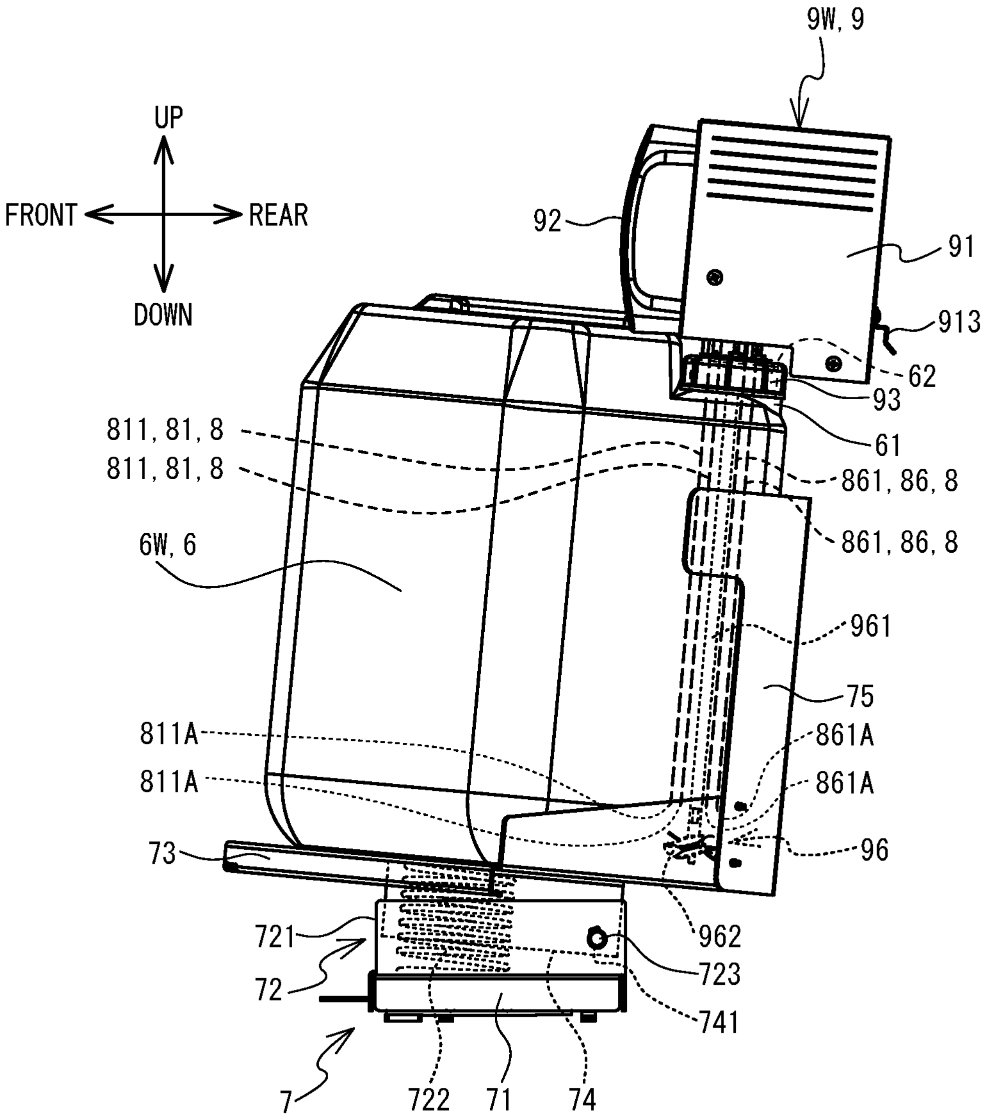
FIG. 5 is a right side view of the placement unit and the server tank in a state in which the server tank is in a tilted posture.

As shown in FIG. 3 to FIG. 5, the placement unit 7 includes a server sensor 71, a tilt mechanism 72, and the placement plate 73. The server sensor 71 is a weight sensor, for example, and is fixed to the upper surface of the bottom plate 31 shown in FIG. 2. The server sensor 71 detects a server remaining amount using the weight. The server remaining amount is a remaining amount of the liquid inside the server tank 6 placed on the placement unit 7.

When the server remaining amount has decreased, the tilt mechanism 72 displaces the server tank 6W from a horizontal posture (refer to FIG. 4) to a tilted posture (refer to FIG. 5) to be described later. The tilt mechanism 72 is provided with a guide plate 721, an elastic body 722, and a shaft 723.

As shown in FIG. 3, the guide plate 721 has a U-shape when seen from the front, and is open upward. A pair of upper ends of the guide plate 721 respectively extend in the front-rear direction and are positioned at the same height as each other. The guide plate 721 is fixed on the top of the server sensor 71.

The elastic body 722 is a compression coil spring, for example, and extends upward from a bottom surface of the guide plate 721. When the elastic body 722 is at an equilibrium length, the upper end of the elastic body 722 is positioned higher than the upper ends of the guide plate 721. The shaft 723 extends in the left-right direction between the pair of side surfaces of the guide plate 721. As shown in FIG. 4, the shaft 723 is positioned further to the rear than the elastic body 722.

As shown in FIG. 3, the placement plate 73 is positioned above the elastic body 722, and is supported by the elastic body 722. When seen from above, the placement plate 73 has a shape corresponding to the outer shape of the server tank 6, and has a rectangular shape, for example. As shown in FIG. 4, the server tank 6 is placed on the upper surface of the placement plate 73 with an orientation such that the opening 62 is disposed at a rear corner of the placement plate 73 when seen from above.

A stopper 75 is provided at the placement plate 73. The stopper 75 is a plate and extends upward from two edges including the rear corner of the placement plate 73. The stopper 75 suppresses the server tank 6 on the placement plate 73 from falling to the rear from the placement plate 73.

As shown in FIG. 3, a pair of guide plates 74 are provided at the placement plate 73. The pair of guide plates 74 extend downward from the bottom surface of the placement plate 73. The pair of guide plates 74 are disposed between a pair of side walls of the guide plate 721.

As shown in FIG. 4, support holes 741 are provided in each of rear portions of the pair of guide plates 74. Note that, of the pair of guide plates 74, FIG. 4 shows a portion of the right guide plate 74 that is hidden by the guide plate 721 using dotted lines. An inner diameter of the support hole 741 is larger than an outer diameter of the shaft 723. The shaft 723 is disposed inside each of the support holes 741 in the pair of guide plates 74.

According to the above-described configuration, as shown in FIG. 3 and FIG. 4, when the server tank 6 is placed on the placement plate 73, the elastic body 722 contracts downward in accordance with the server remaining amount. When the elastic body 722 has contracted by a predetermined length, the placement plate 73 comes into contact with the pair of upper ends of the guide plate 721. In this case, the pair of upper ends of the guide plate 721 respectively extend in the front-rear direction, and thus, the placement plate 73 does not tilt and the placement plate 73 extends in the front-rear direction and the left-right direction. When the placement plate 73 extends in the front-rear direction and the left-right direction, the bottom surface of the server tank 6 also extends in the front-rear direction and the left-right direction.

Hereinafter, the posture of the server tank 6 when the bottom surface of the server tank 6 extends in the front-rear direction and the left-right direction will be referred to as a "horizontal posture." When the server tank 6 is placed on the placement plate 73, a minimum server remaining amount when the placement plate 73 is in surface contact with the pair of upper ends of the guide plate 721 will be referred to as a "deformation remaining amount." The deformation remaining amount is established by the Young's modulus of the elastic body 722.

As the server remaining amount, a "first server remaining amount," a "second server remaining amount," and a "third server remaining amount" are defined. The first server remaining amount is greater than the deformation remaining amount. The second server remaining amount is smaller than the first server remaining amount, and is greater than the deformation remaining amount. The third server remaining amount is smaller than the deformation remaining amount.

Even when the server tank 6 is placed on the placement plate 73 and the server remaining amount decreases from the first server remaining amount to the second server remaining amount, since the server remaining amount is greater than the deformation remaining amount, the server tank 6 maintains the horizontal posture.

On the other hand, as shown in FIG. 5, when the server tank 6 is placed on the placement plate 73 and the server remaining amount decreases from the first server remaining amount to the third server remaining amount, the server remaining amount becomes smaller than the deformation remaining amount, and thus, the elastic body 722 elastically deforms so as to extend upward. In this case, the placement plate 73 rotates in the clockwise direction, as seen from the right, around the shaft 723. In this way, the placement plate 73 tilts from the upper direction in the downward direction the further from the front to the rear.

When the placement plate 73 tilts from the upper direction in the downward direction the further from the front to the rear, the bottom surface of the server tank 6 also tilts from the upper direction toward the downward direction the further from the front to the rear. Hereinafter, the posture of the server tank 6 when the bottom surface of the server tank 6 tilts from the upper direction toward the downward direction the further from the front to the rear will be referred to as a "tilted posture." Note that in the tilted posture, the more the server remaining amount decreases, the larger an angle of the bottom surface of the server tank 6 becomes with respect to the front-rear direction.

As described above, when the server remaining amount decreases from the first server remaining amount to the third server remaining amount, the tilt mechanism 72 displaces the server tank 6W from the horizontal posture to the tilted posture. On the other hand, when the server remaining amount decreases from the first server remaining amount to the second server remaining amount, the tilt mechanism 72 does not displace the server tank 6W from the horizontal posture to the tilted posture. In the present embodiment, with respect to "when the server remaining amount decreases, the tilt mechanism 72 displaces the server tank 6W from the horizontal posture to the tilted posture," it is sufficient that there be a change in the server remaining amount that changes the posture of the server tank 6W as a result of the decrease in the server remaining amount, such as when the server remaining amount decreases from the first server remaining amount to the third server remaining amount, for example. In other words, "when the server remaining amount decreases, the tilt mechanism 72 displaces the server tank 6W from the horizontal posture to the tilted posture" may also include the change in the server remaining amount that does not change the posture of the server tank 6W as a result of the decrease in the server remaining amount, such as when the server remaining amount decreases from the first server remaining amount to the second server remaining amount.

As shown in FIG. 4, in the front-rear direction, a center C1 of the elastic body 722 is positioned further to the front than a center C2 of the shaft 723. In a state in which the mount mechanism 9 is mounted to the server tank 6, a center of gravity G1 of the server tank 6 itself (not including the mount mechanism 9) is positioned further to the front than the opening 62, and is positioned between the center C1 of the elastic body 722 and the center C2 of the shaft 723 in the front-rear direction. A center of gravity G2 of a unit of the server tank 6 and the mount mechanism 9 is positioned further to the rear than the center of gravity G1 of the server tank 6 itself (not including the mount mechanism 9), and is positioned further to the rear than the center C2 of the shaft 723. As a result, in accordance with the server remaining amount decreasing, the server tank 6 is more easily displaced from the horizontal posture shown in FIG. 4 to the tilted posture shown in FIG. 5.

<Detailed Structure of Mount Mechanism 9>

As shown in FIG. 2, hereinafter, the mount mechanism 9 corresponding to the server tank 6W will be referred to as a "mount mechanism 9W." When the mount mechanisms 9 respectively corresponding to the server tanks 6M, 6C, 6Y, 6K, and 6CS are collectively referred to, or when no particular distinction is made therebetween, they will be referred to as a "mount mechanism 9C." The configuration of the mount mechanism 9 is different between the mount mechanism 9W and the mount mechanism 9C.

In the present embodiment, the mount mechanism 9W and the mount mechanism 9C differ from each other in the presence or absence of an agitation mechanism 96 to be described later (refer to FIG. 6), respective numbers of connectors 97 to be described later (refer to FIG. 7 and FIG. 8), and connection configurations of the tubes 8 shown in FIG. 7 and FIG. 8. Hereinafter, the structure of the mount mechanism 9W will be described in detail, and, of the configuration of the mount mechanism 9C, the configuration that is the same as that of the mount mechanism 9W will be assigned the same reference signs, and a description thereof will be omitted or simplified.

Figure 6:
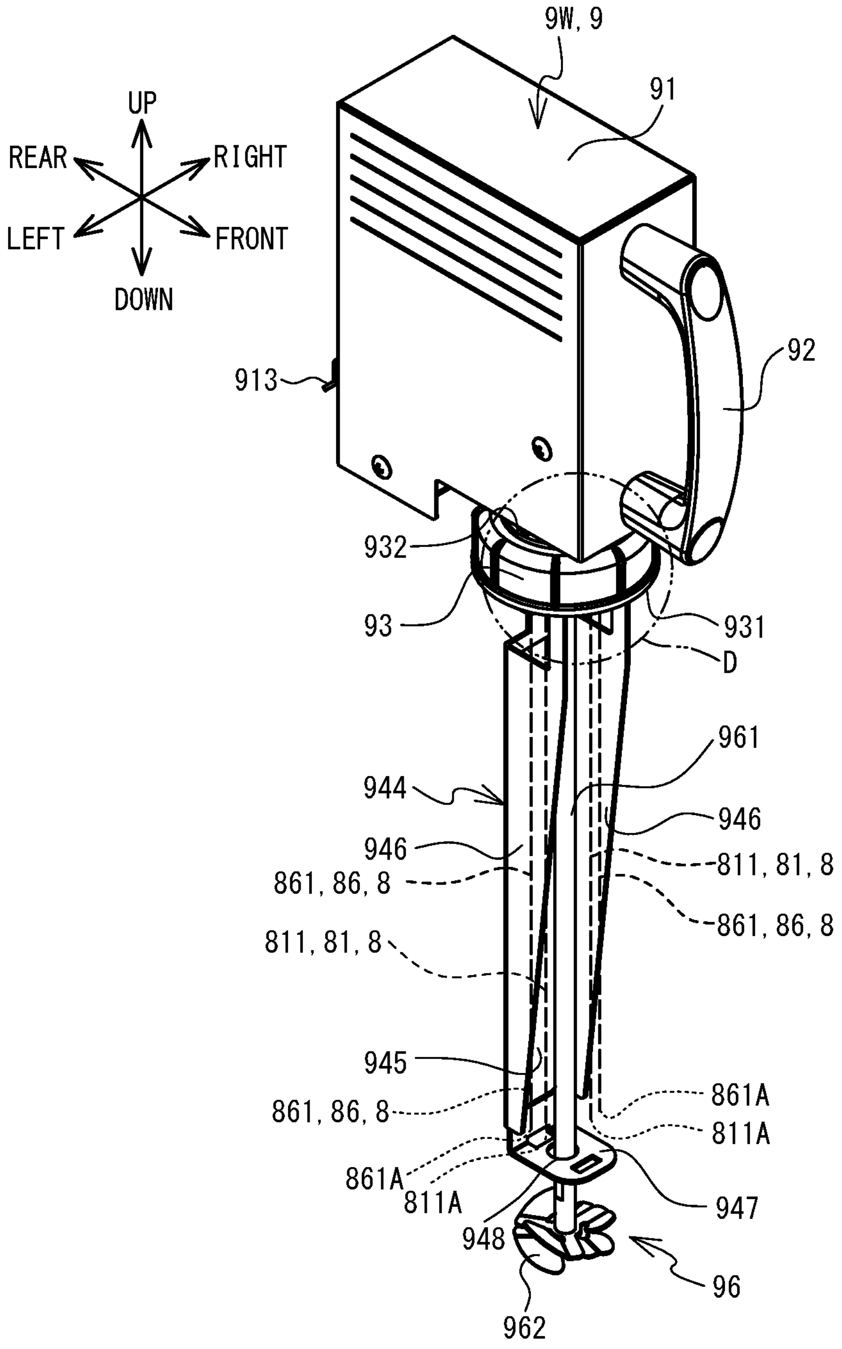
FIG. 6 is a perspective view of a mount mechanism.
Figure 7:
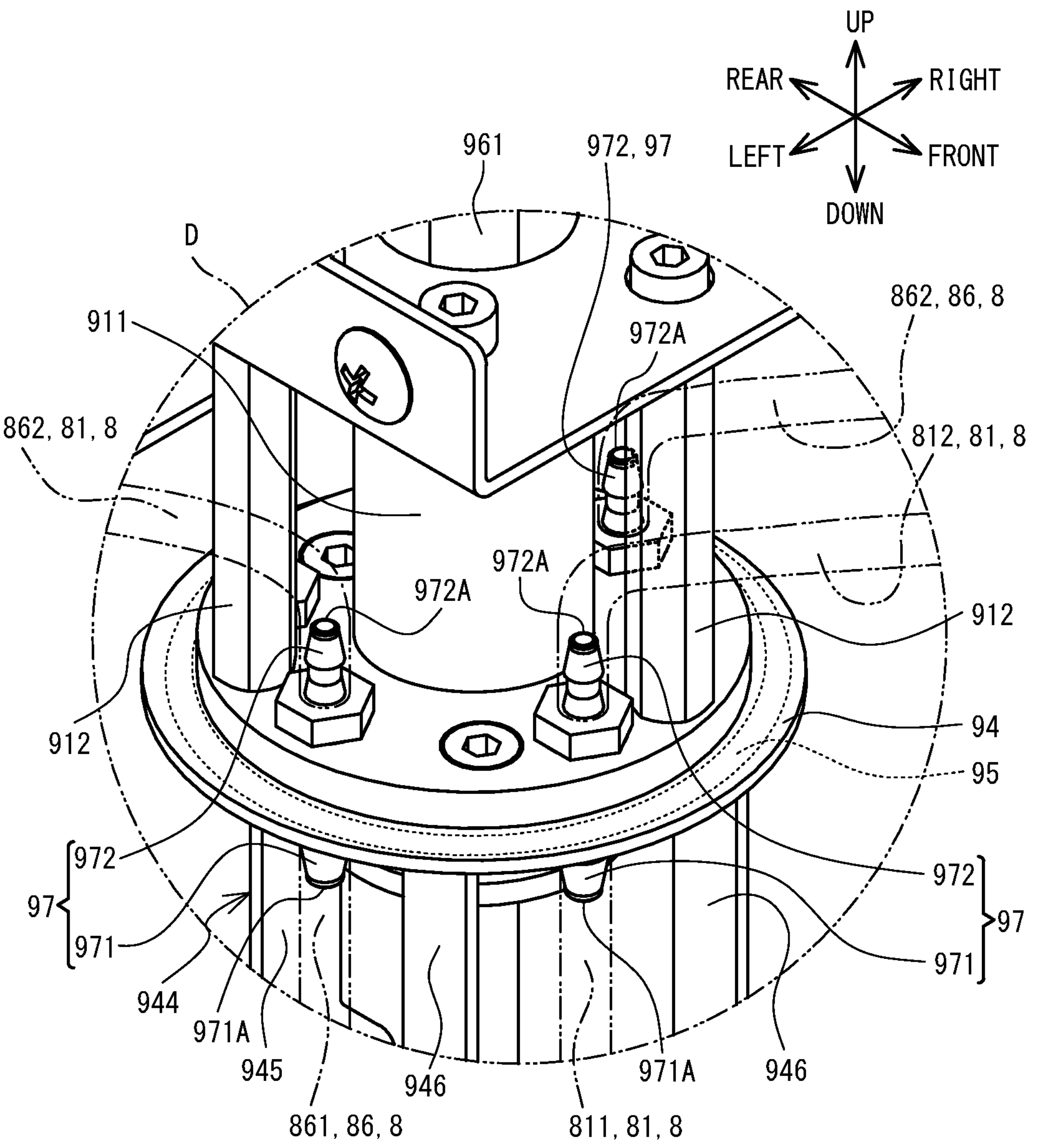
FIG. 7 is a perspective view of a region D shown in FIG. 6.
Figure 8:
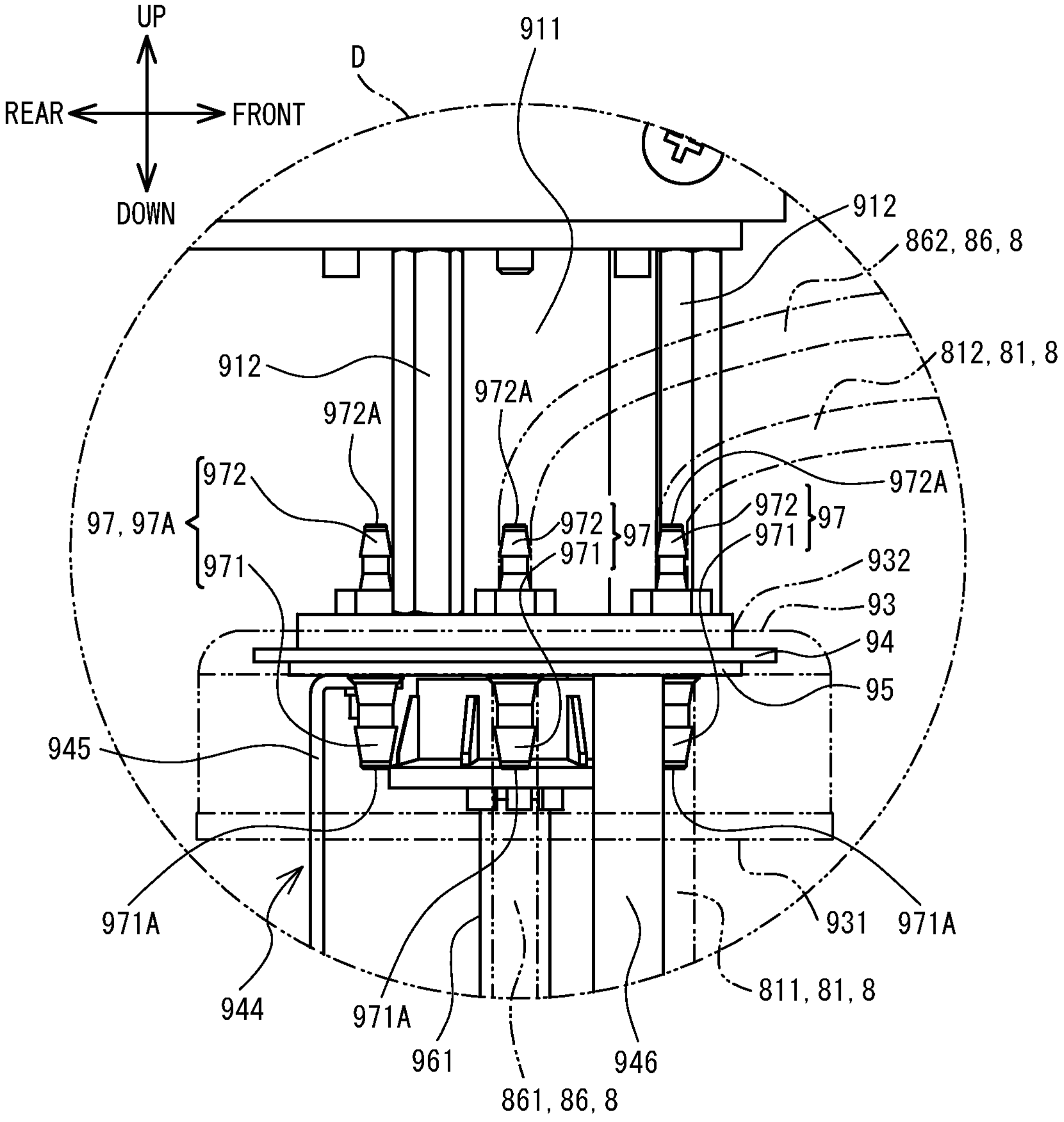
FIG. 8 is a left side view of the region D shown in FIG. 6.

As shown in FIG. 6, the mount mechanism 9W is provided with a cabinet 91, a handle 92, a cap 93, a support plate 94 shown in FIG. 7 and FIG. 8, a washer 95 shown in FIG. 7 and FIG. 8, a guide plate 944, the agitation mechanism 96, and the tubes. Note that the mount mechanism 9C shown in FIG. 2 is not provided with the agitation mechanism 96. FIG. 7 omits illustration of the cap 93. FIG. 8 shows the cap 93 using virtual lines.

The cabinet 91 is a cuboid shape. An engagement hook 913 is provided at the cabinet 91. The engagement hook 913 extends downward after extending to the rear from the rear surface of the cabinet 91. When the support portion 39 shown in FIG. 2 supports the mount mechanism 9, the engagement hook 913 engages with the engagement shaft 392 shown in FIG. 2.

The handle 92 extends downward after extending to the front from the front surface of the cabinet 91. After extending downward, the handle 92 extends to the rear as far as the front surface of the cabinet 91. The handle 92 is positioned on the opposite side of the cabinet 91 to the engagement hook 913. The user handles the mount mechanism 9 while holding the handle 92.

The cap 93 has a circular cylindrical shape. An opening 931 is formed in the lower end of the cap 93. The opening 931 has a circular shape. The inner diameter of the opening 931 is substantially the same as the diameter of the protrusion 61. An opening 932 is formed in the upper surface of the cap 93. The diameter of the opening 932 is smaller than the diameter of the opening 931. An internal screw thread (not shown in the drawings) is formed in the inner peripheral surface of the cap 93. The cap 93 is mounted to the protrusion 61 by screwing together the internal screw thread of the cap 93 with the external screw thread of the protrusion 61.

As shown in FIG. 7 and FIG. 8, a central shaft 911 and a plurality of connection shafts 912 are provided in the cabinet 91. The central shaft 911 has a cylindrical shape and extends downward from the cabinet 91. The plurality of connection shafts 912 are respectively positioned around the central shaft 911 in the radial direction of the central shaft 911, and extend downward from the cabinet 91. The central shaft 911 and the plurality of connection shafts 912 penetrate the inside of the openings 931 and 932.

The support plate 94 has a ring shape. The support plate 94 connects the lower ends of each of the central shaft 911 and the plurality of connection shafts 912. The outer diameter of the support plate 94 is smaller than the diameter of the opening 931, is larger than the diameter of the opening 932, and is larger than the inner diameter of the protrusion 61.

The outer diameter of the support plate 94 is smaller than the diameter of the opening 931, and thus, when the cap 93 moves downward, the support plate 94 is disposed inside the cap 93. The outer diameter of the support plate 94 is larger than the diameter of the opening 932, and thus, when the cap 93 moves downward, the cap 93 is hooked on the support plate 94. Thus, using the cabinet 91 and the support plate 94, the cap 93 is held between the cabinet 91 and the support plate 94 in the up-down direction.

An opening (not shown in the drawings) and a plurality of connectors 97 are provided at the support plate 94. The opening penetrates the center of the support plate 94 in the up-down direction, and is linked to an internal space of the central shaft 911. The plurality of connectors 97 are provided around the central shaft 911 in the radial direction of the central shaft 911. A number of the plurality of connectors 97 is not limited to a particular number, and in the mount mechanism 9W is five, for example. Note that in each of FIG. 7 and FIG. 8, three of the five connectors 97 are illustrated. In the mount mechanism 9C shown in FIG. 2, the number of the plurality of connectors 97 is three, for example.

Each of the plurality of connectors 97 includes a first connector 971 and a second connector 972. Each of the first connector 971 and the second connector 972 is a coupler plug or a hose nipple, for example. The first connector 971 protrudes downward from the bottom surface of the support plate 94. The second connector 972 protrudes upward from the upper surface of the support plate 94. Openings 971A and 972A are respectively provided in the first connector 971 and the second connector 972. The opening 971A of the first connector 971 and the opening 972A of the second connector 972 are connected to each other.

The tubes 8 configure flow paths of the liquid between the server tank 6 and each of the plurality of printers 1. The tubes 8 are connected to some or all of the plurality of connectors 97. In the mount mechanism 9W, as the tubes 8, two tubes 81 and two tubes 86 are respectively connected to the four connectors 97. Note that FIG. 7 illustrates one of the tubes 81 and the two tubes 86. FIG. 8 illustrates one of the tubes 81 and one of the tubes 86.

The two tubes 81 are respectively configured by a tube 811 and a tube 812. The two tubes 86 are respectively configured by a tube 861 and a tube 862. The two tubes 811 and the two tubes 861 are respectively connected to the first connector 971. In a state in which the mount mechanism 9W is mounted to the server tank 6W, the two tubes 811 and the two tubes 861 respectively extend downward from the first connector 971 toward the inside of the server tank 6W. As shown in FIG. 6, first ends 811A of each of the two tubes 811 and first ends 861A of each of the two tubes 861 are positioned above and in the vicinity of a bottom plate 947 to be described later.

As shown in FIG. 7 and FIG. 8, the two tubes 812 and the two tubes 862 are respectively connected to the second connector 972. After extending upward from the second connector 972, the two tubes 812 and the two tubes 862 respectively extend toward the printer 1. Connection destinations of the tubes 8 including the tubes 812 and 862 will be described in detail later. Illustration of the tubes 812 and 862 is omitted in FIG. 4 to FIG. 6.

Note that the tube 8 is not connected to a connector 97A. The connector 97A is one of the five connectors 97. The connector 97A causes a space inside the server tank 6W to be communicated with the atmosphere. In this way, even when an inter supply device-printer supply operation or an inter supply device-printer circulation operation (to be described later) is performed, pressure inside the server tank 6W is suppressed from changing. The connector 97A need not necessarily have a function of connecting the tubes 8 to the server tank 6W, and may simply be a through hole.

In the mount mechanism 9C shown in FIG. 2, as the tubes 8, two of the tubes 81 are respectively connected to two of the connectors 97. The tube 8 is not connected to one of the three connectors 97. The connector 97 to which the tube 8 is not connected causes the space inside the server tank 6 to be communicated with the atmosphere.

The washer 95 is an elastic body and has a ring shape. The washer 95 is fixed to the bottom surface of the support plate 94. FIG. 7 shows the washer 95 hidden below the support plate 94 using dotted lines. The inner edge of the washer 95 is positioned around the plurality of connectors 97 in the radial direction of the support plate 94. The outer diameter of the washer 95 is larger than the inner diameter of the protrusion 61. The inner diameter of the washer 95 is smaller than the outer diameter of the protrusion 61.

As shown in FIG. 6, the guide plate 944 includes an extension plate 945, a pair of side plates 946, and the bottom plate 947. The extension plate 945 extends downward from the bottom surface of the support plate 94. The extension plate 945 is positioned further to the rear than any of the plurality of connectors 97. The left end of the extension plate 945 is positioned further to the left than any of the plurality of connectors 97. The right end of the extension plate 945 is positioned further to the right than any of the plurality of connectors 97. The pair of side plate 946 extend to the front from both the left and the right ends of the extension plate 945, respectively. The bottom plate 947 extends to the front from the lower end of the extension plate 945. An opening 948 is provided in the bottom plate 947.

Figure 12:
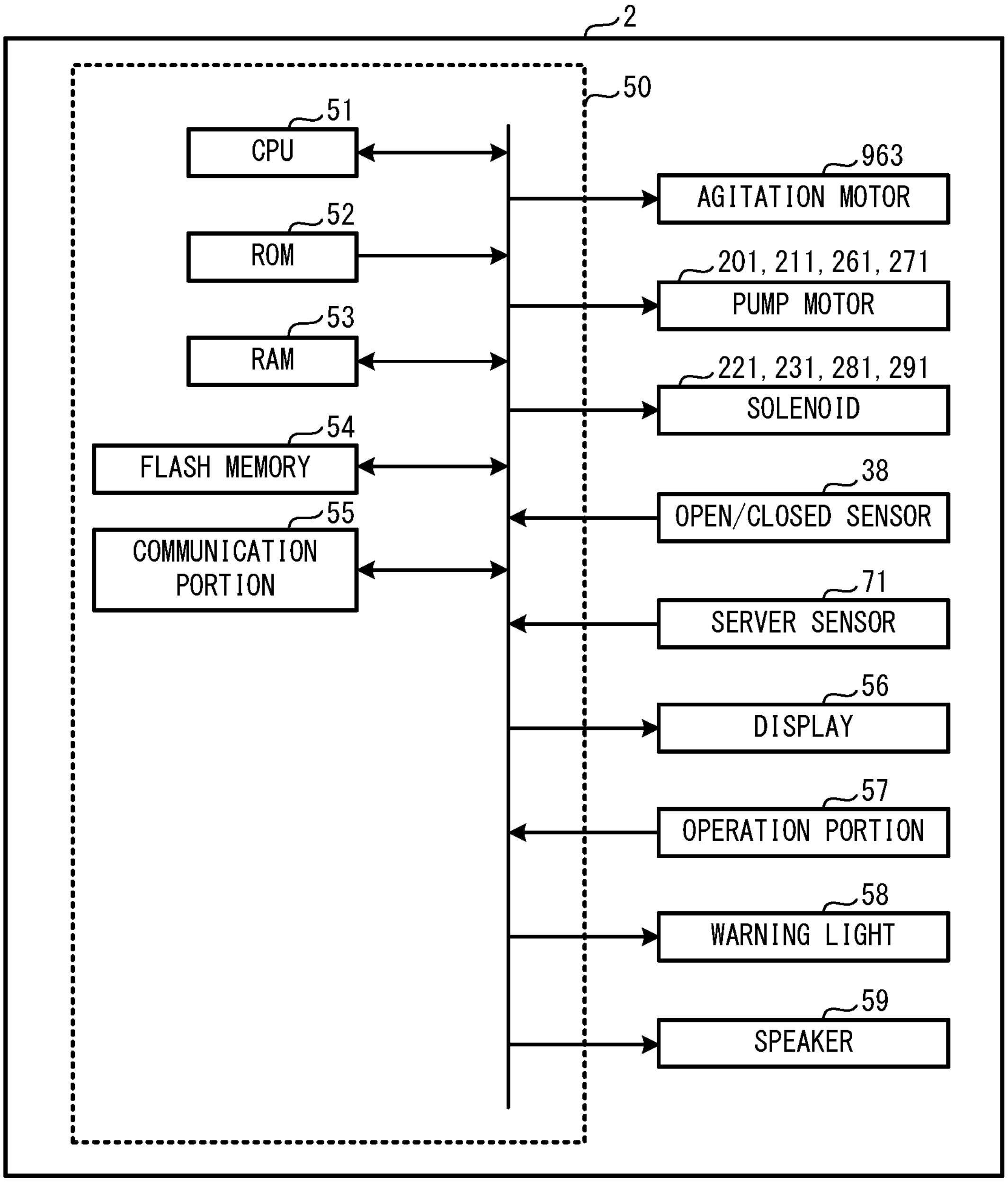
FIG. 12 is a block diagram showing an electrical configuration of the liquid supply device.

The agitation mechanism 96 includes a propeller stirrer, and is provided with a rotation shaft 961, a propeller 962, and an agitation motor 963 shown in FIG. 12. After passing from inside the cabinet 91 through the central shaft 911 shown in FIG. 7, the rotation shaft 961 passes through the opening 948 and extends to a position lower than the bottom plate 947. A bearing (not shown in the drawings) is fixed to the inside of the central shaft 911. The rotation shaft 961 is rotatably supported by the bearing.

The propeller 962 includes a plurality of vanes, and is fixed to the lower end of the rotation shaft 961, and extends to the outside in the radial direction of the rotation shaft 961. The propeller 962 is supported by the support plate 94, via the central shaft 911, the bearing, and the rotation shaft 961. In the state in which the mount mechanism 9W is mounted to the server tank 6W, the propeller 962 is positioned in the vicinity of the bottom surface of the server tank 6W inside the server tank 6W.

The agitation motor 963 shown in FIG. 12 is provided inside the cabinet 91, and is coupled to the rotation shaft 961 via gears (not shown in the drawings), or by direct coupling. The agitation mechanism 96 rotates the rotation shaft 961 by the driving of the agitation motor 963 shown in FIG. 12. As a result of the rotation of the rotation shaft 961, the propeller 962 rotates. As a result of rotating the propeller 962 in the state in which the mount mechanism 9W is mounted to the server tank 6W, the agitation mechanism 96 agitates the white ink inside the server tank 6W.

Hereinafter, an operation of the agitation mechanism 96 driving the agitation motor 963 shown in FIG. 12 and rotating the propeller 962 will be referred to as an "agitation operation." In the present embodiment, the agitation mechanism 96 intermittently performs the agitation operation by repeatedly driving and stopping the agitation motor 963 shown in FIG. 12. Hereinafter, the agitation mechanism 96 intermittently performing the agitation operation will be referred to as "intermittent driving of the agitation operation."

In the present embodiment, the white ink includes components that are more likely to precipitate than components included in the color inks, as solid components such as pigment particles and the like. The components that are more likely to precipitate include titanium oxide, for example. Titanium oxide is a type of inorganic pigment having a relatively high specific gravity. The white ink includes the components that are relatively likely to precipitate, and thus, the solid components in the white ink, such as the pigment particles and the like, easily precipitate. Hereinafter, the precipitation of the solid components in the white ink will be also referred to as "the white ink settles." By performing the agitation operation, the agitation mechanism 96 suppresses the white ink from settling inside the server tank 6W.

According to the above-described configuration, as shown in FIG. 4 and FIG. 5, when the mount mechanism 9W is mounted to the server tank 6W, the first ends 811A of the tubes 811 and the first ends 861A of the tubes 861 are disposed inside the server tank 6W. Thus, when the server tank 6W is in the tilted posture shown in FIG. 5, the white ink inside the server tank 6W collects around the first ends 811A of the tubes 811 and the first ends 861A of the tubes 861.

In this way, a height of a liquid surface inside the server tank 6W is higher, at the positions of the first ends 811A of the tubes 811 and the first ends 861A of the tubes 861, than when the server tank 6W is in the horizontal posture. Thus, even when the server remaining amount decreases, the first ends 811A of the tubes 811 and the first ends 861A of the tubes 861 are suppressed from being removed upward from the liquid surface of the liquid inside the server tank 6W. Note that the height of the liquid surface inside the server tank 6 is defined by a length in the up-down direction (the vertical direction) from the bottom surface of the server tank 6 to the liquid surface.

The cabinet 91, the handle 92, the cap 93, the support plate 94, the washer 95, the tube 8, and the agitation mechanism 96 are integrated with each other to configure the mount mechanism 9W. Thus, in the present embodiment, "the mount mechanism 9W is mounted to the server tank 6W" means that "the cabinet 91, the handle 92, the cap 93, the support plate 94, the washer 95, the tube 8, or the agitation mechanism 96 are mounted to the server tank 6W."

Furthermore, "the support portion 39 supports the mount mechanism 9" means that the "support portion 39 supports the cabinet 91, the handle 92, the cap 93, the support plate 94, the washer 95, the tube 8, or the agitation mechanism 96." Note that "a plurality of member are integrated with each other to configure a member" refers to the fact that a plurality of members are coupled together to an extent to which the single member cannot be dismantled to the plurality of members, insofar as a certain external force is not applied, or the user does not intentionally remove the member.

<Method of Assembling Mount Mechanism 9>

Hereinafter, of the mount mechanism 9W, a method of assembling the vicinity of the support plate 94 will be described as an example. The connectors 97, the washer 95, the central shaft 911, the connection shafts 912, and the guide plate 944 are attached to the support plate 94. For example, the connectors 97 are screwed together with the support plate 94. The washer 95 is adhered to the support plate 94 using an adhesive. The central shaft 911 is formed integrally with the support plate 94. The connection shafts 912 and the guide plate 944 are respectively attached to the support plate 94 using screws.

In this state, the cap 93 is mounted to the support plate 94, from above, such that the central shaft 911 and the connection shafts 912 are inserted, from below, into the opening 931 and the opening 932 in order. In this way, the support plate 94 is disposed inside the cap 93. Hereinafter, a unit in which the connectors 97, the washer 95, the central shaft 911, the connection shafts 912, and the guide plate 944 are attached to the support plate 94 will be referred to as a "support plate unit."

The cabinet 91 is attached to the support plate unit. In this way, the central shaft 911 fits into a hole of a fixed plate inside the cabinet 91. The connection shafts 912 are attached by screws to the fixed plate inside the cabinet 91. The rotation shaft 961 is inserted into the opening 948 from below toward the upward direction, and is further inserted into the central shaft 911. The rotation shaft 961 is press fitted to a bearing inside the cabinet 91. As described above, the assembly of the mount mechanism 9 is complete.

<Tank Replacement>

Hereinafter, a method of replacing the server tank 6W will be described as an example. Note that the method of replacing the server tanks 6M, 6C, 6Y, 6K, and 6CS is the same as the method of replacing the server tank 6W. As shown in FIG. 2, the user moves the movable plate 35 from the closed position (refer to the main unit 3A) to the open position (refer to the sub-unit 3B). In the state in which the movable plate 35 is positioned at the open position (refer to the sub-unit 3B), the movable plate 35 is positioned further to the rear than the opening 62, and the opening 62 is open upward.

The user loosens the cap 93 from the protrusion 61. In the state in which the movable plate 35 is positioned at the open position (refer to the sub-unit 3B), the user holds the handle 92 and pulls the mount mechanism 9W out from the server tank 6W via the opening 62.

The mount mechanism 9W is configured by the cabinet 91, the handle 92, the cap 93, the support plate 94, the washer 95, the tube 8, and the agitation mechanism 96 being integrated with each other. Thus, the user can remove the cabinet 91, the handle 92, the cap 93, the support plate 94, the washer 95, the tube 8, and the agitation mechanism 96 from the server tank 6 simply by removing the mount mechanism 9W from the server tank 6. In other words, the user does not need to individually remove each of the cabinet 91, the handle 92, the cap 93, the support plate 94, the washer 95, the tube 8, and the agitation mechanism 96 from the server tank 6.

Note that, when the movable plate 35 is positioned at the closed position (refer to the main unit 3A), the movable plate 35 is positioned above the opening 62. In this state, a distance in the up-down direction from the opening 62 to the movable plate 35 is smaller than a length in the up-down direction of the mount mechanism 9W, such as a length from the upper end of the cabinet 91 to the propeller 962, for example. As a result, when the movable plate 35 is at the closed position (refer to the main unit 3A), even if the user tries to pull the mount mechanism 9W from inside the server tank 6W, the mount mechanism 9W collides with the movable plate 35. Thus, when the movable plate 35 is at the closed position (refer to the main unit 3A), it is difficult for the user to remove the mount mechanism 9W from the server tank 6W.

After removing the mount mechanism 9W from inside of the server tank 6W, the user hooks the engagement hook 913 shown in FIG. 4 onto the engagement shaft 392. In this way, the support portion 39 supports the mount mechanism 9W. In this case, the lower end of the guide plate 944 is positioned directly above the receptacle 362. Thus, the receptacle 362 can receive the white ink dripping from the guide plate 944.

Hereinafter, a region through which the movable plate 35 passes when moving from the open position (refer to the sub-unit 3B) to the closed position (refer to the main unit 3A) will be referred to as a "movement path of the movable plate 35." In a state in which the support portion 39 supports the mount mechanism 9W, a portion of the mount mechanism 9W is positioned on the movement path of the movable plate 35. Thus, in the state in which the support portion 39 supports the mount mechanism 9W, if the movable plate 35 attempts to move from the open position (refer to the sub-unit 3B) to the closed position (refer to the main unit 3A), the movable plate 35 collides with the mount mechanism 9W. As a result, the mount mechanism 9W suppresses the movable plate 35 from moving from the open position (refer to the sub-unit 3B) to the closed position (refer to the main unit 3A) during the replacement of the server tank 6W.

In the state in which the support portion 39 supports the mount mechanism 9W, the user replaces the pre-replacement server tank 6W with the server tank 6W to be used as the replacement. The server tank 6W to be used as the replacement is the server tank 6W storing the sufficient white ink, for example. For example, the user moves the pre-replacement server tank 6W from the placement plate 73 to another location. The user places the server tank 6W to be used as the replacement on the placement plate 73, with an orientation such that, when seen from above, the opening 62 is disposed at the rear corner of the placement plate 73. Note that the pre-replacement server tank 6W may be refilled with the white ink via the opening 62, without replacing the pre-replacement server tank 6W with the server tank 6W to be used as the replacement.

The user holds the handle 92, and removes the engagement hook 913 from the engagement shaft 392. The user inserts the guide plate 944 into the server tank 6W from the opening 62. The user tightens the cap 93 on the protrusion 61. In this way, the mount mechanism 9W is mounted to the server tank 6W.

The outer diameter of the washer 95 is larger than the inner diameter of the protrusion 61. The inner diameter of the washer 95 is smaller than the outer diameter of the protrusion 61. The outer diameter of the support plate 94 is larger than the inner diameter of the protrusion 61. Thus, when the cap 93 is tightened onto the protrusion 61, the support plate 94 is pressed by the cap 93 against opening edges of the protrusion 61, via the washer 95. In this way, the support plate 94 is fixed to the server tank 6W. The support plate 94 is fixed to the cabinet 91 via the central shaft 911 and the plurality of connection shafts 912, and thus, the position of the rotation shaft 961 is fixed with respect to the server tank 6W.

In the state in which the mount mechanism 9W is mounted to the server tank 6W, the upper end of the mount mechanism 9W is positioned lower than the stoppers 322. In other words, all of the mount mechanism 9W is positioned outside the movement path of the movable plate 35. Thus, the user can move the movable plate 35 from the open position (refer to the sub-unit 3B) to the closed position (refer to the main unit 3A). The tank replacement is completed as described above.

<Flow Path Configuration of Liquid Supply System 100>

Figure 9:
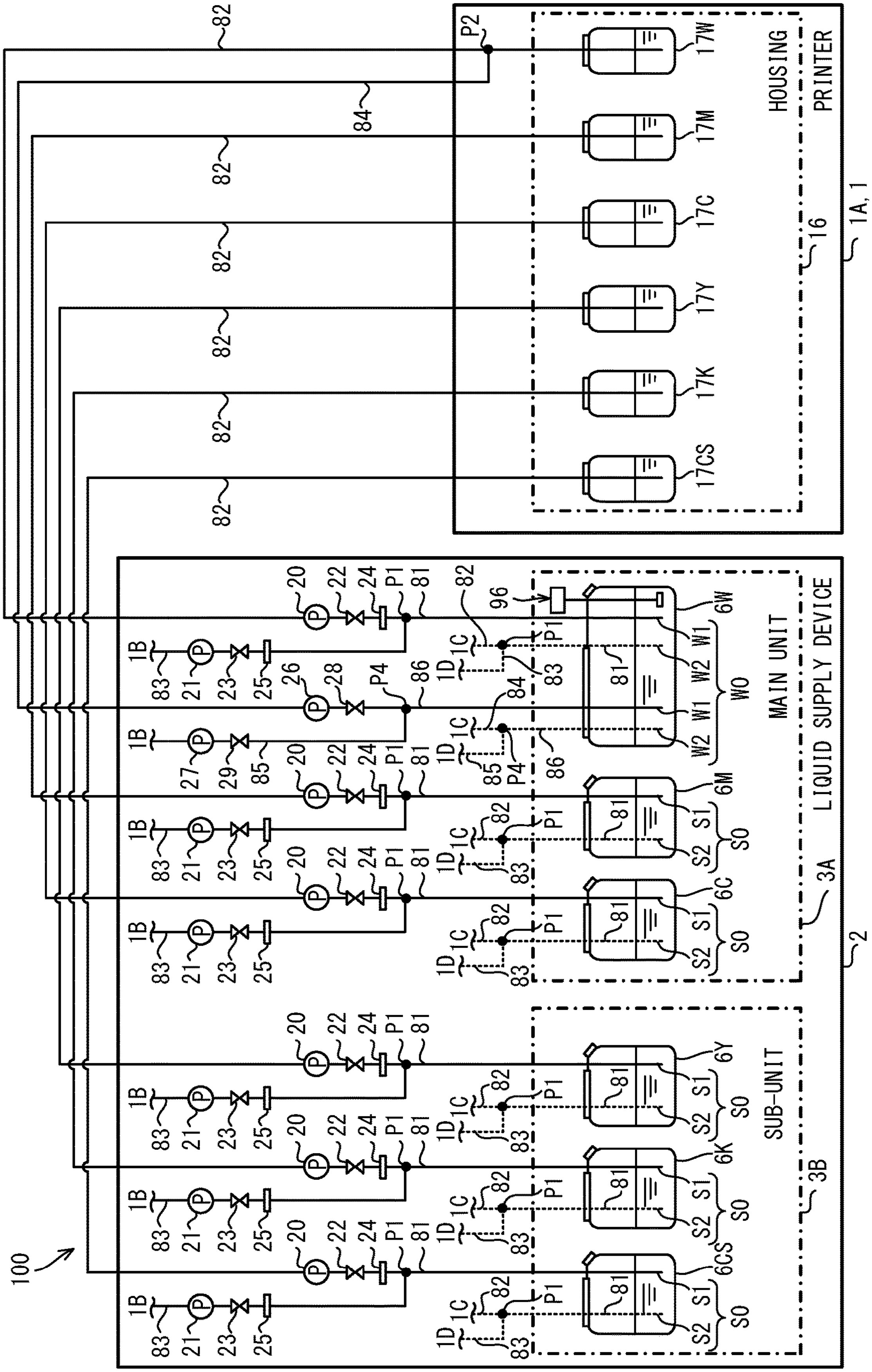
FIG. 9 is a flow path configuration diagram between the liquid supply device and a printer, in the liquid supply system.

"1B," "1C," and "1D" shown in FIG. 9 respectively indicate the "printer 1B," the "printer 1C," and the "printer 1D" as connection destinations from the liquid supply device 2. In the present embodiment, "one of the tubes 8 is connected to the server tank 6 or the printer 1" includes a case in which one of the tubes 8 is directly connected to the server tank 6 or the printer 1, or a case in which one of the tubes 8 is connected to the server tank 6 or the printer 1 via another of the tubes 8 or another member. "One of the tubes 8 is connected to the server tank 6 or the printer 1" refers to a state in which the liquid can pass through the one of the tubes 8, and can flow to the server tank 6 or the printer 1 directly or via the other tube 8 or the other member.

As shown in FIG. 9, the flow path configuration of the liquid supply system 100 includes a white flow path W0 and color/pretreatment agent flow paths S0, as the flow paths between the liquid supply device 2 and the printers 1A, 1B, 1C, and 1D. The white flow path W0 differs from the color/pretreatment agent flow paths S0 in the presence or absence of tubes 84, 85, and 86 to be described later. Thus, hereinafter, the white flow path W0 will be described, and, of the configuration of the color/pretreatment agent flow paths S0, the configuration that is the same as that of the white flow path W0 will be assigned the same reference signs as the white flow path W0 and the description thereof will be omitted or simplified.

Figure 10:
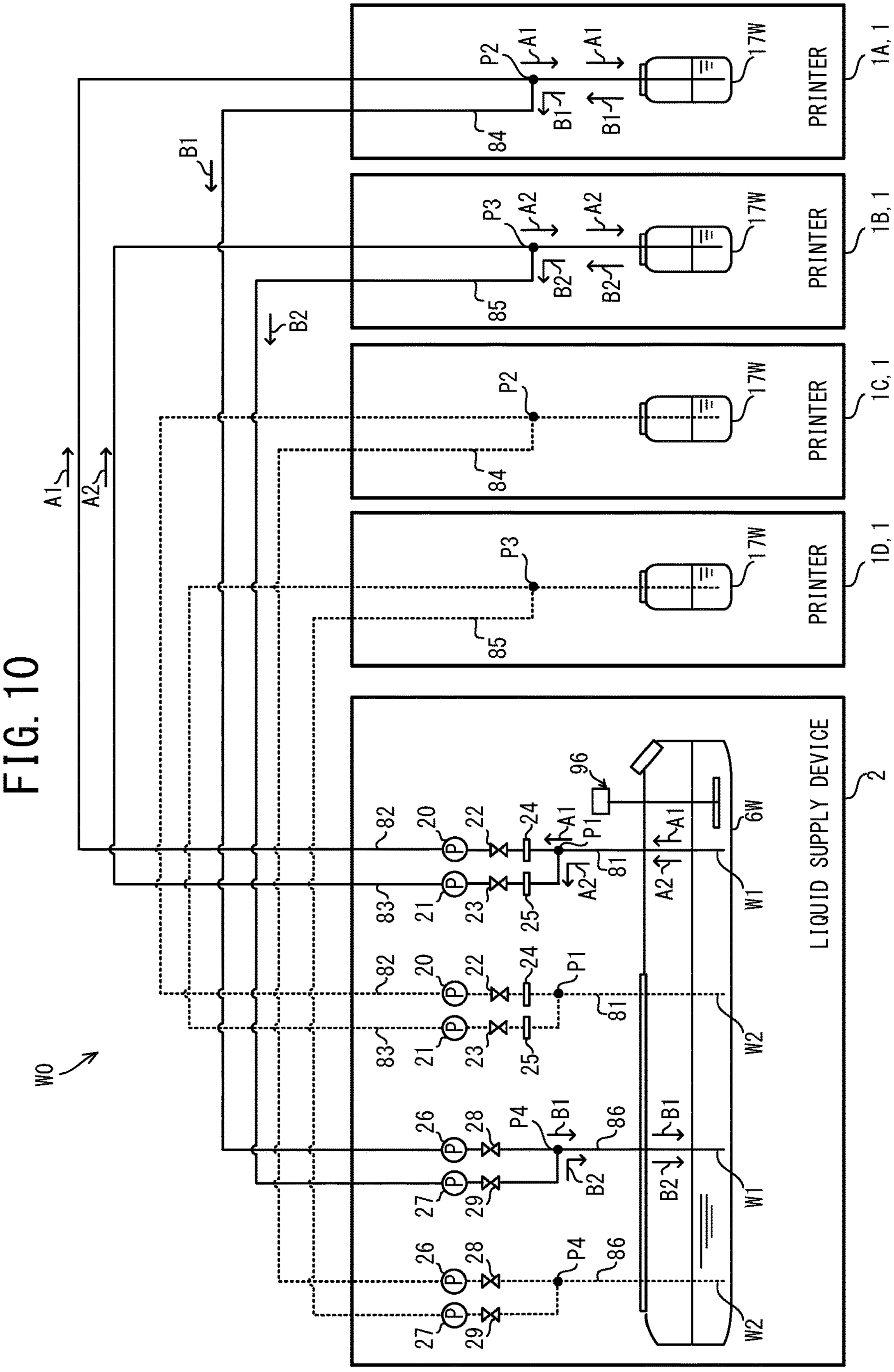
FIG. 10 is a flow path configuration diagram of a white flow path.

The white flow path W0 includes a first white flow path W1 and a second white flow path W2. Note that FIG. 9 and FIG. 10 show the first white flow path W1 using solid lines and show the second white flow path W2 using dotted lines. The first white flow path W1 connects the server tank 6W and the respective main tanks 17W of the printers 1A and 1B to each other. The second white flow path W2 connects the server tank 6W and the respective main tanks 17W of the printers 1C and 1D to each other.

As shown in FIG. 10, the first white flow path W1 and the second white flow path W2 differ from each other in whether the connection destination from the liquid supply device 2 is one of the printer 1A and 1B, or the printer 1C and 1D. Thus, hereinafter, the first white flow path W1 will be described and, for the second white flow path W2, the same reference signs will be assigned as for the first white flow path W1 and the description thereof will be omitted or simplified.

The first white flow path W1 is configured by the tubes 81, tubes 82 and 83, and the tubes 84, 85, and 86 as the tubes 8. The tube 81 is connected to the server tank 6W. The tube 81 extends from inside the server tank 6W to a point P1, via one of the plurality of connectors 97 shown in FIG. 7 and FIG. 8. The tube 81 is connected to the tube 82 and the tube 83 at the point P1.

The tube 82 extends from the point P1 toward the printer 1A via a point P2. The tube 82 is connected to the main tank 17W of the printer 1A. The tube 83 extends from the point P1 toward the printer 1B via a point P3. The tube 83 is connected to the main tank 17W of the printer 1B.

The tube 84 is connected to the tube 82 at the point P2. The tube 84 extends from the point P2 to a point P4, and is connected to the tube 86 at the point P4. The tube 85 is connected to the tube 83 at the point P3. The tube 85 extends from the point P3 to the point P4, and is connected to the tube 86 at the point P4. The tube 86 extends from the point P4 toward the server tank 6W, and is connected to the server tank 6W. The tube 86 extends to inside the server tank 6W, via one of the plurality of connectors 97 shown in FIG. 7 and FIG. 8.

Hereinafter, the flow path from the server tank 6W to the main tank 17W of the printer 1A via the tube 81 and the tube 82, and the flow path from the server tank 6W to the main tank 17W of the printer 1B via the tube 81 and the tube 83 will be respectively referred to as a "supply flow path." The side of the server tank 6W in the supply flow path will be referred to as "upstream in the supply flow path," and the side of the main tank 17W of the printer 1A or the printer 1B will be referred to as "downstream in the supply flow path." For example, at a halfway point in the supply flow path, the side of the server tank 6W is upstream in the supply flow path and the side of the main tank 17W of the printer 1A or the printer 1B is downstream in the supply flow path.

The flow path from the main tank 17W of the printer 1A to the server tank 6W via the tube 84 and the tube 86, and the flow path from the main tank 17W of the printer 1B to the server tank 6W via the tube 85 and the tube 86 will be respectively referred to as a "circulation flow path." The side of the main tank 17W of the printer 1A or the printer 1B in the circulation flow path will be referred to as "upstream in the circulation flow path," and the side of the server tank 6W will be referred to as "downstream in the circulation flow path." For example, at a halfway point in the circulation flow path, the side of the main tank 17W of the printer 1A or the printer 1B is upstream in the circulation flow path and the side of the server tank 6W is downstream in the circulation flow path.

A supply pump 20, a supply valve 22, and a filter 24 are provided in the tube 82. A supply pump 21, a supply valve 23, and a filter 25 are provided in the tube 83. The supply pump 20 is positioned further upstream in the supply flow path than the point P2. The supply pump 21 is positioned further upstream in the supply flow path than the point P3.

As a result of being respectively driven by pump motors 201 and 211 shown in FIG. 12, the supply pumps 20 and 21 suck up the white ink from the server tank 6W via the tube 81. As a result of being driven by the pump motor 201 shown in FIG. 12, the supply pump 20 sends the sucked up white ink toward the main tank 17W of the printer 1A, via the tube 82. As a result of being driven by the pump motor 211 shown in FIG. 12, the supply pump 21 sends the sucked up white ink toward the main tank 17W of the printer 1B, via the tube 83.

Hereinafter, a state in which a valve is closed will be referred to as a "closed state," and a state in which valve is open will be referred to as an "open state." In the closed state, the valve causes the flow path to be in a blocked state. In the open state, the valve causes the flow path to be in a communicated state.

The supply valve 22 is positioned further upstream in the supply flow path than the supply pump 20. The supply valve 23 is positioned further upstream in the supply flow path than the supply pump 21. The supply valves 22 and 23 switch between the closed state and the open state as a result of being driven by solenoids 221 and 231 shown in FIG. 12, respectively. In the closed state, the supply valve 22 causes the tube 82 to be in the blocked state, and in the open state, causes the tube 82 to be in the communicated state. In the closed state, the supply valve 23 causes the tube 83 to be in the blocked state, and in the open state, causes the tube 83 to be in the communicated state.

The filter 24 is positioned further upstream in the supply flow path than the supply valve 22. The filter 25 is positioned further upstream in the supply flow path than the supply valve 23. The filters 24 and 25 are respectively configured by a non-woven fabric, a woven fabric, a resin film, or a porous metal piece, for example, and filter the liquid. In the white flow path W0, the filters 24 and 25 respectively filter the white ink.

A circulation pump 26 and a circulation valve 28 are provided in the tube 84. A circulation pump 27 and a circulation valve 29 are provided in the tube 85. As a result of being driven by a pump motor 261 shown in FIG. 12, the circulation pump 26 sucks up the white ink from the main tank 17W of the printer 1A, via a portion of the tube 82 further downstream in the supply flow path than the point P2. As a result of being driven by a pump motor 271 shown in FIG. 12, the circulation pump 27 sucks up the white ink from the main tank 17W of the printer 1B, via a portion of the tube 83 further downstream in the supply flow path than the point P3. As a result of being respectively driven by the pump motors 261 and 271 shown in FIG. 12, the circulation pumps 26 and 27 send the sucked up white ink toward server tank 6W, via the tube 86.

The circulation valve 28 is positioned further downstream in the supply flow path than the circulation pump 26. The circulation valve 29 is positioned further downstream in the circulation flow path than the circulation pump 27. The circulation valves 28 and 29 switch between the closed state and the open state as a result of being driven by solenoids 281 and 291 shown in FIG. 12, respectively. In the closed state, the circulation valve 28 causes the tube 84 to be in the blocked state, and in the open state, causes the tube 84 to be in the communicated state. In the closed state, the circulation valve 29 causes the tube 85 to be in the blocked state, and in the open state, causes the tube 85 to be in the communicated state.

As shown in FIG. 9, the color/pretreatment agent flow path S0 includes a first color/pretreatment agent flow path S1 and a second color/pretreatment agent flow path S2. Note that FIG. 9 shows the first color/pretreatment agent flow path S1 using solid lines and shows the second color/pretreatment agent flow path S2 using dotted lines. The first color/pretreatment agent flow path S1 corresponds to the first white flow path W1. The second color/pretreatment agent flow path S2 corresponds to the second white flow path W2.

The first color/pretreatment agent flow path S1 connects the server tank 6M and the respective main tanks 17M of the printers 1A and 1B to each other, connects the server tank 6C and the respective main tanks 17C of the printers 1A and 1B to each other, connects the server tank 6Y and the respective main tanks 17Y of the printers 1A and 1B to each other, connects the server tank 6K and the respective main tanks 17K of the printers 1A and 1B to each other, or connects the server tank 6CS and the respective main tanks 17CS of the printers 1A and 1B to each other. The first color/pretreatment agent flow path S1 is configured by the tubes 81, 82, and 83. In other words, the first color/pretreatment agent flow path S1 differs from the first white flow path W1 in not being provided with the tubes 84, 85, and 86.

The second color/pretreatment agent flow path S2 connects the server tank 6M and the respective main tanks 17M of the printers 1C and 1D to each other, connects the server tank 6C and the respective main tanks 17C of the printers 1C and 1D to each other, connects the server tank 6Y and the respective main tanks 17Y of the printers 1C and 1D to each other, connects the server tank 6K and the respective main tanks 17K of the printers 1C and 1D to each other, or connects the server tank 6CS and the respective main tanks 17CS of the printers 1C and 1D to each other.

The second color/pretreatment agent flow path S2 is configured by the tubes 81, 82, and 83. In other words, the second color/pretreatment agent flow path S2 differs from the second white flow path W2 in not being provided with the tubes 84, 85, and 86. The first color/pretreatment agent flow path S1 and the second color/pretreatment agent flow path S2 differ from each other in whether the connection destination from the liquid supply device 2 is one of the printer 1A and 1B, or the printer 1C and 1D.

In the above-described configuration, by causing one or both of the supply valves 22 and 23 to be in the open state and driving, of the supply pump 20 and the supply pump 21, the supply pump corresponding to the valve[s] in the open state, the liquid supply system 100 supplies the liquid from the liquid supply device 2 toward the printer 1 via the tube 8.

Hereinafter, an operation in which the liquid supply system 100 supplies the liquid from the liquid supply device 2 toward the printer 1 via the tube 8 will be referred to as an "inter supply device-printer supply operation." In the inter supply device-printer supply operation of the present embodiment, the liquid supply system 100 can supply the liquid from the plurality of server tanks 6 of the liquid supply device 2 to each of the plurality of main tanks 17 of the plurality of printers 1, via the tubes 8, in parallel or to one of the plurality of printers 1 at a time. In other words, in each of the supply flow paths to the plurality of printers 1, the plurality of server tanks 6 are positioned further upstream than each of the plurality of printers 1.

In a state in which one or both of the circulation valve 28 and the circulation valve 29 are in the open state, of the circulation pump 26 and the circulation pump 27, the liquid supply system 100 drives the supply pump corresponding to the valve[s] in the open state, and thus returns the liquid from the printer 1 toward the liquid supply device 2, via the tube 8.

Hereinafter, an operation in which the liquid supply system 100 returns the liquid from the printer 1 toward the liquid supply device 2 via the tube 8 will be referred to as an "inter supply device-printer return operation." In the inter supply device-printer return operation of the present embodiment, the liquid supply system 100 can return the liquid from the plurality of main tanks 17 of each of the plurality of printers 1 to the plurality of server tanks 6 of the liquid supply device 2, via the tubes 8, in parallel or from one of the plurality of printers 1 at a time.

By performing one of the inter supply device-printer supply operation or the inter supply device-printer return operation while the other operation is in progress, the liquid supply system 100 can circulate the liquid via the tubes 8 between the server tanks 6 of the liquid supply device 2 and the respective main tanks 17 of the plurality of printers 1, or can circulate the liquid from the server tanks 6 of the liquid supply device 2, via the tubes 8, further upstream in the supply flow path than the respective main tanks 17 of the plurality of printers 1. Alternatively, by performing one of the inter supply device-printer supply operation or the inter supply device-printer return operation after the other operation has been performed, the liquid supply system 100 can circulate the liquid between the server tanks 6 of the liquid supply device 2 and the respective main tanks 17 of the plurality of printers 1, via the tubes 8.

Hereinafter, an operation in which the liquid supply system 100 circulates the liquid between the liquid supply device 2 and the printer 1 via the tube 8 will be referred to as an "inter supply device-printer circulation operation." For example, the liquid supply system 100 may perform the inter supply device-printer supply operation between the server tank 6 and the main tank 17 of the printer 1A, and may perform the inter supply device-printer return operation between the server tank 6 and the main tank 17 of the printer 1B.

As an example of a flow of the liquid when the inter supply device-printer supply operation has been performed, a flow of the white ink from the liquid supply device 2 toward the printers 1A and 1B in the first white flow path W1 will be described. As shown in FIG. 10, when the white ink is supplied from the server tank 6W to the main tank 17W of the printer 1A, the white ink flows from the server tank 6W toward the main tank 17W of the printer 1A via the tube 81 and the tube 82 (refer to arrows A1). When the white ink is supplied from the server tank 6W to the main tank 17W of the printer 1B, the white ink flows from the server tank 6W toward the main tank 17W of the printer 1B via the tube 81 and the tube 83 (refer to arrows A2).

As an example of a flow of the liquid when the inter supply device-printer return operation has been performed, a flow of the white ink from the printers 1A and 1B toward the liquid supply device 2 in the first white flow path W1 will be described. As shown in FIG. 10, when the white ink is returned to the server tank 6W from the main tank 17W of the printer 1A, the white ink flows from the main tank 17W of the printer 1A toward the server tank 6W via the tube 82, the point P2, the tube 84, and the tube 86 (refer to arrows B1). When the white ink is returned to the server tank 6W from the main tank 17W of the printer 1B, the white ink flows from the main tank 17W of the printer 1B toward the server tank 6W via the tube 83, the point P3, the tube 85, and the tube 86 (refer to arrows B2).

Both when the white ink is supplied from the server tank 6W to the main tank 17W of the printer 1A, and when the white ink is returned to the server tank 6W from the main tank 17W of the printer 1A, the white ink flows through a portion of the tube 82 further downstream in the supply flow path than the point P2. Both when the white ink is supplied from the server tank 6W to the main tank 17W of the printer 1B, and when the white ink is returned to the server tank 6W from the main tank 17W of the printer 1B, the white ink flows through a portion of the tube 83 further downstream in the supply flow path than the point P3.

A case will be described in which the inter supply device-printer supply operation and the inter supply device-printer return operation are simultaneously performed in the first white flow path W1, between the server tank 6W and the main tank 17W of the printer 1A. In this case, the white ink flows from the server tank 6W toward the main tank 17W of the printer 1A via the tube 81 and the tube 82. While flowing from the server tank 6W toward the main tank 17W of the printer 1A, at the point P2, the white ink flows from the tube 82 into the tube 84. The white ink flows from the tube 84 toward the server tank 6W via the tube 86. Note that, during the performing of the inter supply device-printer supply operation and the inter supply device-printer return operation, some of the white ink may flow from the point P2 toward the main tank 17W of the printer 1A, or may flow from the main tank 17W of the printer 1A toward the point P2.

The liquid supply system 100 performs the inter supply device-printer circulation operation in the white flow path W0, for example. In this way, the liquid supply system 100 suppresses the white ink from settling inside the server tank 6W and in the first white flow path W1, or in the server tank 6W, in the second white flow path W2, and in the respective main tanks 17W of the printers 1A and 1B. For example, in the white flow path W0, when the liquid circulates via the tubes 8 between the server tank 6W of the liquid supply device 2 and the respective main tanks 17W of the plurality of printers 1A, 1B, 1C, and 1D, the liquid supply system 100 also suppresses the white ink from settling inside the respective main tanks 17W of the printers 1A, 1B, 1C, and 1D.

<Electrical Configuration of Printer 1>

Figure 11:
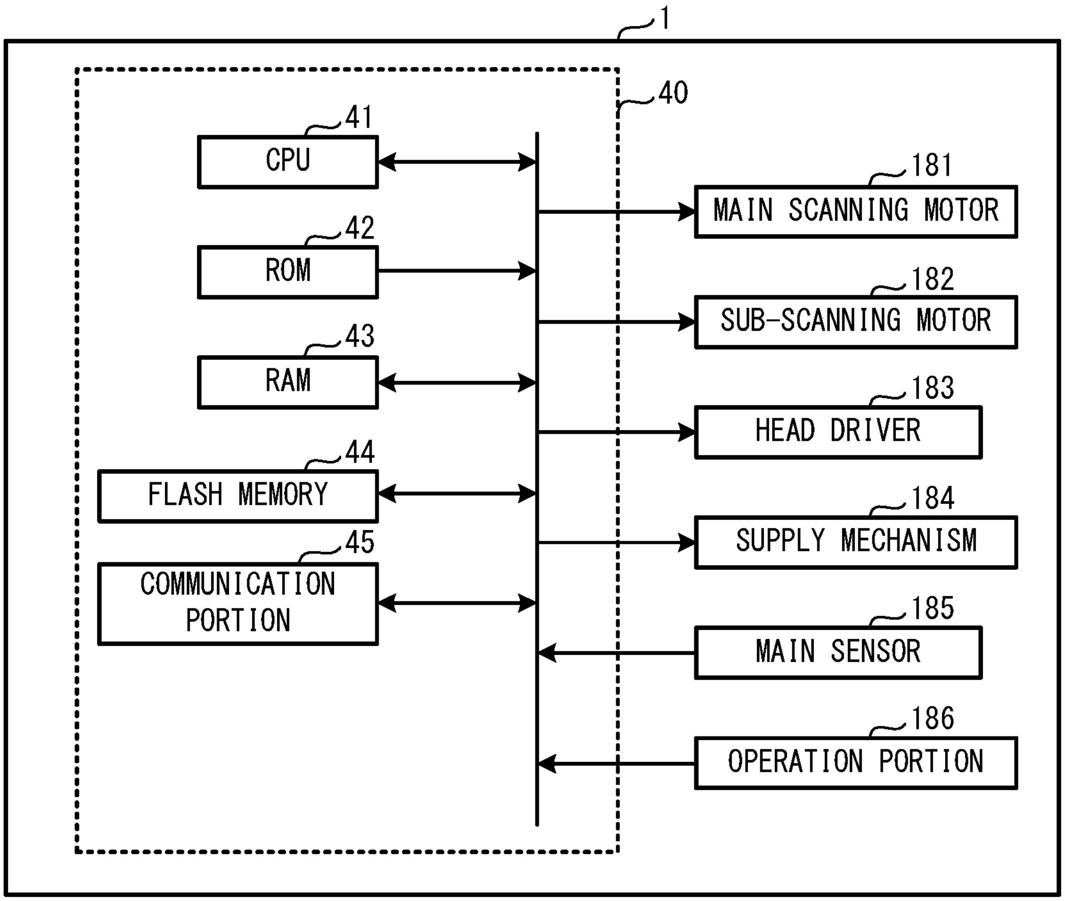
FIG. 11 is a block diagram showing an electrical configuration of a printer.

As shown in FIG. 11, the printer 1 is provided with a control device 40. The control device 40 is fixed to the frame body 10 and is provided with a CPU 41, a ROM 42, a RAM 43, a flash memory 44, and a communication portion 45. The CPU 41 controls the printer 1, and functions as a processor. The CPU 41 controls the pretreatment processing and the print processing, for example. The CPU 41 is electrically connected to the ROM 42, the RAM 43, the flash memory 44, and the communication portion 45.

The ROM 42 stores a control program for the CPU 41 to control operations of the printer 1, information necessary for the CPU 41 when executing various programs, and the like. The RAM 43 temporarily stores various data and the like used by the control program. The flash memory 44 is non-volatile, and stores calibration data of main sensors 185 to be described later, and the like. The communication portion 45 is a controller for communicating, in a wired or wireless manner with an external device. The CPU 41 communicates with the liquid supply device 2, for example, using the communication portion 45.

The main scanning motor 181, the sub-scanning motor 182, the head driver 183, the supply mechanism 184, the plurality of main sensors 185, and an operation portion 186 are electrically connected to the CPU 41. The main scanning motor 181, the sub-scanning motor 182, the head driver 183, and the supply mechanism 184 are driven by control of the CPU 41.

The plurality of main sensors 185 are respectively provided in the plurality of main tanks 17 shown in FIG. 1. The plurality of main sensors 185 are pressure sensors, for example. Each of the plurality of main sensors 185 detects a main remaining amount by detecting a pressure inside each of the main tanks 17. The main remaining amount is a remaining amount of the liquid inside the main tank 17. A signal indicating the main remaining amount detected by the main sensor 185 is output to the CPU 41.

The operation portion 186 is a touch panel display or the like, displays various information, and outputs information to the CPU 41 in accordance with an operation by the user. By operating the operation portion 186, the user can input, to the printer 1, a print command for starting printing by the printer 1 and the like.

<Electrical Configuration of Liquid Supply Device 2>

As shown in FIG. 12, a control device 50 is provided with a CPU 51, a ROM 52, a RAM 53, a flash memory 54, and a communication portion 55. The CPU 51 controls the liquid supply device 2, and functions as a processor. The CPU 51 is electrically connected to the ROM 52, the RAM 53, the flash memory 54, and the communication portion 55.

The ROM 52 stores a control program for the CPU 51 to control operations of the liquid supply device 2, information necessary for the CPU 51 when executing various programs, and the like. The RAM 53 temporarily stores various data and the like used by the control program. The flash memory 54 is non-volatile, and stores calibration data of the server sensors 71, and the like. The communication portion 55 is a controller for communicating, in a wired or wireless manner with an external device. The CPU 51 communicates with each of the printers 1A, 1B, 1C, and 1D, for example, via the communication portion 55.

The agitation motor 963, the pump motors 201, 211, 261, and 271, the solenoids 221, 231, 281, and 291, the plurality of open/closed sensors 38, the plurality of server sensors 71, the display 56, the operation portion 57, the warning light 58, and a speaker 59 are electrically connected to the CPU 51.

The agitation motor 963, the pump motors 201, 211, 261, and 271, the solenoids 221, 231, 281, and 291, the display 56, the warning light 58, and the speaker 59 are driven by control of the CPU 51.

The plurality of open/closed sensors 38 respectively detect the movable plate 35, in the main unit 3A and the sub-unit 3B, when the movable plate 35 is positioned at the open position shown in FIG. 2 (refer to the main unit 3A shown in FIG. 2). When the open/closed sensor 38 detects the movable plate 35, a signal indicating that the movable plate 35 is positioned at the open position is output to the CPU 51.

The plurality of server sensors 71 respectively detect the server remaining amounts, using as a reference, for example, the weight of the empty server tank 6 to which the mount mechanism 9 (refer to FIG. 3) is mounted, by detecting the weights of the server tanks 6 (refer to FIG. 3) placed on the plurality of server sensors 71. A signal indicating the server remaining amount detected by the server sensor 71 is output to the CPU 51. Note that the weight of each of the server tanks 6 placed on the plurality of server sensors 71 refers to the total weight of the server tank 6, the liquid inside the server tank 6, and the mount mechanism 9 mounted to the server tank 6.

<Main Processing>

Figure 13:
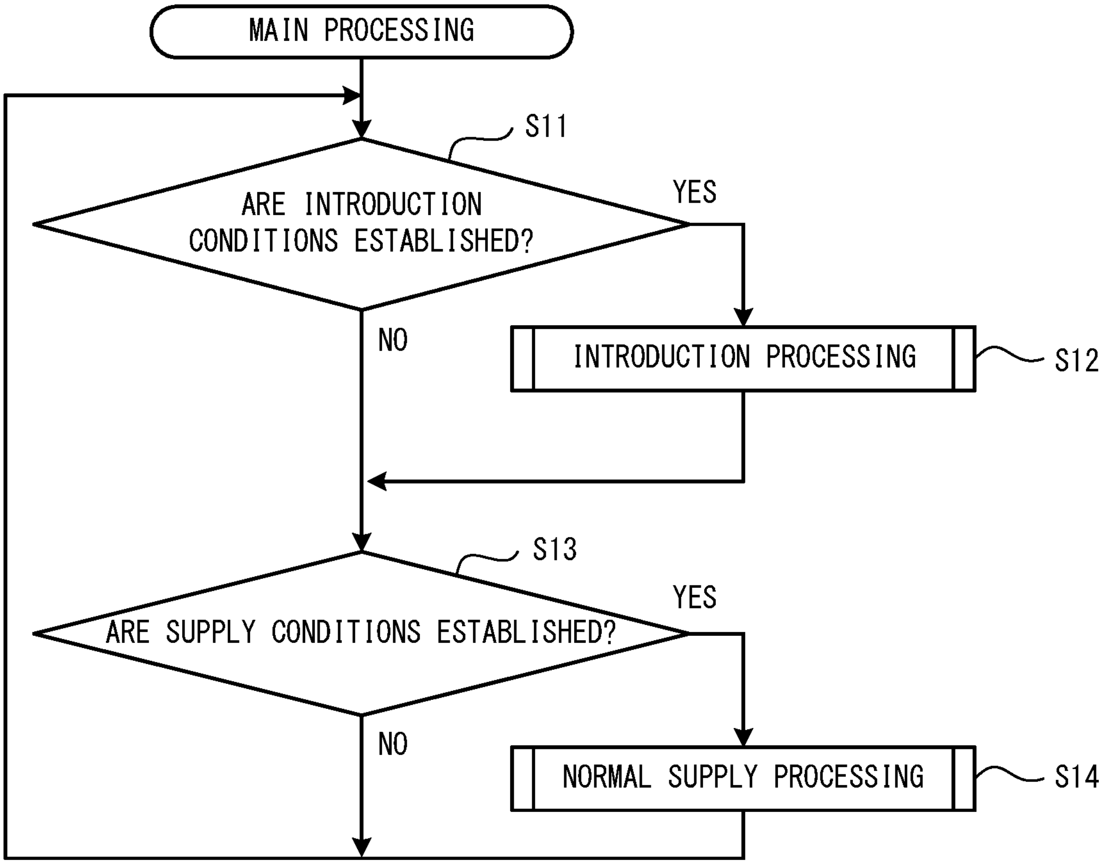
FIG. 13 is a flowchart of main processing.

When a power supply to the liquid supply device 2 is switched on, for example, by reading out and operating the control program from the ROM 52, the CPU 51 performs main processing shown in FIG. 13. In the main processing, the CPU 51 performs control relating to the inter supply device-printer supply operation, for each of the color/pretreatment agent flow path S0, and the white flow path W0. In the main processing, the CPU 51 performs control relating to the inter supply device-printer circulation operation, for the white flow path W0. Hereinafter, at the start of the main processing, it is assumed that the supply valves 22 and 23, and the circulation valves 28 and 29 are all in the closed state.

Hereinafter, of the respective plurality of main tanks 17 of the plurality of printers 1, the main tank 17 that is the target of the inter supply device-printer supply operation or the inter supply device-printer circulation operation will be referred to as a "target main tank." The server tank 6 corresponding to the target main tank will be referred to as a "target tank." When the target main tanks are the main tanks 17W, 17M, 17C, 17Y, 17K, and 17CS, the target tanks are, respectively, the server tanks 6W, 6M, 6C, 6Y, 6K, and 6CS.

In each of the white flow path W0 and the color/pretreatment agent flow paths S0, of the supply pumps 20 and 21, the supply pump corresponding to the target main tank will be referred to as a "target supply pump." In each of the white flow path W0 and the color/pretreatment agent flow paths S0, of the supply valves 22 and 23, the supply valve corresponding to the target main tank will be referred to as a "target supply valve." In the white flow path W0, of the circulation pumps 26 and 27, the circulation pump corresponding to the target main tank will be referred to as a "target circulation pump." In the white flow path, of the circulation valves 28 and 29, the circulation valve corresponding to the target main tank will be referred to as a "target circulation valve."

For example, when the target main tank is the main tank 17W of the printer 1A, the target supply pump, the target supply valve, the target circulation pump and the target circulation valve are, respectively, the supply pump 20, the supply valve 22, the circulation pump 26, and the circulation valve 28 of the first white flow path W1. When the target main tank is the main tank 17W of the printer 1B, the target supply pump, the target supply valve, the target circulation pump and the target circulation valve are, respectively, the supply pump 21, the supply valve 23, the circulation pump 27, and the circulation valve 29 of the first white flow path W1. When the target main tank is the main tank 17W of the printer 1C, the target supply pump, the target supply valve, the target circulation pump and the target circulation valve are, respectively, the supply pump 20, the supply valve 22, the circulation pump 26, and the circulation valve 28 of the second white flow path W2. When the target main tank is the main tank 17W of the printer 1D, the target supply pump, the target supply valve, the target circulation pump and the target circulation valve are, respectively, the supply pump 21, the supply valve 23, the circulation pump 27, and the circulation valve 29 of the second white flow path W2.

Hereinafter, a state in which the main remaining amount of the main tank 17W of the printer 1 is empty will be referred to as an "initial state of the main tank 17W." For example, at a time of shipment from the factory of the printer 1, the main tank 17W of the printer 1 is in the initial state. For example, when the main tank 17W of the printer 1 is replaced with the new main tank 17W, the new main tank 17W is in the initial state.

As shown in FIG. 13, when the main processing is started, the CPU 51 determines whether or not introduction conditions for performing the inter supply device-printer circulation operation are established, for the main tanks 17W of each of the printers 1 shown in FIG. 9 (step S11). Hereinafter, when the main tank 17W is in the initial state, the inter supply device-printer circulation operation performed between the server tank 6W and the main tank 17W in the initial state will be referred to as an "introduction operation." For example, the CPU 51 determines the establishment of the introduction conditions on the basis of an introduction request or an introduction command.

A case will be described in which the CPU 51 determines the establishment of the introduction conditions on the basis of the introduction request. In this case, the user operates the operation portion 186 shown in FIG. 11, and inputs, to the printer 1, the introduction command for performing the introduction operation. When the user inputs the introduction command to the printer 1, the CPU 41 transmits, to the liquid supply device 2, the introduction request for performing the introduction operation. In the liquid supply device 2, the CPU 51 determines that the introduction conditions are established when the CPU 51 receives the introduction request from the printer 1.

A case will be described in which the CPU 51 determines the establishment of the introduction conditions on the basis of the introduction command. In this case, the user operates the operation portion 57 shown in FIG. 12, and inputs the introduction command to the liquid supply device 2. When the CPU 51 acquires the introduction command via the operation portion 57 shown in FIG. 12, the CPU 51 determines that the introduction conditions are established.

When the main tank 17W of one of the plurality of printers 1 is in the initial state, for example, the user inputs the introduction command to the printer 1 or the liquid supply device 2. The introduction command includes information specifying the main tank 17W that is in the initial state, of the plurality of printers 1, for example. In this case, by the introduction command, the specified main tank 17W of the printer 1 becomes the target main tank.

When, for any one of the main tanks 17W of the plurality of printers 1 shown in FIG. 9, the introduction conditions are not established (no at step S11), the CPU 51 shifts the processing to the processing at step S13. When, for any one of the main tanks 17W of the plurality of printers 1 shown in FIG. 9, the introduction conditions are established (yes at step S11), the CPU 51 performs introduction processing (step S12). In the introduction processing, the introduction operation is controlled for the flow paths corresponding to the target main tank. When the introduction processing ends, the CPU 51 shifts the processing to the processing at step S13.

For each of the main tanks 17 of each of the printers 1 shown in FIG. 9, the CPU 51 determines whether or not supply conditions for performing the inter supply device-printer supply operation are established (step S13). For example, the CPU 51 determines the establishment of the supply conditions on the basis of a supply request, a supply command, the main remaining amount, and the like.

A case will be described in which the CPU 51 determines the establishment of the supply conditions on the basis of the supply request. In this case, when the CPU 51 acquires the supply request from the printer 1 for performing the inter supply device-printer supply operation, the CPU 51 determines that the supply conditions are established.

For example, in the printer 1, the CPU 41 may transmit the supply request to the liquid supply device 2 when the main remaining amount of one of the plurality of main tanks 17 has become equal to or less than a first predetermined remaining amount. In this case, the first predetermined remaining amount is stored in advance in the flash memory 44, for example. In the printer 1, the CPU 41 may transmit the supply request to the liquid supply device 2 when a decrease amount of the main remaining amount of one of the plurality of main tanks 17 has become equal to or greater than a predetermined decrease amount. In this case, the predetermined decrease amount is stored in advance in the flash memory 44, for example. In the printer 1, the CPU 41 may transmit the supply request to the liquid supply device 2 when the user operates the operation portion 186 shown in FIG. 11 and inputs, to the printer 1, the supply command for performing the inter supply device-printer supply operation.

A case will be described in which the CPU 51 determines the establishment of the supply conditions on the basis of the supply command. In this case, in the liquid supply device 2, the user operates the operation portion 57 shown in FIG. 12, and inputs the supply command to the liquid supply device 2. When the CPU 51 acquires the supply command via the operation portion 57 shown in FIG. 12, the CPU 51 determines that the supply conditions are established.

A case will be described in which the CPU 51 determines the establishment of the supply conditions on the basis of the main remaining amount. In this case, in the printer 1, the CPU 41 may sequentially transmit the main remaining amount to the liquid supply device 2 on the basis of the signal from the main sensor 185 shown in FIG. 11. The CPU 51 may be electrically connected to the main sensor 185 shown in FIG. 11. In this case, the CPU 51 may acquire the main remaining amount on the basis of the signal from the main sensor 185 shown in FIG. 11.

The CPU 51 may determine that the supply conditions are established when the main remaining amount acquired from the printer 1 or the main sensor 185 has become equal to or less than the first predetermined remaining amount. In this case, the first predetermined remaining amount is stored in advance in the flash memory 54, for example. The CPU 51 may determine that the supply conditions are established when, on the basis of the main remaining amount acquired from the printer 1 or the main sensor 185, the decrease amount of the main remaining amount has become equal to or greater than the predetermined decrease amount. In this case, the predetermined decrease amount is stored in advance in the flash memory 54, for example.

The supply command includes, for example, information specifying one of the respective main tanks 17 of the plurality of printers 1. In this case, by the supply command, the specified main tank 17 of the printer 1 becomes the target main tank.

When, for any one of the main tanks 17 of each of the printers 1, the supply conditions are established (yes at step S13), the CPU 51 performs normal supply processing (step S14). In the normal supply processing, the CPU 51 controls the inter supply device-printer supply operation for the flow paths corresponding to the target main tank. When the normal supply processing ends, the CPU 51 returns the processing to the processing at step S11.

<Introduction Processing>

The introduction processing performed at step S12 shown in FIG. 13 will be described. Hereinafter, the introduction processing will be described while using as an example, as appropriate, a flow of the white ink when the main tank 17W of the printer 1A shown in FIG. 17 to FIG. 20 is the target main tank. Note that, in order to simplify the description, FIG. 17 to FIG. 20 simplify the configuration of the tubes 8, and show the configuration in which the server tank 6W and the main tank 17W are connected to each other by each of the tubes 82 and 84. FIG. 17 to FIG. 20 show the white ink using diagonal lines (this also applies to FIG. 25 to FIG. 31). "L" in FIG. 17 to FIG. 20 indicates liters (this also applies to FIG. 25 to FIG. 31). An amount of the white ink filling the whole of the inside of the tube 82 is 0.5 liters. An amount of the white ink filling the whole of the inside of the tube 84 is 0.5 liters. The amounts of white ink filling the whole of the insides of the tubes 82 and 84 are the same as the capacities of the tubes 82 and 84, respectively.

Figure 14:
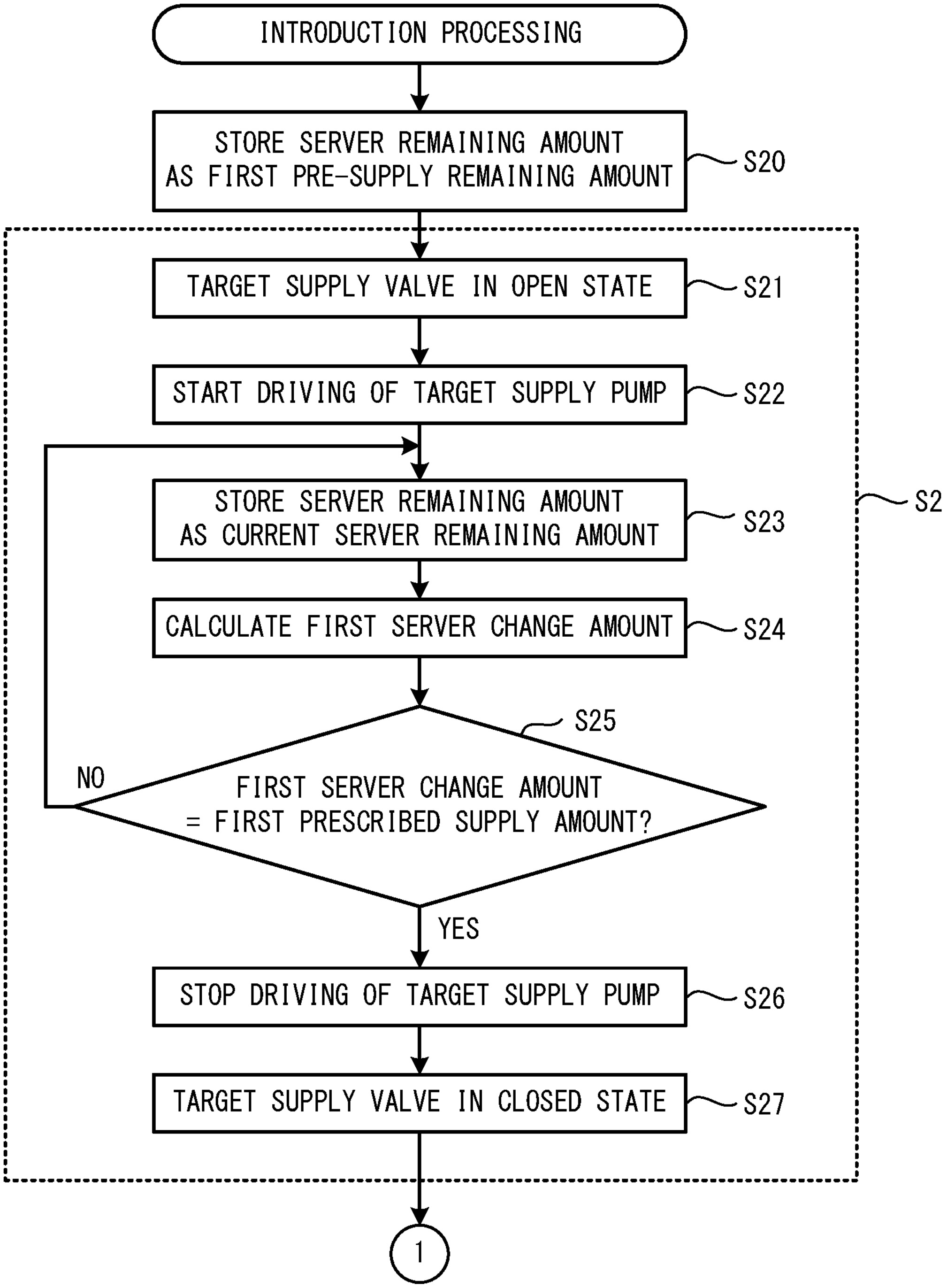
FIG. 14 is a flowchart of introduction processing.

As shown in FIG. 14, when the introduction processing is started, the CPU 51 acquires the server remaining amount of the server tank 6W from the server sensor 71 (refer to FIG. 12) of the server tank 6W, and stores the acquired server remaining amount of the server tank 6W in the RAM 53 as a first pre-supply remaining amount (step S20). The first pre-supply remaining amount is the server remaining amount of the server tank 6W before the start of first supply processing (step S2) to be described later, in the introduction processing.

Figure 17:
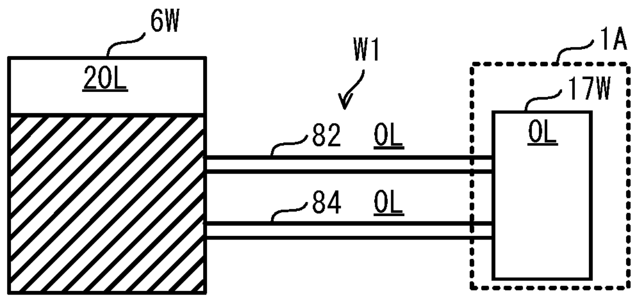
FIG. 17 is a view showing a relationship between the server remaining amount of the server tank and the main remaining amount of the main tank of the printer at a start of introduction processing, when a target main tank is the main tank of the printer.

As shown in FIG. 17, the server remaining amount of the server tank 6W at the start of the introduction processing is 20 liters, for example. In this case, the first pre-supply remaining amount is 20 liters. At the start of the introduction processing, the main tank 17W of the printer 1A is in the initial state, and thus, the main remaining amount of the main tank 17W of the printer 1A is zero liters. The amounts of white ink inside the tubes 82 and 82 are zero liters, respectively.

As shown in FIG. 14, the CPU 51 performs processing at step S21 to step S27 as the first supply processing (step S2). The first supply processing is, collectively, the processing at step S21 to step S27. The CPU 51 controls the inter supply device-printer supply operation in the first supply processing. When the first supply processing is started, the CPU 51 controls the solenoid, of the solenoids 221 and 231 shown in FIG. 12, corresponding to the target supply valve, and causes the target supply valve to be in the open state (step S21). In this state, the CPU 51 controls the pump motor, of the pump motors 201 and 211 shown in FIG. 12, corresponding to the target supply pump, and starts the driving of the target supply pump (step S22).

Figure 18:
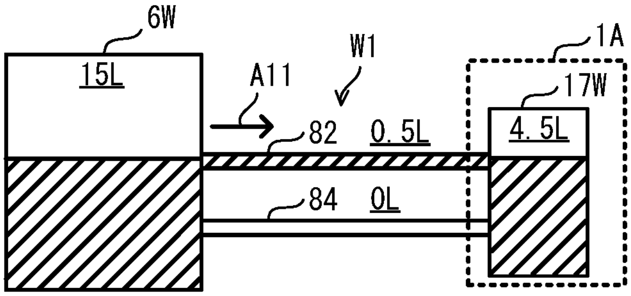
FIG. 18 is a view showing a relationship between the server remaining amount of the server tank and the main remaining amount of the main tank of the printer at an end of first supply processing, when a target main tank is the main tank of the printer.

By the processing at step S22, the white ink is supplied from the server tank 6W to the target main tank (refer to arrows A11 shown in FIG. 18). The CPU 51 performs processing at step S23, step S24, and step S25 described below while driving the target supply pump.

The CPU 51 acquires the server remaining amount of the server tank 6W from the server sensor 71 (refer to FIG. 12) of the server tank 6W, and stores the acquired server remaining amount of the server tank 6W in the RAM 53 as a current server remaining amount (step S23). The CPU 51 calculates a first server change amount, using a difference between the first pre-supply remaining amount stored by the processing at step S20 and the current server remaining amount stored by the processing at step S23 (step S24).

The first server change amount indicates the change amount of the server remaining amount of the server tank 6W from a time point of the processing at step S20 to a time point of the processing at step S24. The first server change amount indicates an amount of the white ink supplied from the server tank 6W toward the target main tank in the first supply processing, at the time point of the processing at step S24.

The CPU 51 determines whether or not the first server change amount calculated by the processing at step S24 has reached a first prescribed supply amount (step S25). The first prescribed supply amount is greater than zero liters, and is equal to or less than a maximum capacity of the white ink that can be stored by the main tank 17W, for example. The first prescribed supply amount is, for example, greater than one of an amount of liquid necessary to fill the inside of the tubes 81 and 82, or an amount of liquid necessary to fill the tubes 81 and 83, in each of the first white flow path W1 and the second white flow path W2. The first prescribed supply amount is stored in advance in the flash memory 54, for example.

When the first server change amount is less than the first prescribed supply amount (no at step S25), the CPU 51 returns the processing to the processing at step S23. When the first server change amount has reached the first prescribed supply amount (yes at step S25), the CPU 51 controls the pump motor, of the pump motors 201 and 211 shown in FIG. 12, corresponding to the target supply pump, and stops the driving of the target supply pump (step S26). The CPU 51 controls the solenoid, of the solenoids 221 and 231 shown in FIG. 12, corresponding to the target supply valve, and causes the target supply valve to be in the closed state (step S27). In this way, the CPU 51 ends the first supply processing (step S2).

As shown in FIG. 18, the first prescribed supply amount is 5 liters, for example. In this case, as a result of the first supply processing, the server remaining amount of the server tank 6W decreases from 20 liters by 5 liters corresponding to the first prescribed supply amount, and becomes 15 liters. Of the 5 liter decrease, 0.5 liters of the white ink fills the inside of the tube 82. Thus, of the 5 liter decrease, 4.5 liters is the main remaining amount of the main tank 17W of the printer 1A.

Figure 15:
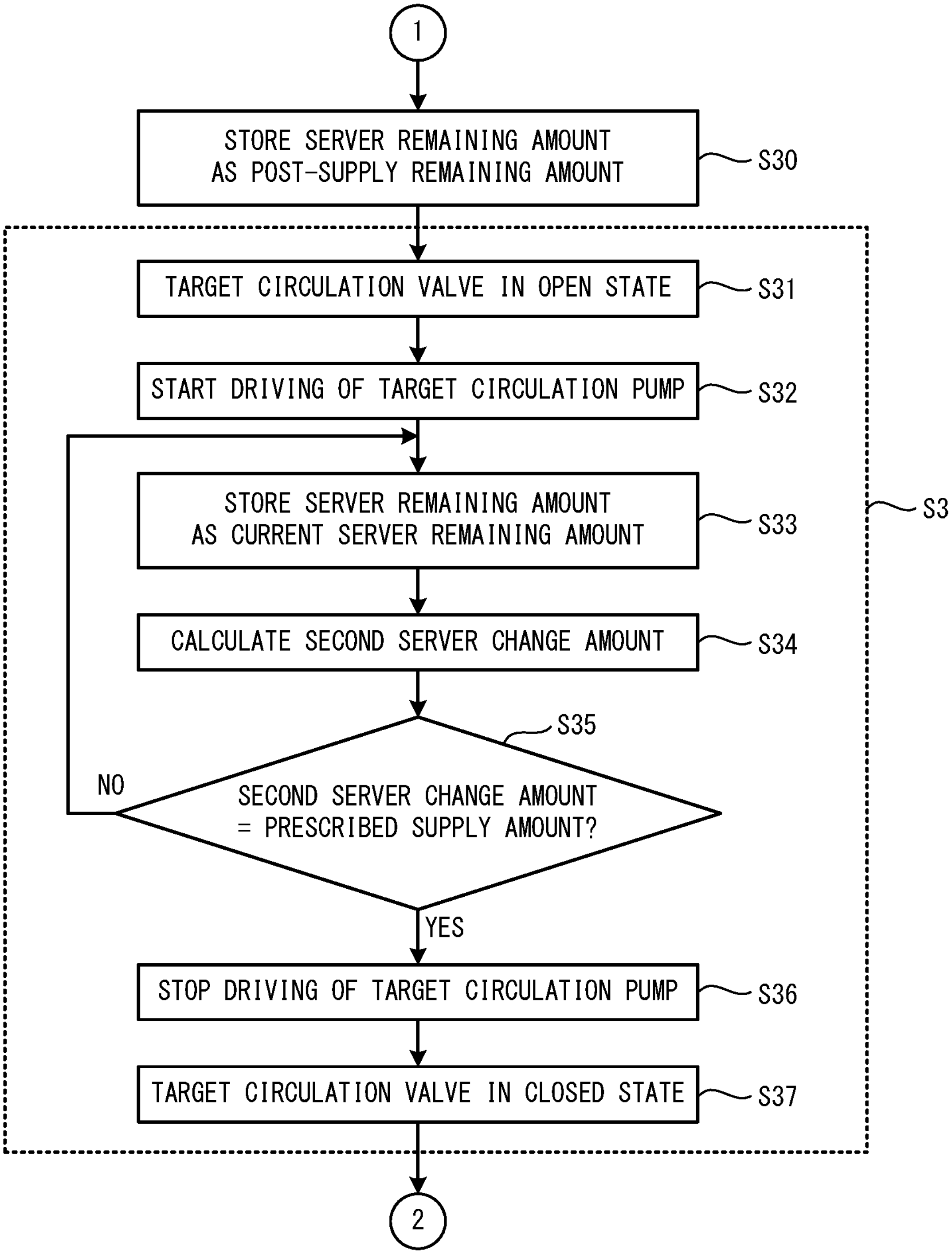
FIG. 15 is a flowchart of the introduction processing.

As shown in FIG. 15, the CPU 51 acquires the server remaining amount of the server tank 6W from the server sensor 71 (refer to FIG. 12) of the server tank 6W, and stores the acquired server remaining amount of the server tank 6W in the RAM 53 as a post-supply remaining amount (step S30). The post-supply remaining amount is the server remaining amount of the server tank 6W before the start of the return processing (step S3) to be described later, in the introduction processing. The CPU 51 performs processing at step S31 to step S37 as the return processing (step S3). The return processing is, collectively, the processing at step S31 to step S37. In the return processing, the CPU 51 controls the inter supply device-printer return operation.

When the return processing is started, the CPU 51 controls the solenoid, of the solenoids 281 and 291 shown in FIG. 12, corresponding to the target circulation valve, and causes the target circulation valve to be in the open state (step S31). In this state, the CPU 51 controls the pump motor, of the pump motors 261 and 271 shown in FIG. 12, corresponding to the target circulation pump, and starts the driving of the target circulation pump (step S32).

Figure 19:
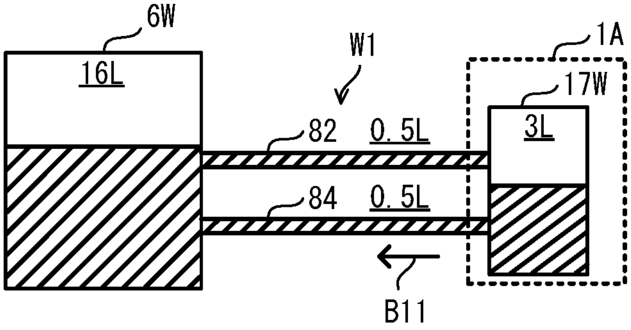
FIG. 19 is a view showing a relationship between the server remaining amount of the server tank and the main remaining amount of the main tank of the printer at an end of return processing, when a target main tank is the main tank of the printer.

By the processing at step S32, the white ink is returned from the target main tank to the server tank 6W (refer to arrows B11 shown in FIG. 19). The CPU 51 performs processing at step S63, step S64, and step S65 described below while driving the target circulation pump.

The CPU 51 acquires the server remaining amount of the server tank 6W from the server sensor 71 (refer to FIG. 12) of the server tank 6W, and stores the acquired server remaining amount of the server tank 6W in the RAM 53 as the current server remaining amount (step S33). The CPU 51 calculates a second server change amount, using a difference between the post-supply remaining amount stored by the processing at step S30 and the current server remaining amount stored by the processing at step S33 (step S34).

The second server change amount indicates the change amount of the server remaining amount of the server tank 6W from a time point of the processing at step S30 to a time point of the processing at step S34. The second server change amount indicates the amount of the white ink returned from the target main tank to the server tank 6W in the return processing, at the time point of the processing at step S34.

The CPU 51 determines whether or not the second server change amount calculated by the processing at step S34 has reached a prescribed circulation amount (step S35). The prescribed circulation amount is greater than zero liters, and equal to or less than the maximum capacity of the white ink that can be stored by the main tank 17W, for example. For example, the prescribed circulation amount is greater than both the amount of liquid necessary to fill the inside of the tube 84 and the amount of liquid necessary to fill the inside of the tube 85 in each of the first white flow path W1 and the second white flow path W2. In the present embodiment, the prescribed circulation amount is less than the first prescribed supply amount. The prescribed circulation amount may be stored in advance in the flash memory 54, for example.

When the second server change amount is less than the prescribed circulation amount (no at step S35), the CPU 51 returns the processing to the processing at step S33. When the second server change amount has reached the prescribed circulation amount (yes at step S35), the CPU 51 controls the pump motor, of the pump motors 261 and 271 shown in FIG. 12, corresponding to the target circulation pump, and stops the driving of the target circulation pump (step S36). The CPU 51 controls the solenoid, of the solenoids 281 and 291 shown in FIG. 12, corresponding to the target circulation valve, and causes the target circulation valve to be in the closed state (step S37). In this way, the CPU 51 ends the return processing (step S3).

As shown in FIG. 19, the prescribed circulation amount is 1 liter, for example. In this case, by the return processing, the server remaining amount of the server tank 6W increases from 15 liters by the 1 liter corresponding to the prescribed circulation amount, and becomes 16 liters. 0.5 liters of the white ink fills the inside of the tube 84. Thus, the main remaining amount of the main tank 17W of the printer 1A decreases from 4.5 liters by the 1 liter corresponding to the prescribed circulation amount and by the 0.5 liters for filling the tube 84, and becomes 3 liters.

Figure 16:
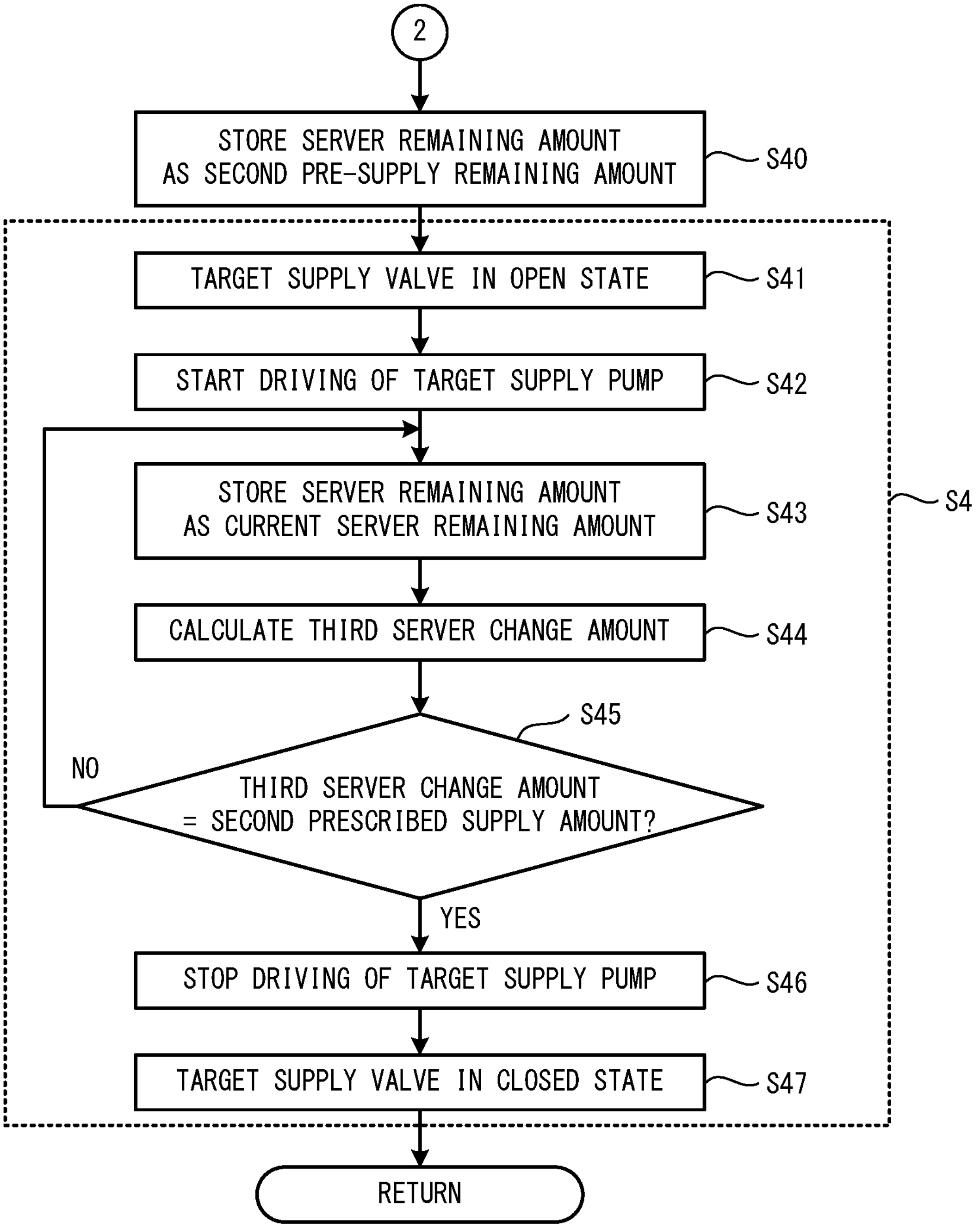
FIG. 16 is a flowchart of the introduction processing.

As shown in FIG. 16, the CPU 51 acquires the server remaining amount of the server tank 6W from the server sensor 71 (refer to FIG. 12) of the server tank 6W, and stores the acquired server remaining amount of the server tank 6W in the RAM 53 as a second pre-supply remaining amount (step S40). The second pre-supply remaining amount is the server remaining amount of the server tank 6W before the start of second supply processing (step S4), to be described later, in the introduction processing.

The CPU 51 performs processing at steps S41 to step S47 as the second supply processing (step S4). The second supply processing is, collectively, the processing at step S41 to step S47. In the second supply processing, the CPU 51 controls the inter supply device-printer supply operation. When the second supply processing is started, the CPU 51 controls the solenoid, of the solenoids 221 and 231 shown in FIG. 12, corresponding to the target supply valve, and causes the target supply valve to be in the open state (step S41). In this state, the CPU 51 controls the pump motor, of the pump motors 201 and 211 shown in FIG. 12, corresponding to the target supply pump, and starts the driving of the target supply pump (step S42).

Figure 20:
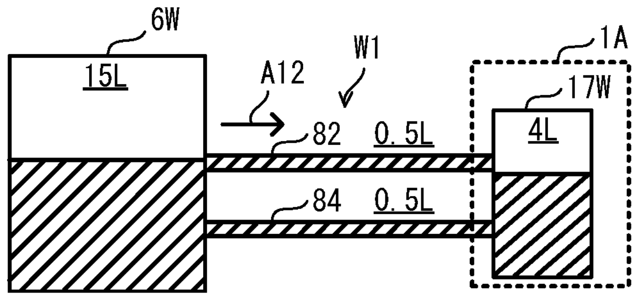
FIG. 20 is a view showing a relationship between the server remaining amount of the server tank and the main remaining amount of the main tank of the printer at an end of second supply processing, when a target main tank is the main tank of the printer.

By the processing at step S42, the white ink is supplied from the server tank 6W to the target main tank (refer to arrows A12 shown in FIG. 20). The CPU 51 performs processing at step S43, step S44, and step S45 described below while driving the target supply pump.

The CPU 51 acquires the server remaining amount of the server tank 6W from the server sensor 71 (refer to FIG. 12) of the server tank 6W, and stores the acquired server remaining amount of the server tank 6W in the RAM 53 as a current server remaining amount (step S43). The CPU 51 calculates a third server change amount, using a difference between the second pre-supply remaining amount stored by the processing at step S40 and the current server remaining amount stored by the processing at step S43 (step S44).

The third server change amount indicates the change amount of the server remaining amount of the server tank 6W from a time point of the processing at step S40 to a time point of the processing at step S44. The third server change amount indicates an amount of the white ink supplied from the server tank 6W toward the target main tank in the second supply processing, at the time point of the processing at step S44.

The CPU 51 determines whether or not the third server change amount calculated by the processing at step S44 has reached a second prescribed supply amount (step S45). The second prescribed supply amount is greater than zero liters, and is equal to or less than a maximum capacity of the white ink that can be stored by the main tank 17W, for example. The second prescribed supply amount is stored in advance in the flash memory 54, for example. In the present embodiment, the second prescribed supply amount is the same as the prescribed circulation amount, and is less than the first prescribed supply amount.

When the third server change amount is less than the second prescribed supply amount (no at step S45), the CPU 51 returns the processing to the processing at step S43. When the third server change amount has reached the second prescribed supply amount (yes at step S45), the CPU 51 controls the pump motor, of the pump motors 201 and 211 shown in FIG. 12, corresponding to the target supply pump, and stops the driving of the target supply pump (step S46). The CPU 51 controls the solenoid, of the solenoids 221 and 231 shown in FIG. 12, corresponding to the target supply valve, and causes the target supply valve to be in the closed state (step S47). In this way, the CPU 51 ends the second supply processing (step S4). The CPU 51 returns the processing to the main processing shown in FIG. 13.

As described above, in the introduction processing, the CPU 51 performs the first supply processing (step S2), the return processing (step S3), and the second supply processing (step S4) as a flow in series. In the introduction processing, the CPU 51 alternately performs the inter supply device-printer supply operation by the first supply processing or the second supply processing, and the inter supply device-printer return operation by the return processing. Furthermore, the CPU 51 ends the introduction processing without performing the inter supply device-printer return operation after performing the inter supply device-printer supply operation.

As shown in FIG. 20, the second prescribed supply amount is 1 liter, for example. In this case, as a result of the second supply processing, the server remaining amount of the server tank 6W decreases from 16 liters by 1 liter corresponding to the second prescribed supply amount, and becomes 15 liters. Since the white ink is already filling the inside of the tube 82, the main remaining amount of the main tank 17W of the printer 1A increases from 3 liters by the 1 liter corresponding to the decrease from the server tank 6W, and becomes 4 liters.

<Normal Supply Processing>

Figure 21:
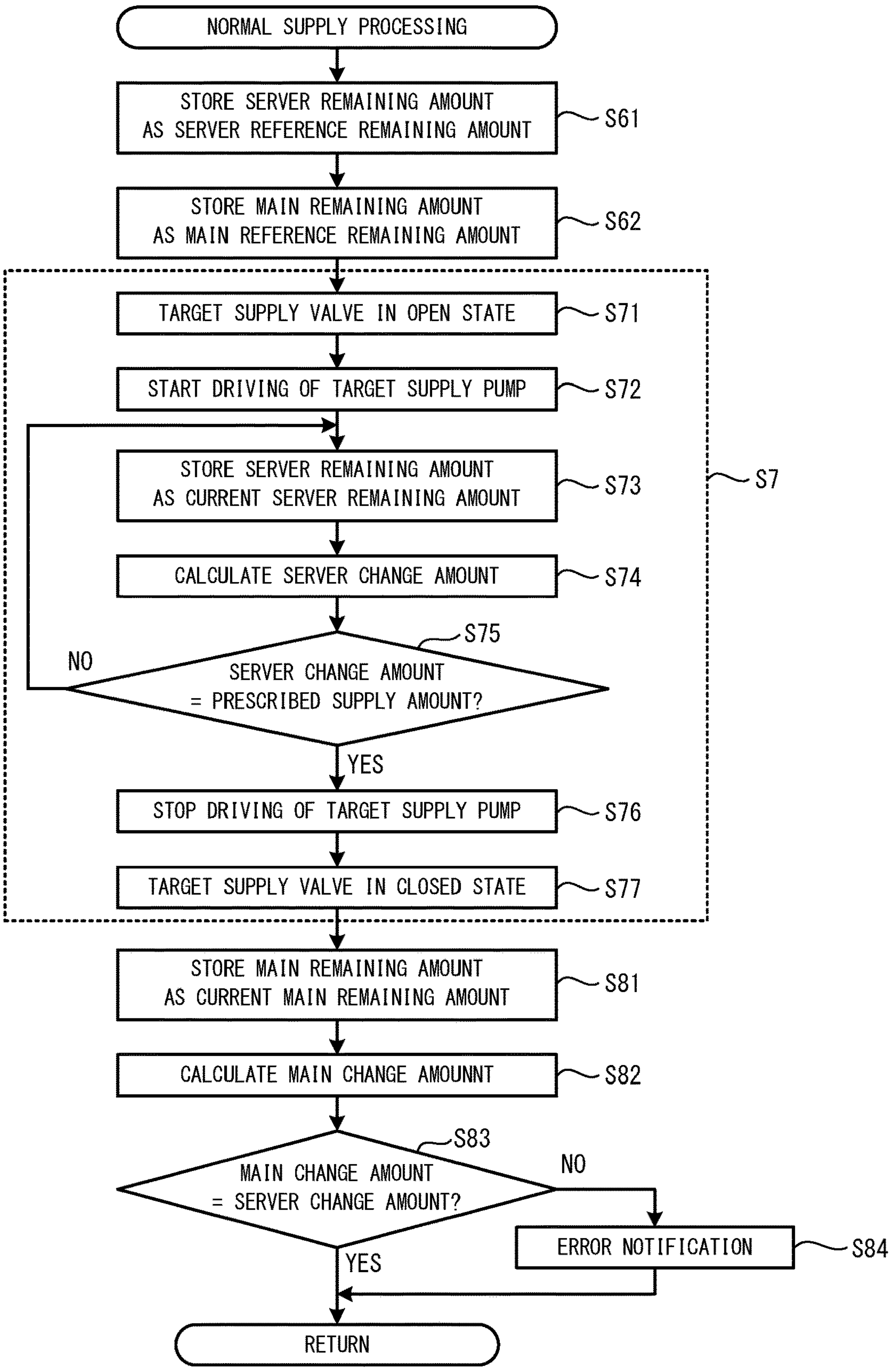
FIG. 21 is a flowchart of normal supply processing.

Normal supply processing performed at step S14 shown in FIG. 13 will be described. As shown in FIG. 21, when the normal supply processing is started, the CPU 51 acquires the server remaining amount of the target tank from the server sensor 71 (refer to FIG. 12) of the target tank, and stores the acquired server remaining amount of the target tank in the RAM 53 as a server reference remaining amount (step S61). The server reference remaining amount is the server remaining amount of the target tank before the start of supply processing (step S7), to be described later, in the normal supply processing.

The CPU 51 acquires the main remaining amount of the target main tank from the main sensor 185 (refer to FIG. 11) of the target main tank, and stores the acquired main remaining amount of the target main tank in the RAM 53 as a main reference remaining amount (step S72). The main reference remaining amount is the main remaining amount of the target main tank before the start of the supply processing (step S7), to be described later, in the normal supply processing.

The CPU 51 performs processing at step S71 to step S77 as the supply processing (step S7). The supply processing is, collectively, the processing at step S71 to step S77. In the supply processing, the CPU 51 controls the inter supply device-printer supply operation. When the supply processing is started, the CPU 51 controls the solenoid, of the solenoids 221 and 231 shown in FIG. 12, corresponding to the target supply valve, and causes the target supply valve to be in the open state (step S71). In this state, the CPU 51 controls the pump motor, of the pump motors 201 and 211 shown in FIG. 12, corresponding to the target supply pump, and starts the driving of the target supply pump (step S72).

By the processing at step S72, the ink or the pretreatment agent is supplied from the target tank to the target main tank. The arrows A1 shown in FIG. 10 indicate the flow of the white ink when the target main tank is the main tank 17W of the printer 1A and the processing at step S72 is performed. The arrows A2 shown in FIG. 10 indicate the flow of the white ink when the target main tank is the main tank 17W of the printer 1B and the processing at step S72 is performed. The CPU 51 performs processing at step S73, step S74, and step S75 described below while driving the target supply pump.

The CPU 51 acquires the server remaining amount of the target tank from the server sensor 71 (refer to FIG. 12) of the target tank, and stores the acquired server remaining amount of the target tank in the RAM 53 as the current server remaining amount (step S73). The CPU 51 calculates a server change amount, using a difference between the server reference remaining amount stored by the processing at step S61 and the current server remaining amount stored by the processing at step S73 (step S74).

The server change amount indicates the change amount of the server remaining amount of the target tank from a time point of the processing at step S61 to a time point of the processing at step S74. The server change amount indicates the amount of the ink or the pretreatment agent supplied from the target tank toward the target main tank in the supply processing, at the time point of the processing at step S74.

The CPU 51 determines whether or not the server change amount calculated by the processing at step S74 has reached a prescribed supply amount (step S75). The prescribed supply amount is greater than zero liters, and equal to or less than the maximum capacity of the ink or the pretreatment agent that can be stored by the target main tank, for example. The prescribed supply amount is stored in advance in the flash memory 54, for example.

When the server change amount is less than the prescribed supply amount (no at step S75), the CPU 51 returns the processing to the processing at step S73. When the server change amount has reached the prescribed supply amount (yes at step S75), the CPU 51 controls the pump motor, of the pump motors 201 and 211 shown in FIG. 12, corresponding to the target supply pump, and stops the driving of the target supply pump (step S76). The CPU 51 controls the solenoid, of the solenoids 221 and 231 shown in FIG. 12, corresponding to the target supply valve, and causes the target supply valve to be in the closed state (step S77). In this way, the CPU 51 ends the supply processing (step S7).

The CPU 51 acquires the main remaining amount of the target main tank from the main sensor 185 (refer to FIG. 11) of the target main tank, and stores the acquired main remaining amount of the target main tank in the RAM 53 as a current main remaining amount (step S81).

The CPU 51 calculates a main change amount, using a difference between the main reference remaining amount stored by the processing at step S62 and the current main remaining amount stored by the processing at step S81 (step S82). The CPU 51 determines whether or not the main change amount calculated by the processing at step S82 is the same value as the server change amount calculated by the processing at step S74 (step S83).

When the main change amount is the same value as the server change amount (yes at step S83), the CPU 51 returns the processing to the main processing shown in FIG. 13. When the main change amount is a different value from the server change amount (no at step S83), the CPU 51 performs notification of an error (step S84).

The error indicates that the server change amount is different from the main change amount. For example, the CPU 51 may cause the warning light 58 shown in FIG. 12 to emit light, in a light emission mode indicating that the server change amount is different from the main change amount. The CPU 51 may cause the speaker 59 shown in FIG. 12 to output a notification sound indicating that the server change amount is different from the main change amount.

The CPU 51 may cause a display indicating that the server change amount is different from the main change amount to be displayed on the display 56 shown in FIG. 12. The CPU 51 may communicate with the printer 1 of the target main tank and cause the printer 1 of the target main tank to perform the error notification. The CPU 51 may communicate with an external device and cause the external device to perform the error notification. The external device is a personal computer (PC), smartphone, or the like. The CPU 51 returns the processing to the main processing shown in FIG. 13.

EFFECTS OF EMBODIMENT

Hereinafter, when referring to the first white flow path W1, reference to the second white flow path W2 and the color/pretreatment agent flow path S0 will be simplified or omitted. Note that items referred to with respect to the first white flow path W1 can be said to be the same for the second white flow path W2 and the color/pretreatment agent flow path S0 as for the first white flow path W1.

The liquid supply system 100 supplies the ink or the pretreatment agent to the respective main tanks 17 of the printers 1A and 1B. For example, the liquid supply system 100 is provided with the tubes 82, 83, 84, and 85 of the first white flow path W1, the supply pumps 20 and 21 and the circulation pumps 26 and 27 of the first white flow path W1, and the CPU51. Each of the tubes 82, 83, 84, and 85 of the first white flow path W1 is connected to the server tank 6W. The server tank 6W is provided further upstream than the respective main tanks 17W of the printers 1A and 1B in the first white flow path W1. The white ink is stored in the server tank 6W. The white ink flows inside the tubes 82, 83, 84 and 85 in the first white flow path W1 between the server tank 6W and each of the main tanks 17W of the printers 1A and 1B. The supply pumps 20 and 21 are provided in the tubes 82 and 83, respectively. The circulation pumps 26 and 27 are provided in the tubes 84 and 84, respectively. Each of the supply pumps 20 and 21, and the circulation pumps 26 and 27 is in a liquid delivery state as a result of being driven, and in a stopped state as a result of the driving being stopped. When the supply pumps 20 and 21 are in the liquid delivery state, the white ink flows between the server tank 6W and the respective main tanks 17W of the printers 1A and 1B via the tubes 82 and 83. When the circulation pumps 26 and 27 are in the liquid delivery state, the white ink flows between the server tank 6W and the respective main tanks 17W of the printers 1A and 1B via the tubes 84 and 85. When the supply pumps 20 and 21 are in the stopped state, the flow of the white ink is stopped between the server tank 6W and the respective main tanks 17W of the printers 1A and 1B via the tubes 82 and 83. When the circulation pumps 26 and 27 are in the stopped state, the flow of the white ink is stopped between the server tank 6W and the respective main tanks 17W of the printers 1A and 1B via the tubes 84 and 85. In each of the processing at step S2, step S3, step S4, and step S7, the CPU 51 controls the target supply pump or the target circulation pump to be in the liquid delivery state and the stopped state, on the basis of the server remaining amount of the server tank 6W indicated by the signal from the server sensor 71 of the server tank 6W.

According to the above, in the processing at step S2, step S3, step S4, and step S7, the CPU 51 controls the supply pumps 20 and 21 and the circulation pumps 26 and 27 to be in the liquid delivery state and the stopped state, on the basis of the server remaining amount of the server tank 6W. In this way, on the basis of the server remaining amount of the server tank 6W, the CPU 51 can control a liquid delivery amount between the server tank 6W and the target main tank. Thus, the liquid supply system 100 can suppress the liquid delivery amount between the server tank 6W and the target main tank from fluctuating each time the processing at step S2, step S3, step S4, or step S7 is performed, for example. In each of the processing at step S2, step S3, step S4 and step S7, the liquid supply system 100 can suppress the liquid delivery amount between the server tank 6W and the main tank 17W from fluctuating, between the plurality of printers 1.

For example, there is a case in which a height difference between the printer 1 and the server tank 6 is changed by an arrangement position of the printer 1 or the server tank 6 being changed. Further, there is a case in which the flow path configuration, such as the inner diameter, the overall length or the like of the tube 8, is changed. In these cases, there is a possibility that a flow path resistance may change. For example, it is assumed that the liquid delivery amount between the server tank 6W and the target main tank fluctuates each time the processing at step S2, step S3, step S4, and step S7 is performed, or when the processing at each of step S2, step S3, step S4, and step S7 is performed between the plurality of printers 1. If the liquid delivery amount between the server tank 6W and the target main tank is relatively small, there is a possibility that a supply amount of the ink or the pretreatment agent from the target main tank to the head 14 may be insufficient. When the liquid delivery amount between the server tank 6W and the target main tank is relatively large, there is a possibility that the ink or the pretreatment agent may overflow from the target main tank. The liquid supply system 100 can suppress the liquid delivery amount between the server tank 6W and the main tank 17W from fluctuating even if the flow path resistance changes, and thus, can suppress an insufficient or an excessive supply of the ink or the pretreatment agent to the target main tank.

In the processing at step S2, when the first server change amount has become the first prescribed supply amount, the CPU 51 switches the target supply pump from the liquid delivery state to the stopped state. In the processing at step S3, when the second server change amount has become the prescribed circulation amount, the CPU 51 switches the target circulation pump from the liquid delivery state to the stopped state. In the processing at step S4, when the third server change amount has become the second prescribed supply amount, the CPU 51 switches the target supply pump from the liquid delivery state to the stopped state. In the processing at step S7, when the server change amount has become the prescribed supply amount, the CPU 51 switches the target supply pump from the liquid delivery state to the stopped state.

According to the above, the liquid supply system 100 can control the liquid delivery amount between the server tank 6W and the target main tank to be the first prescribed supply amount, the prescribed circulation amount, the second prescribed supply amount, and the prescribed supply amount. Thus, the liquid supply system 100 can further suppress the liquid delivery amount between the server tank 6W and the target main tank from fluctuating.

The liquid supply system 100 is provided with the supply pumps 20 and 21, and the circulation pumps 26 and 27.

According to the above, in this case, compared to a case in which the liquid delivery is performed between the server tank 6W and the target main tank using only a water head difference, for example, the water head difference is less likely to impact the liquid delivery between the server tank 6W and the target main tank. Thus, the liquid supply system 100 can suppress limitations on an arrangement position of the server tank 6W with respect to the main tanks 17W of each of the printers 1A, 1B, 1C, and 1D.

In the processing at each of step S2, step S3, step S4, and step S7, the CPU 51 controls the target supply pump or the target circulation pump to be in the liquid delivery state and the stopped state on the basis of the server remaining amount of the server tank 6W indicated by the signal from the server sensor 71 of the server tank 6W.

For example, as a result of the white ink being used by the printer 1 of the target main tank, there is a possibility that the main remaining amount of the target main tank may decrease while performing the processing at each of step S2, step S3, step S4, and step S7. Thus, rather than the CPU 51 controlling the target supply pump or the target circulation pump to be in the liquid delivery state and the stopped state on the basis of the main remaining amount of the target main tank, it is easier to control the liquid delivery amount between the server tank 6W and the target main tank by controlling the target supply pump or the target circulation pump to be in the liquid delivery state and the stopped state on the basis of the server remaining amount of the server tank 6W. Thus, the liquid supply system 100 can further suppress the liquid delivery amount between the server tank 6W and the target main tank from fluctuating.

The liquid supply system 100 is provided with the server sensor 71 and the main sensor 185. When, in the processing at step S7, the main change amount of the target main tank indicated by the signal from the main sensor 185 of the target main tank is different from the server change amount of the target tank indicated by the signal from the server sensor 71 of the target tank, the CPU 51 performs the error notification.

For example, when the main change amount of the target main tank is different from the server change amount of the target tank, there is a possibility that a leak has occurred in the tube 8 corresponding to the target main tank. The liquid supply system 100 can perform notification of the leak or the like, as the error.

In the processing at step S2, the CPU 51 supplies the white ink from the server tank 6W toward the target main tank by controlling the target supply pump to be in the liquid delivery state on the basis of the server remaining amount of the server tank 6W indicated by the signal from the server sensor 71 of the server tank 6W. After the processing at step S2 has started, in the processing at step S3, the CPU 51 returns the white ink from the target main tank toward the server tank 6W by controlling the target circulation pump to be in the liquid delivery state on the basis of the server remaining amount of the server tank 6W indicated by the signal from the server sensor 71 of the server tank 6W. After the processing at step S3 has started, in the processing at step S4, the CPU 51 supplies the white ink from the server tank 6W toward the target main tank by controlling the target supply pump to be in the liquid delivery state on the basis of the server remaining amount of the server tank 6W indicated by the signal from the server sensor 71 of the server tank 6W.

According to the above, by the processing at step S2 and step S3, the liquid supply system 100 can fill the inside of the tube 8 corresponding to the target main tank with the white ink. By the processing at step S3, the main remaining amount of the target main tank decreases. By performing the processing at step S4, the liquid supply system 100 can increase the main remaining amount of the target main tank that has decreased as a result of the processing at step S3. Thus, the liquid supply system 100 can suppress the main remaining amount of the target main tank from becoming insufficient.

In the processing at step S4, the CPU 51 supplies, from the server tank 6W toward the target main tank, the white ink of an amount depending on the change amount of the server remaining amount of the server tank 6W in the processing at step S3, on the basis of the server remaining amount of the server tank 6W indicated by the signal from the server sensor 71 of the server tank 6W.

According to the above, by performing the processing at step S4, the liquid supply system 100 can increase the main remaining amount of the target main tank by an amount corresponding to the change amount of the server remaining amount of the server tank 6W in the processing at step S3. Thus, the liquid supply system 100 can suppress the insufficient or excessive supply of the white ink to the target main tank.

The server sensor 71 is a weight sensor.

According to the above, the liquid supply system 100 can detect the server remaining amount using a weight. For example, even if the liquid surface inside the server tank 6 has undulated, the server sensor 71 can accurately detect the server remaining amount.

MODIFIED EXAMPLES

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. The modified examples to be described below may be combined as appropriate, insofar as no contradictions arise. The liquid supply device 2 may change each of the white flow path W0 and the color/pretreatment agent flow paths S0 as appropriate. Hereinafter, an example will be described of a modified mode of the first white flow path W1. The changes to the first white flow path W1 may also be applied to the second white flow path W2. The changes to the first white flow path W1 and the second white flow path W2 may also be applied to the first color/pretreatment agent flow path S1 and the second color/pretreatment agent flow path S2, respectively.

Hereinafter, as modified examples of the white flow path W0, a white flow path W10 shown in FIG. 22, a white flow path W20 shown in FIG. 23, and a white flow path W30 shown in FIG. 24 will be described. In each of the white flow paths W10, W20, and W30, the same reference signs will be assigned to members having the same function as that of the above-described embodiment, and points that differ from the white flow path W0 will be mainly described.

Figure 22:
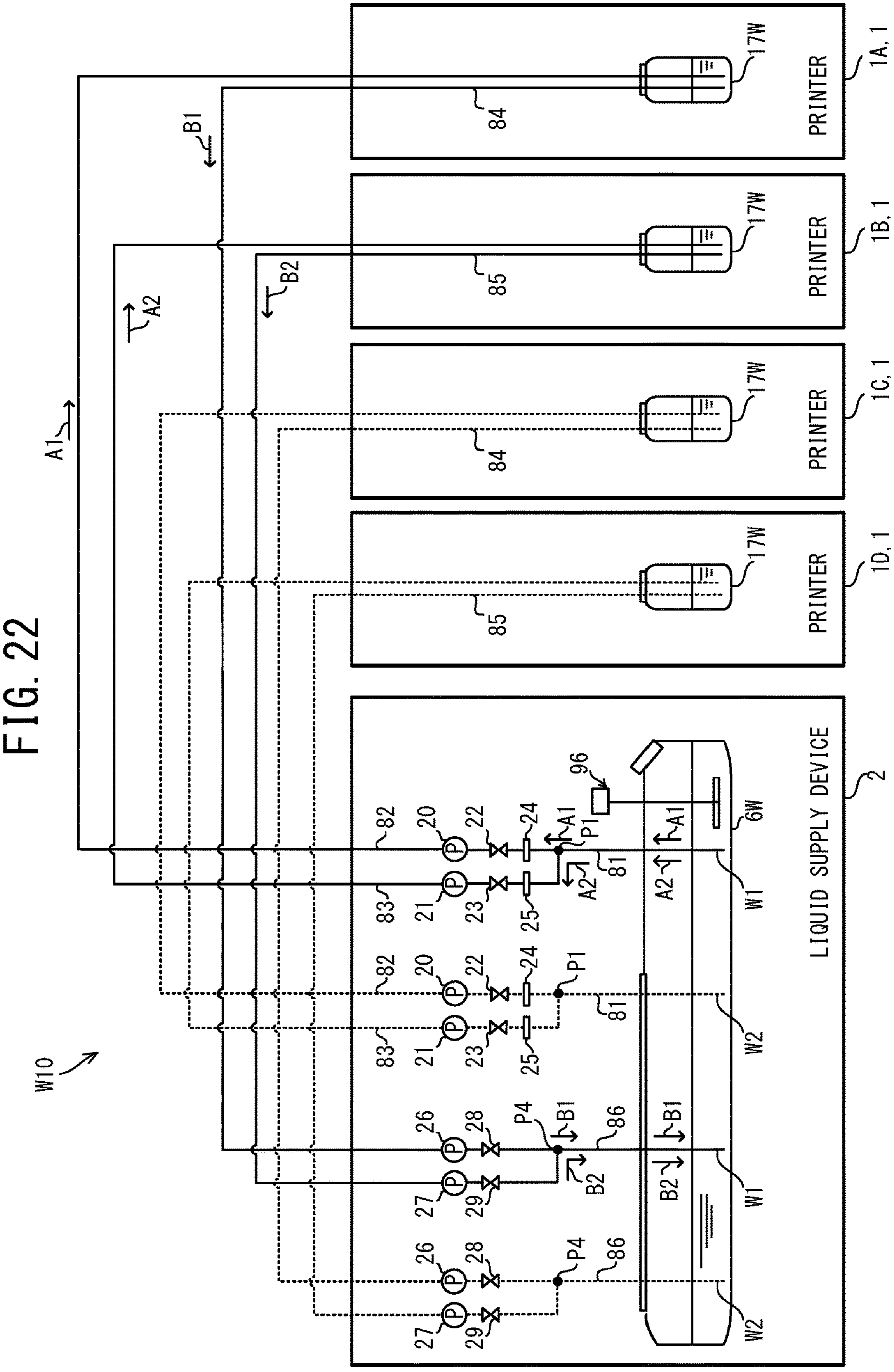
FIG. 22 is a flow path configuration diagram of a white flow path.

As shown in FIG. 22, in the white flow path W10, in the first white flow path W1, for example, the tubes 84 and 85 need not necessarily be respectively joined to the tubes 82 and 83 at the points P2 and P3. Each of the tubes 84 and 85 may extend from the point P4 to the respective main tanks 17W of the printers 1A and 1B, and may be connected to the respective main tanks 17W of the printers 1A and 1B.

Figure 23:
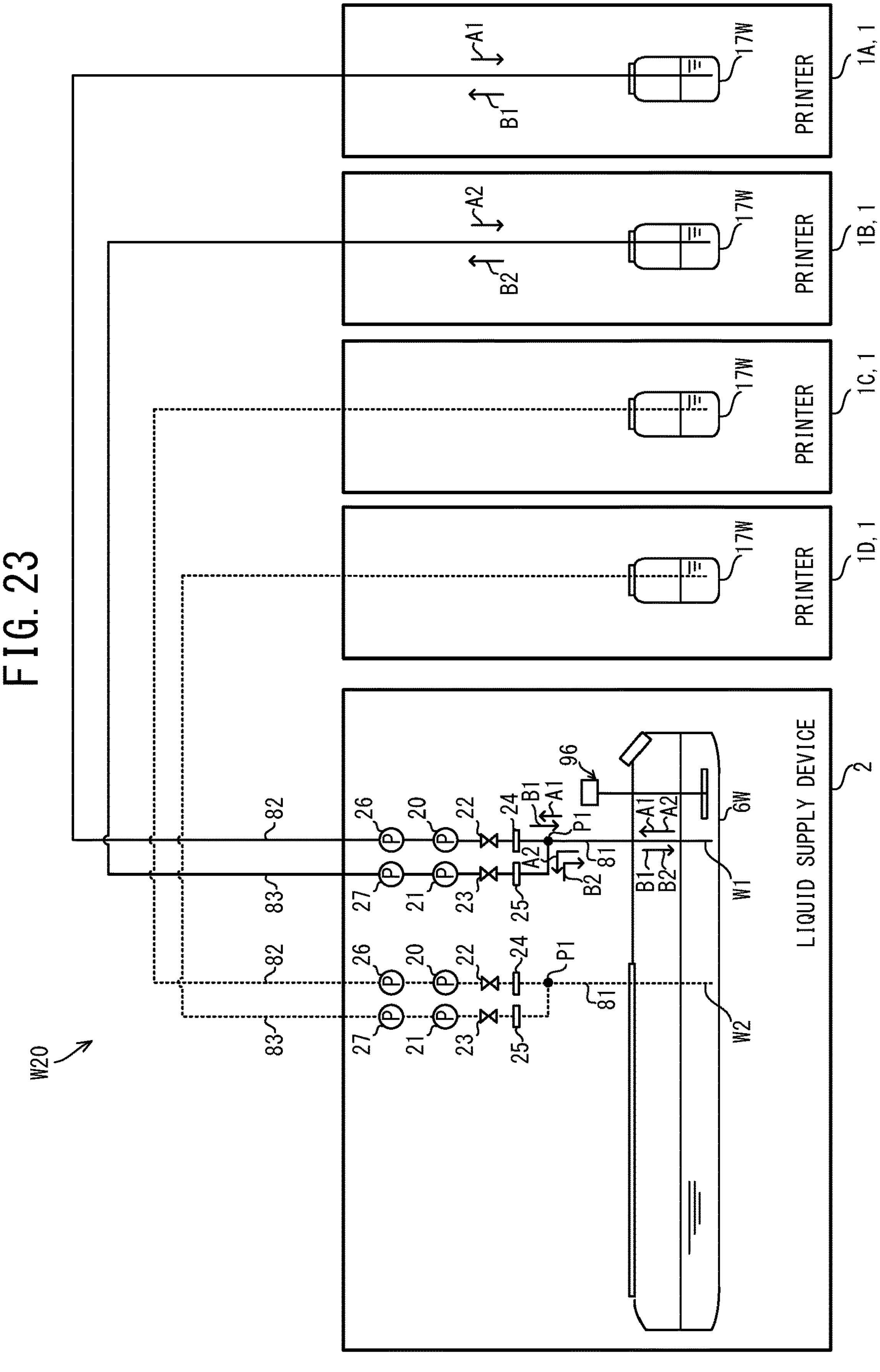
FIG. 23 is a flow path configuration diagram of a white flow path.

As shown in FIG. 23, in the white flow path W20, the first white flow path W1 may be provided, for example, with the tubes 81, 82, and 83, and need not necessarily be provided with the tubes 84, 85, and 86. In this case, the circulation pumps 26 and 27 may be provided in the tubes 82 and 83, respectively. The circulation pumps 26 and 27 may be provided further downstream in the supply flow path than the supply pumps 20 and 21, respectively, or may be provided further upstream in the supply flow path than the supply pumps 20 and 21. The circulation pumps 26 and 27 may be provided further upstream in the supply flow path than the supply valves 22 and 23, respectively, or may be provided further upstream in the supply flow path than the filters 24 and 25, respectively.

According to the above-described configuration, in the first white flow path W1, by the driving of the pump motors 261 and 271, the circulation pumps 26 and 27 respectively suck up the white ink from the main tanks 17W of the printers 1A and 1B via the tubes 82 and 83 (refer to the arrows B1 and B2). By the driving of the pump motors 261 and 271, the circulation pumps 26 and 27 respectively send the sucked up white ink toward the server tank 6W via the tube 81 (refer to the arrows B1 and B2).

Note that the liquid supply device 2 may omit some or all of the circulation pumps 26 and 27, and some or all of the supply valves 22 and 23. When the circulation pumps 26 and 27 and the supply valves 22 and 23 are all omitted, the liquid supply device 2 need not necessarily return the white ink toward the server tank 6W from the printers 1A and 1B via the tubes 82 and 83, respectively.

Figure 24:
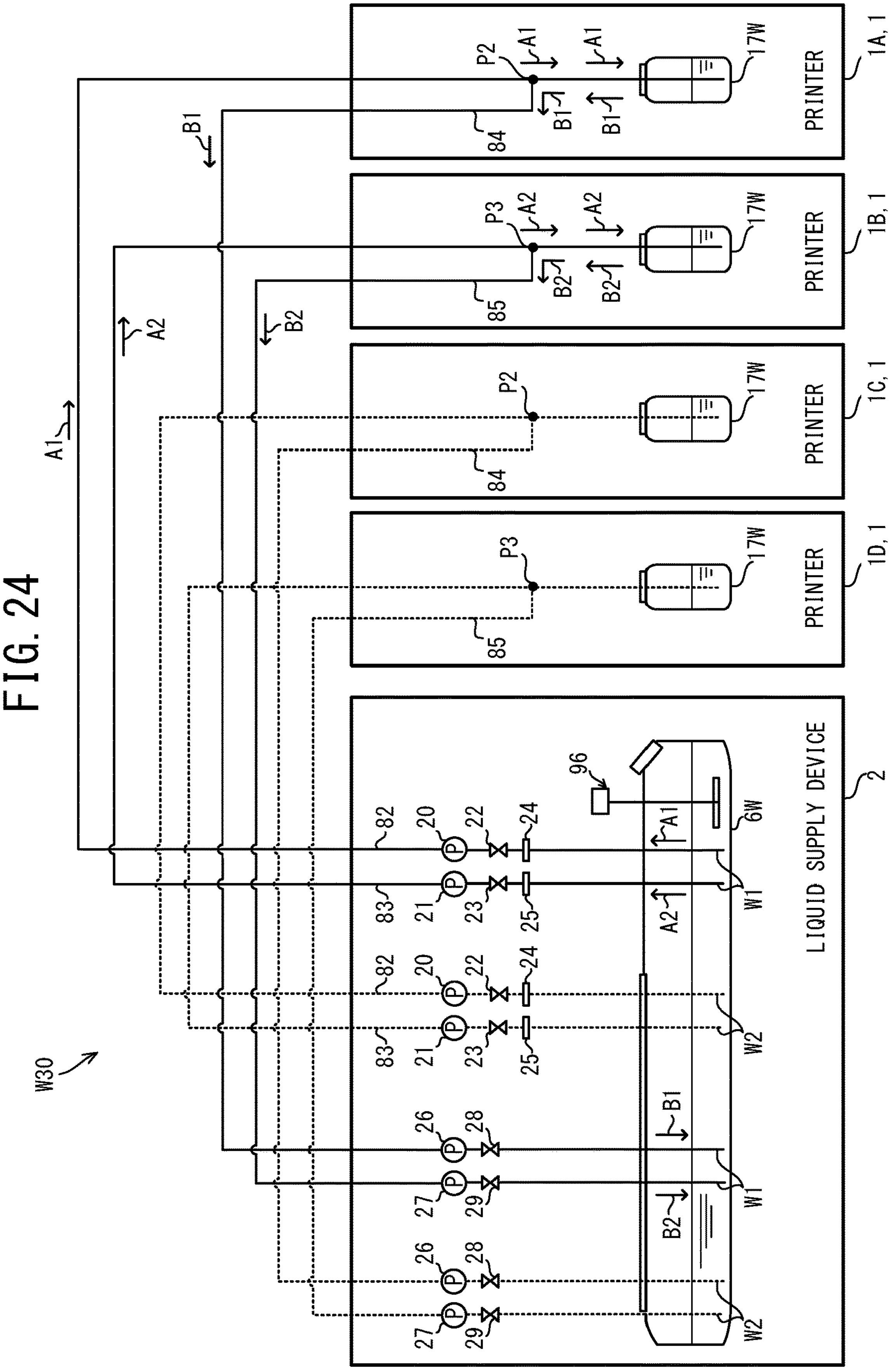
FIG. 24 is a flow path configuration diagram of a white flow path.

As shown in FIG. 24, in the white flow path W30, in the first white flow path W1, for example, the tubes 82 and 83 need not necessarily be respectively connected to the tube 81 at the point P1. Each of the tubes 82 and 83 may extend from the respective main tanks 17W of the printers 1A and 1B to the server tank 6W, and may be connected to the server tank 6W.

For example, in the first white flow path W1, the tubes 84 and 85 need not necessarily be respectively connected to the tube 86 at the point P4. The tubes 84 and 85 may extend from the point P2 and P3, respectively, to the server tank 6W, and may be connected to the server tank 6W.

Although not shown in the drawings, in addition to being connected to the tube 82 and the tube 83 of the first white flow path W1 at the point P1 of the first white flow path W1, the tube 81 of the first white flow path W1 may also be connected to one or both of the tube 81 and the tube 82 of the second white flow path W2. In addition to the tube 84 and the tube 85 of the first white flow path W1, one or both of the tube 84 and the tube 85 of the second white flow path W2 may also be connected to the tube 86 of the first white flow path W1 at the point P4 of the first white flow path W1. In the first white flow path W1, the tube 81 may extend directly to the server tank 6W from the point P1, without passing through the connector 97.

For example, in the first white flow path W1, the liquid supply device 2 may omit one or both of the supply pumps 20 and 21. For example, when both the supply pumps 20 and 21 are omitted, the CPU 51 controls one or both of the supply valves 22 and 23 to be in the open state and the closed state. In this way, the CPU 51 may control the supply of the white ink to the respective main tanks 17W of the printers 1A, 1B, 1C, and 1D from the server tank 6W using the liquid head difference between the respective main tanks 17W of the printers 1A and 1B and the server tank 6W.

For example, in the first white flow path W1, the liquid supply device 2 may omit one or both of the circulation pumps 26 and 27. For example, when both the circulation pumps 26 and 27 are omitted, the CPU 51 controls one or both of the circulation valves 28 and 29 to be in the open state and the closed state. In this way, the CPU 51 may control the return of the white ink from the respective main tanks 17W of the printers 1A and 1B to the server tank 6W using the liquid head difference between the respective main tanks 17W of the printers 1A and 1B and the server tank 6W.

For example, in the first white flow path W1, the liquid supply device 2 may omit one or both of the supply valves 22 and 23. In the first white flow path W1, the liquid supply device 2 may omit one or both of the circulation valves 28 and 29. In the first white flow path W1, the liquid supply device 2 may omit one or both of the filters 24 and 25.

In the tube 82, for example, the liquid supply device 2 may change an upstream or downstream positional relationship in the supply flow path of the supply pump 20, the supply valve 22, and the filter 24, as appropriate. Similarly, in the tube 83, for example, the liquid supply device 2 may change an upstream or downstream positional relationship in the supply flow path of the supply pump 21, the supply valve 23, and the filter 25, as appropriate.

In the tube 84, for example, the liquid supply device 2 may change an upstream or downstream positional relationship in the circulation flow path of the circulation pump 26 and the circulation valve 28, as appropriate. Similarly, in the tube 85, for example, the liquid supply device 2 may change an upstream or downstream positional relationship in the circulation flow path of the circulation pump 27 and the circulation valve 29, as appropriate.

The single printer 1 may be connected to the single liquid supply device 2 using the tubes 8. The liquid supply device 2 may be provided with only the single server tank 6, such as the server tank 6W, for example. The mount mechanism 9C may be provided with the agitation mechanism 96. In this case, in the processing at step S22, the CPU 51 may determine whether or not the server remaining amount is equal to or less than the predetermined remaining amount for each of the plurality of server tanks 6. When there is the server tank 6 for which the server remaining amount is equal to or less than the predetermined remaining amount, the CPU 51 may stop the intermittent driving of the agitation operation for the server tank 6 for which the server remaining amount is equal to or less than the predetermined remaining amount. In other words, the CPU 51 need not necessarily stop the intermittent driving of the agitation operation for the server tank 6 for which the server remaining amount is greater than the predetermined remaining amount.

The CPU 51 may intermittently drive the agitation operation regardless of the server remaining amount. The CPU 51 may intermittently drive the agitation operation regardless of whether or not the movable plate 35 is positioned at the open position. The CPU 51 may continuously drive the agitation operation instead of intermittently driving the agitation operation. The agitation mechanism 96 may perform the agitation operation without relying on the control of the CPU 51. In other words, the agitation mechanism 96 may start the agitation operation when a power supply of the agitation mechanism 96 is turned on by the user, and may stop the agitation operation when the power supply of the agitation mechanism 96 is turned off by the user. The CPU 51 may stop the intermittent driving of the agitation operation during the driving of one of the supply pumps 20 and 21 in the first white flow path W1, or the supply pumps 20 and 21 in the second white flow path W2 (during the performing of the inter supply device-printer supply operation of the white ink to one of the printers 1A, 1B, 1C, and 1D).

The propeller 962 may include the single vane. Instead of rotating, or in addition to rotating, the rotation shaft 961 may oscillate in the front-rear direction or the left-right direction, or may extend and contract in the up-down direction. It is sufficient that the agitation mechanism 96 be able to agitate the liquid inside the server tank 6, and the agitation mechanism 96 may be a magnetic stirrer, for example. The magnetic stirrer is provided with a controller and a stirring bar. The server tank 6 is placed on the controller. The stirring bar is disposed inside the server tank 6. The magnetic stirrer agitates the liquid inside the server tank 6 by moving the stirring bar inside the server tank 6 under the control of the controller.

The liquid supply device 2 may be provided with the mount mechanism 9W in place of some or all of the plurality of mount mechanisms 9C. For example, when the liquid supply device 2 is provided with the mount mechanism 9W in place of some or all of the plurality of mount mechanisms 9C, by the plurality of agitation mechanisms 96 performing the agitation operation, respectively, each of the propellers 962 agitates the white ink, the color inks, or the pretreatment agent inside the server tanks 6W, 6M, 6C, 6Y, 6K, and 6CS.

Thus, the liquid supply device 2 can suppress the state of the white ink, the color inks, or the pretreatment agent from becoming non-uniform inside the server tanks 6W, 6M, 6C, 6Y, 6K, and 6CS. Thus, the liquid supply device 2 can suppress the print quality from deteriorating as a result of the state of the white ink, the color inks, or the pretreatment agent becoming non-uniform. Note that "the state of the pretreatment agent" refers, for example, to a concentration distribution of the cationic polymer, the multivalent metal salts and the like, in the pretreatment agent. The "state of the color ink" refers to a concentration distribution of colored components in the color ink, for example.

The liquid supply device 2 may supply the ink or the pretreatment agent from the server tank 6W to the head 14 without passing through the main tank 17. The printer 1 may apply the pretreatment agent to the print medium using a mechanism other than the head 14. For example, in place of the head 14, the printer 1 may be provided with a spray for spraying the pretreatment agent. In this case, the printer 1 may supply the pretreatment agent from the main tank 17 to the spray.

As the liquid, the liquid supply system 100 may supply a post-treatment agent, for example, from the liquid supply device 2 to each of the plurality of printers 1. The post-treatment agent is an aqueous solution containing a resin emulsion, for example, or an aqueous solution containing a crosslinking agent. The post-treatment agent is, for example, a coating material, and is applied onto the print image after the printing on the print medium. The post-treatment agent protects the print image, or improves glossiness of the print image.

In this case, the post-treatment agent may be stored, for example, in the server tank 6W. The tube 82 may be connected to the main tank 17W of the printer 1A. The tube 83 may be connected to the main tank 17W of the printer 1B. In this way, the post-treatment agent is supplied from the server tank 6W to the main tank 17W of the printer 1A via the tubes 81 and 82. The post-treatment agent is supplied from the server tank 6W to the main tank 17W of the printer 1B via the tubes 81 and 83. The printer 1 supplies the post-treatment agent from the main tank 17W to the head 14, of the plurality of heads 14, for ejecting the post-treatment agent via a sub-pouch, or without passing through the sub-pouch. In place of the head 14, the printer 1 may supply the post-treatment agent to a spray or the like.

As a result of the agitation mechanisms 96 performing the agitation operation, the propeller 962 agitates the post-treatment agent inside the server tank 6W. Thus, the liquid supply device 2 can suppress a state of the post-treatment agent from becoming non-uniform inside the server tank 6W. As a result, the liquid supply device 2 can suppress a deterioration in the print quality caused by the state of the post-treatment agent becoming non-uniform. Note that "the state of the post-treatment agent" refers, for example, to a concentration distribution of a cationic polymer, multivalent metal salts and the like, in the post-treatment agent.

As the liquid, the liquid supply system 100 may supply a cleaning solution, for example, from the liquid supply device 2 to each of the plurality of printers 1. The cleaning solution is used to clean the nozzle surface of the head 14.

In this case, the cleaning solution may be stored in the server tank 6W, for example. The tube 82 may be connected to a cap 19 of the printer 1A. The tube 83 may be connected to the cap 19 of the printer 1B. In this way, the cleaning solution is supplied from the server tank 6W to the cap 19 of the printer 1A via the tubes 81 and 82. The cleaning solution is supplied from the server tank 6W to the cap 19 of the printer 1B via the tubes 81 and 83. In other words, the cleaning solution may be supplied to the cap 19 from the server tank 6W without passing through the main tank 17. Note that the cleaning solution may be supplied from the server tank 6W to the cap 19 via the main tank 17.

As a result of the cleaning solution being supplied to the cap 19 in a state in which the cap 19 is closely adhered to the nozzle surface of the head 14, the nozzle surface of the head 14 is cleaned. As a result of the agitation mechanisms 96 performing the agitation operation, the propeller 962 agitates the cleaning solution inside the server tank 6W. Thus, the liquid supply device 2 can suppress a state of the cleaning solution from becoming non-uniform inside the server tank 6W. As a result, the liquid supply device 2 can suppress a deterioration in cleaning effectiveness of the nozzle surface of the head 14 caused by the state of the cleaning solution becoming non-uniform. Note that "the state of the cleaning solution" refers, for example, to a concentration distribution of cleaning components in the cleaning solution.

As the liquid, the liquid supply system 100 may supply water, for example, from the liquid supply device 2 to each of the plurality of printers 1. The water may be used for humidifying an atmosphere inside the printer 1. In this case, the plurality of printers 1 may each be provided with a humidifier. The humidifier is provided inside the printer 1 and humidifies the atmosphere inside the printer 1.

The water may be stored in the server tank 6W, for example. The tube 82 may be connected to the humidifier of the printer 1A. The tube 83 may be connected to the humidifier of the printer 1B. In this way, the water is supplied from the server tank 6W to the humidifier of the printer 1A via the tubes 81 and 82. The water is supplied from the server tank 6W to the humidifier of the printer 1B via the tubes 81 and 83. In other words, the water is supplied from the server tank 6W to the humidifier without passing through the main tank 17. Note that the water may be supplied to the humidifier from the server tank 6W via the main tank 17.

As a result of the agitation mechanisms 96 performing the agitation operation, the propeller 962 agitates the water inside the server tank 6W. Thus, the liquid supply device 2 can suppress a state of the water from becoming non-uniform inside the server tank 6W. As a result, the liquid supply device 2 can suppress a deterioration in humidification capacity by the humidifier caused by the state of the water becoming non-uniform. Note that "the state of the water" refers, for example, to a temperature distribution of the water.

The configuration of the printer 1 is not limited to that of the above-described embodiment. For example, in the above-described embodiment, the printer 1 may be a type different from the inkjet printer, and may be a laser printer, a tape printer, or the like. The plurality of heads 14 are not limited to the inkjet heads, and may be thermal heads, or the like. For example, the printer 1 need not necessarily use ink as the liquid, and it is sufficient that the printer 1 be provided with the humidifier. In this case, the liquid supply system 100 supplies the water from the liquid supply device 2 to the humidifier of the printer 1. Some or all of the plurality of heads 14 may be a line head. A number of the heads 14 may be one.

The server sensor 71 may be an optical sensor or an electrode-type level sensor. In this case, the server sensor 71 may detect the server remaining amount by detecting a height of the liquid surface inside the server tank 6. The server sensor 71 may be a pressure sensor. In this case, the server sensor 71 may detect the server remaining amount by detecting the pressure inside the server tank 6.

The main sensor 185 may be a weight sensor. In this case, the main sensor 185 may detect the main remaining amount by detecting the weight of the main remaining amount. The main sensor 185 may be an optical sensor or an electrode-type level sensor. In this case the main sensor 185 may detect the main remaining amount by detecting a height of the liquid surface inside the main tank 17.

The liquid supply device 2 may change the configuration of the placement base 30 as appropriate. For example, of the bottom plate 31, the pair of pillars 32, the top plate 33, the fixed plate 34, and the movable plate 35, the placement base 30 may be provided with only the bottom plate 31. The liquid supply device 2 may omit the placement base 30. In this case, the server tank 6 may be placed on the ground.

The control box 5 may be provided in the sub-unit 3B, in place of the main unit 3A, or in addition to the main unit 3A. The control box 5 may be provided in different positions in the main unit 3A and the sub-unit 3B.

The liquid supply device 2 may change the shape of the support portion 39 as appropriate. In the above-described embodiment, the support portion 39 protrudes to the front from the front surface of the control box 5. In contrast to this, the support portion 39 may, for example, be recessed to the rear from the front surface of the control box 5. It is sufficient that the support portion 39 be able to support the mount mechanism 9 in the state in which the mount mechanism 9 is removed from the server tank 6. When the agitation mechanism 96 and the mount mechanism 9W are separate from each other, it is sufficient that the support portion 39 be able to support the agitation mechanism 96 in the state in which the agitation mechanism 96 is removed from the server tank 6.

The liquid supply device 2 may change the position of the support portion 39 as appropriate. For example, the support portion 39 may be positioned lower than the placement unit 7, or may be positioned at a position displaced from the placement plate 73 in the left-right direction or the front-rear direction. The liquid supply device 2 may omit some or all of the plurality of support portions 39.

The liquid supply device 2 may change a shape of the server tank 6 as appropriate. For example, the server tank 6 may have a bottomed circular cylindrical shape. The opening 62 may be provided in a side surface or the bottom surface of the server tank 6. Each of the cabinet 91, the handle 92, the cap 93, the support plate 94, the washer 95, the tube 8, and the agitation mechanism 96 may be provided separately from the mount mechanism 9. For example, when the agitation mechanism 96 is provided separately from the mount mechanism 9W, a plurality of the openings 62 may be provided in the server tank 6 as the openings 62 for mounting the tubes 81 and 82, and the opening 62 for mounting the agitation mechanism 96.

For example, the mount mechanism 9 may be fixed to the server tank 6, and may be non-removable or difficult to remove. In this case, it is sufficient that the opening 62 for replenishing the liquid be provided in the server tank 6.

The movable plate 35 may move between the closed position and the open position by moving in the front-rear direction or the left-right direction, for example. The open/closed sensor 38 may detect whether or not the movable plate 35 is positioned at the closed position. The open/closed sensor 38 may detect whether the movable plate 35 is positioned at either one of the closed position or the open position. The open/closed sensor 38 may be an optical sensor, for example. The liquid supply device 2 may be provided with a motor for moving the movable plate 35 between the closed position and the open position. The motor may be provided with an encoder as the open/closed sensor 38. In this case, the encoder detects whether the movable plate 35 is positioned at either of the closed position or the open position on the basis of a rotation position of the motor.

The prescribed circulation amount may be the same as the first prescribed supply amount, or may be greater than the first prescribed supply amount. The second prescribed supply amount may be greater or less than the prescribed circulation amount. The second prescribed supply amount may be the same as the first prescribed supply amount or may be greater than the first prescribed supply amount.

While performing the supply processing, the CPU 51 may determine whether or not the current server remaining amount stored by the processing at step S73 has reached a server prescribed remaining amount. The server prescribed remaining amount is equal to or greater than zero liters, and is an amount at which it is difficult for the supply pumps 20 and 21 to suck up the white ink or the pretreatment agent, for example. The server prescribed remaining amount is stored in advance in the flash memory 54, for example. When the current server remaining amount has reached the server prescribed remaining amount while the supply processing is being performed, the CPU 51 may perform the processing from step S76 onward. In this way, the liquid supply system 100 can suppress the driving of the target supply pump from continuing in a state in which the ink or the pretreatment agent is not being supplied from the target tank to the target main tank.

The introduction processing according to a modified example will be described. In the introduction processing of the above-described embodiment, in the processing at each of step S25, step S35, and step S45, the CPU 51 performs the determination on the basis of the server remaining amount indicated by the signal from the server sensor 71 of the target tank. In contrast to this, in the introduction processing according to the modified example, in the processing at each of step S25, step S35, and step S45, the CPU 51 may perform the determination on the basis of the main remaining amount indicated by the main sensor 185 of the target main tank.

Figure 29:
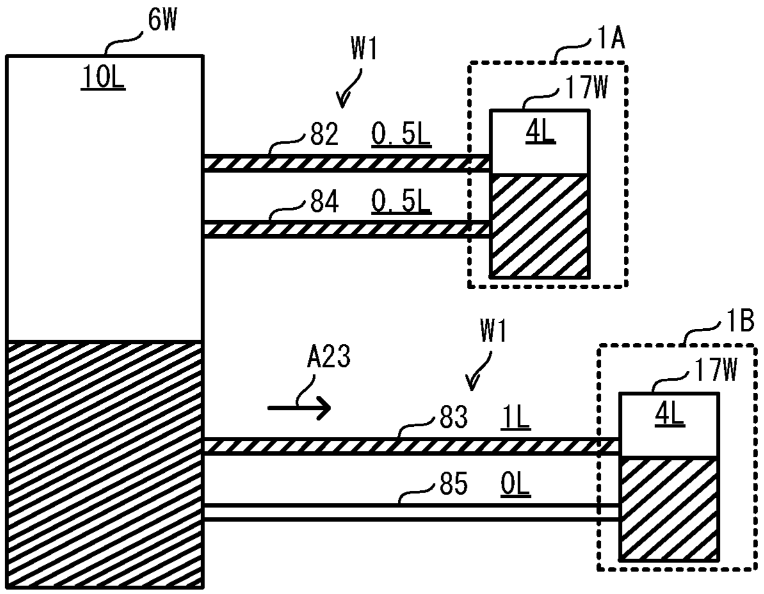
FIG. 29 is a view showing a relationship between the server remaining amount of the server tank and the main remaining amount of the main tanks of the printers at the end of the first supply processing, when a target main tank is the main tank of the printer.
Figure 30:
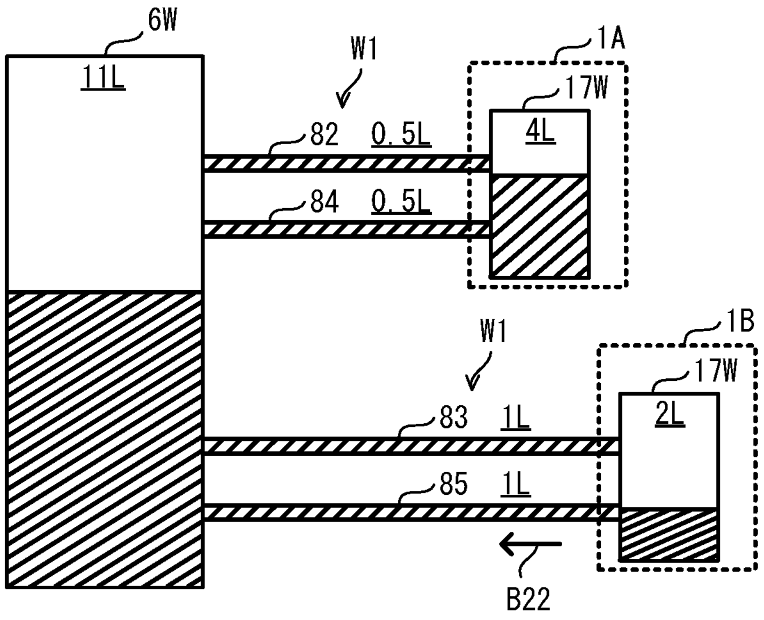
FIG. 30 is a view showing a relationship between the server remaining amount of the server tank and the main remaining amount of the main tanks of the printers at the end of the return processing, when a target main tank is the main tank of the printer.
Figure 31:
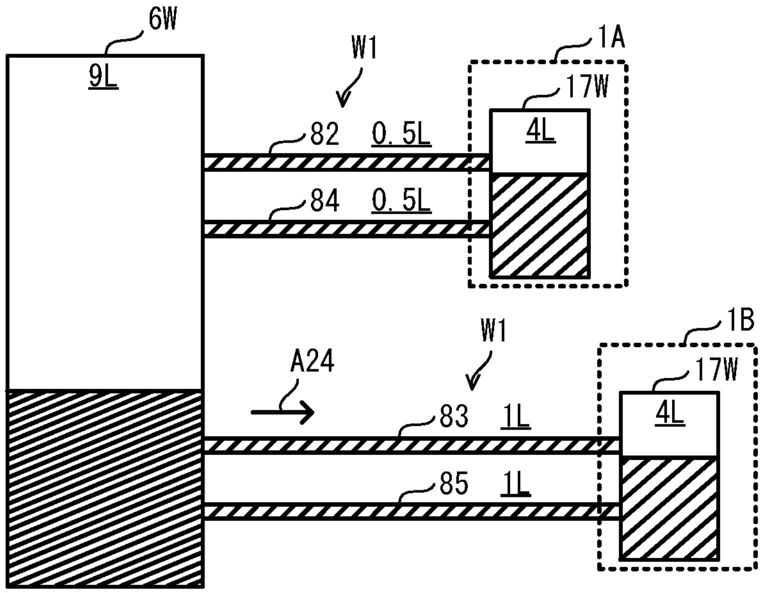
FIG. 31 is a view showing a relationship between the server remaining amount of the server tank and the main remaining amount of the main tanks of the printers at the end of the second supply processing, when a target main tank is the main tank of the printer.

Hereinafter, with reference to FIG. 25 to FIG. 31, a flow of the white ink will be described when the CPU 51 performs the introduction processing according to a first of the above-described modified examples, using the printer 1A as a target printer, and performs the introduction processing according to a second of the above-described modified examples using the printer 1B as the target printer. FIG. 25 to FIG. 28 show the flow of the white ink when, in the introduction processing according to the first of the above-described modified examples, the main tank 17W of the printer 1A is the target main tank. FIG. 29 to FIG. 31 show the flow of the white ink when, in the introduction processing according to the second of the above-described modified examples, the main tank 17W of the printer 1B is the target main tank. Hereinafter, it is assumed that the introduction processing according to the second of the above-described modified examples is performed after the introduction processing according to the first of the above-described modified examples.

FIG. 25 to FIG. 31 show a configuration in which, in order to simplify the description, the configuration of the tubes 8 is simplified, the server tank 6W and the main tank 17W of the printer 1A are connected to each other by the tubes 82 and 84, respectively, and the server tank 6W and the main tank 17W of the printer 1B are connected to each other by the tubes 83 and 85, respectively. The amount of the white ink filling the whole of the inside of the tube 82 is 0.5 liters. The amount of the white ink filling the whole of the inside of the tube 84 is 0.5 liters. The amount of the white ink filling the whole of the inside of the tube 83 is 1 liter. The amount of the white ink filling the whole of the inside of the tube 85 is 1 liter.

Figure 25:
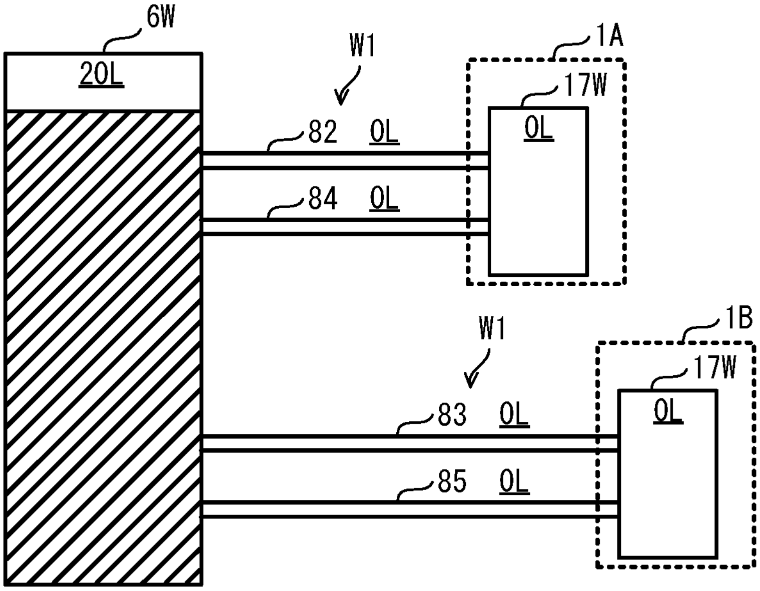
FIG. 25 is a view showing a relationship between the server remaining amount of the server tank and the main remaining amount of the main tanks of the printers at the start of the introduction processing, when a target main tank is the main tank of the printer.

As shown in FIG. 25, the server remaining amount of the server tank 6W at the start of the introduction processing, when the main tank 17W of the printer 1A is the target main tank, is 20 liters, for example. At the start of the introduction processing, the respective main tanks 17W of the printer 1A and the printer 1B are in the initial state. Thus, in the introduction processing according to the first of the above-described modified examples, the first pre-supply remaining amount stored by the processing at step S20 is zero liters (the main remaining amount of the main tank 17W of the printer 1A). The amounts of white ink inside the tubes 82, 83, 84, and 85 are, respectively, zero liters.

Figure 26:
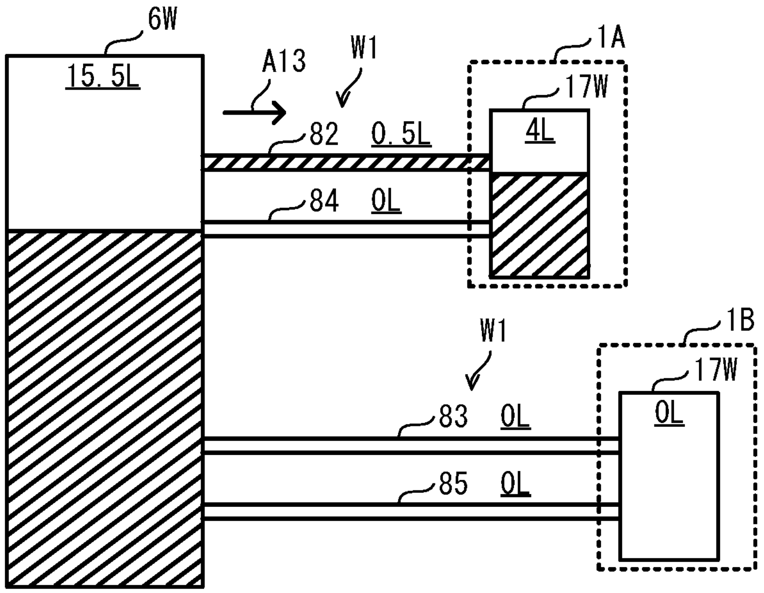
FIG. 26 is a view showing a relationship between the server remaining amount of the server tank and the main remaining amount of the main tanks of the printers at the end of the first supply processing, when a target main tank is the main tank of the printer.

As shown in FIG. 26, the first prescribed supply amount is 4 liters, for example. In this case, the main remaining amount of the main tank 17W of the printer 1A is increased by the first prescribed supply amount of 4 liters, from zero liters, by the first supply processing (step S2), and becomes 4 liters. 0.5 liters of the white ink fills the inside of the tube 82. Thus, the server remaining amount of the server tank 6W decreases, from 20 liters, by 4 liters of the first prescribed supply amount, and by 0.5 liters in order to fill the tube 82, and becomes 15.5 liters.

Figure 27:
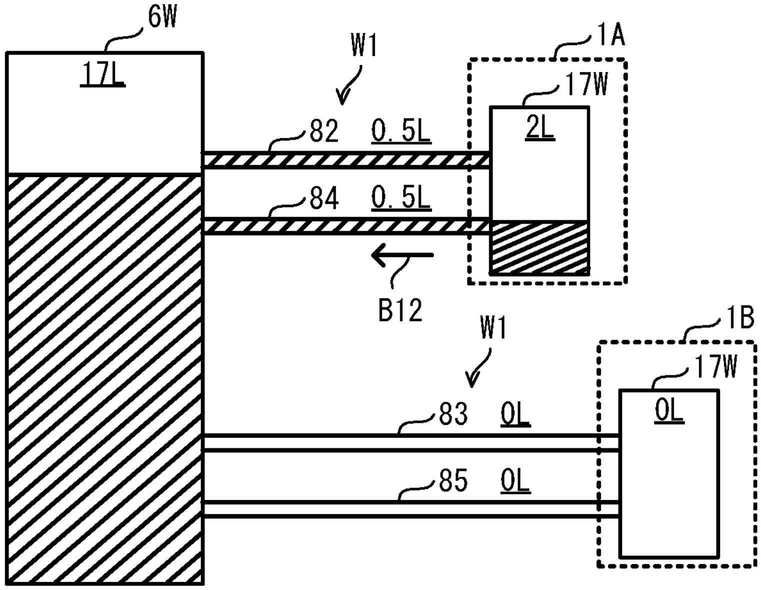
FIG. 27 is a view showing a relationship between the server remaining amount of the server tank and the main remaining amount of the main tanks of the printers at the end of the return processing, when a target main tank is the main tank of the printer.

As shown in FIG. 27, the prescribed circulation amount is 2 liters, for example. In this case, the main remaining amount of the main tank 17W of the printer 1A is decreased by the prescribed circulation amount of 2 liters, from 4 liters, by the return processing (step S3), and becomes 2 liters. 0.5 liters of the white ink fills the inside of the tube 84. Thus, the server remaining amount of the server tank 6W increases from 15.5 liters by 1.5 liters, which is the amount obtained after the 0.5 liters for filling the tube 84 has been subtracted from the prescribed circulation amount of 2 liters, and becomes 17 liters.

Figure 28:
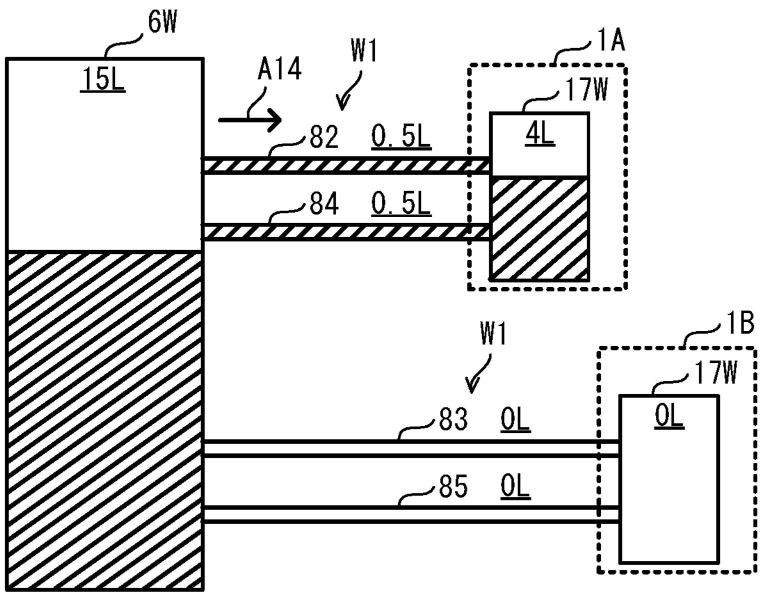
FIG. 28 is a view showing a relationship between the server remaining amount of the server tank and the main remaining amount of the main tanks of the printers at the end of the second supply processing, when a target main tank is the main tank of the printer.

As shown in FIG. 28, the second prescribed supply amount is 2 liters, for example. In this case, the main remaining amount of the main tank 17W of the printer 1A is increased by the second prescribed supply amount of 2 liters, from 2 liters, by the second supply processing (step S4), and becomes 4 liters. The white ink already fills the inside of the tube 82, and thus, the server remaining amount of the server tank 6W decreases, from 17 liters, by the 2 liter increase, and becomes 15 liters. In this way, the introduction processing according to the first of the above-described modified examples ends.

The introduction processing according to the second of the above-described modified examples is performed. In the introduction processing according to the second of the above-described modified examples, the first pre-supply remaining amount stored by the processing at step S20 is zero liters (the main remaining amount of the main tank 17W of the printer 1B).

As shown in FIG. 29, the main remaining amount of the main tank 17W of the printer 1B is increased by the first prescribed supply amount of 4 liters, from zero liters, by the first supply processing (step S2), and becomes 4 liters. 1 liter of the white ink fills the inside of the tube 83. Thus, the server remaining amount of the server tank 6W decreases, from 15 liters, by 4 liters of the first prescribed supply amount, and by 1 liter in order to fill the tube 83, and becomes 10 liters.

As shown in FIG. 30, the main remaining amount of the main tank 17W of the printer 1B is decreased by the prescribed circulation amount of 2 liters, from 4 liters, by the return processing (step S3), and becomes 2 liters. 1 liter of the white ink fills the inside of the tube 85. Thus, the server remaining amount of the server tank 6W increases from 10 liters by 1 liter, which is the amount obtained after the 1 liter for filling the tube 85 has been subtracted from the prescribed circulation amount of 2 liters, and becomes 11 liters.

As shown in FIG. 31, the main remaining amount of the main tank 17W of the printer 1B is increased by the second prescribed supply amount of 2 liters, from 2 liters, by the second supply processing (step S4), and becomes 4 liters. The white ink already fills the inside of the tube 83, and thus, the server remaining amount of the server tank 6W decreases, from 11 liters, by the 2 liter increase, and becomes 9 liters.

As described above, the CPU 51 performs the first supply processing, the return processing, and the second supply processing on the basis of the main remaining amount of the target main tank indicated by the signal from the main sensor 185 of the target main tank. According to this, for example, both the main remaining amount of the main tank 17W of the printer 1A when the introduction processing ends, when the target main tank is the main tank 17W of the printer 1A, and the main remaining amount of the main tank 17W of the printer 1B when the introduction processing ends, when the target main tank is the main tank 17W of the printer 1B, are the same, namely are 4 liters. In other words, by performing the introduction processing, the liquid supply system 100 can suppress a difference from being generated in the main remaining amount of the main tanks 17W, between the plurality of printers 1. Thus, the liquid supply system 100 can suppress limitations on the arrangement positions of each of the printers 1A, 1B, 1C, and 1D with respect to the server tank 6W. The liquid supply system 100 can suppress limitations on the length, the thickness, the material, or the path of the tube 8 corresponding to each of the printers 1A, 1B, 1C and 1D.

In the supply processing of the above-described embodiment, in the processing at step S75, the CPU 51 performs the determination on the basis of the server remaining amount indicated by the signal from the server sensor 71 of the target tank. In contrast to this, in the supply processing of a modified example, in the processing at step S75, the CPU 51 may perform the determination on the basis of the main remaining amount indicated by the main sensor 185 of the target main tank.

Furthermore, in the supply processing of a modified example, in the processing at step S75, the CPU 51 may determine whether or not the current main remaining amount stored by the processing at step S73 has reached a main prescribed remaining amount. The main prescribed remaining amount is greater than zero liters, and is equal to or less than a maximum capacity of the white ink that can be stored by the main tank 17W, for example. The main prescribed remaining amount is stored in advance in the flash memory 54, for example.

When the current main remaining amount is less than the main prescribed remaining amount (no at step S75), the CPU 51 may return the processing to the processing at step S73. When the current main remaining amount has reached the main prescribed remaining amount (yes at step S75), the CPU 51 may perform the processing from step S76 onward.

In the processing at step S83, the CPU 51 may determine whether or not the main change amount is within a predetermined range, using the server change amount as a reference. In the processing at step S83, the CPU 51 may determine whether or not the server change amount is within a predetermined range, using the main change amount as a reference. The predetermined range is stored in advance in the flash memory 54, for example. The server change amount or the main change amount may be a median value of the predetermined range, or need not necessarily be the median value.

In the processing at each of step S2, step S3, step S4, and step S7, the CPU 51 may decide the first prescribed supply amount, the prescribed circulation amount, the second prescribed supply amount, and the prescribed supply amount on the basis of the main remaining amount of the target main tank or the server remaining amount of the target tank, for example. When, in the processing at step S3, the prescribed circulation amount is decided on the basis of the main remaining amount of the target main tank or the server remaining amount of the target tank, in the processing at step S4, the CPU 51 may decide the second prescribed supply amount on the basis of the decided prescribed circulation amount. In this case, the CPU 51 may decide the same amount as the prescribed circulation amount as the second prescribed supply amount, for example, may decide an amount increased or decreased by a predetermined ratio with respect to the prescribed circulation amount as the second prescribed supply amount, or may decide an amount increased or decreased by a predetermined amount with respect to the prescribed circulation amount as the second prescribed supply amount.

The CPU 51 may start the processing at step S3 after the start of the processing at step S2 and before the end of the processing at step S2. The CPU 51 may start the processing at step S4 after the start of the processing at step S3 and before the end of the processing at step S3. In other words, the CPU 51 may perform one of the inter supply device-printer supply operation and the inter supply device-printer return operation while the other of the inter supply device-printer supply operation and the inter supply device-printer return operation is being performed.

The CPU 51 may perform the processing at step S2, step S3, step S4, and step S7 in parallel for the plurality of target main tanks, taking the respective main tanks 17 of the plurality of printers 1 as the target main tanks. For example, the CPU 51 may perform one of the processing at step S7 for a first one of the target main tanks and the processing at step S7 for a second one of the target main tanks, while the other is being performed.

In the processing at step S20, the CPU 51 may identify the first pre-supply remaining amount in the following manner. For example, the user operates the operation portion 57 when the tank replacement is complete, and inputs, to the liquid supply device 2, a completion command indicating that the tank replacement is complete. When the CPU 51 receives the completion command, on the basis of the signal from the server sensor 71, the CPU 51 stores the server remaining amount as a replacement reference remaining amount. The CPU 51 identifies the change amount of the server remaining amount from completing the tank replacement up to performing the processing at step S20, on the basis of the signal from the server sensor 71, an integrated number of a number of rotations of the pump motors 201 and 211, or the like. In the processing at step S20, the CPU 51 identifies the first pre-supply remaining amount by subtracting the identified change amount from the replacement reference remaining amount. In the processing at step S30, step S40, or step S61 also, the CPU 51 may identify each of the post-supply remaining amount, the second pre-supply remaining amount, or the server reference remaining amount on the basis of the replacement reference remaining amount.

The CPU 41 may perform the main processing. The CPU 51 may perform a part of the main processing, and the CPU 41 may perform another part of the main processing. For example, in the main processing, the CPU 41 may perform the processing at step S11 and step S13, and the CPU 51 may perform the other processing. In this case, for example, when the introduction conditions are established at step S11, the CPU 41 transmits the introduction command to the liquid supply device 2. When the CPU 51 receives the introduction command, the CPU 51 performs the introduction processing. In this case, for example, when the supply conditions are established at step S13, the CPU 41 transmits the supply command to the liquid supply device 2. When the CPU 51 receives the supply command, the CPU 51 performs the normal supply processing. A CPU of an external device may perform the main processing. The external device is a device other than the printer 1 and the liquid supply device 2, and is a personal computer (PC), a smartphone, or the like.

In place of the CPU 41 or 51, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42 or 52, the flash memory 44 or 54, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or 52 or the flash memory 44 or 54. In this case, the control program may be stored in a non-transitory storage medium, such as an HDD provided in the server.

What is claimed is:

1. A liquid supply system supplying a liquid to a printer, the liquid supply system comprising:

one or a plurality of tubes configuring a supply flow path of the liquid to the printer, the one or plurality of tubes being connected to a tank configured to store the liquid, the tank being provided further upstream than the printer in the supply flow path, and the liquid flowing through the one or plurality of tubes between the tank and the printer;

a liquid delivery mechanism including one or both of a pump and a valve provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes, the pump being in the liquid delivery state as a result of being driven and being in the stopped state as a result of being stopped, the valve being in the liquid delivery state as a result of being open state and being in the stopped state as a result of being closed state;

a processor; and a memory storing computer-readable instructions that, when executed by the processor, cause the processor to perform processes comprising:

determination processing of determining whether a change amount of a remaining amount indicated by a signal from a sensor has reached a prescribed change amount, the sensor being configured to detect the remaining amount of the liquid inside the tank or inside the printer, and liquid delivery processing of controlling the liquid delivery mechanism to be in the liquid delivery state and the stopped state based on the remaining amount indicated by the signal from the sensor, the liquid delivery processing including switching the liquid delivery mechanism from the liquid delivery state to the stopped state when it is determined by the determination processing that the change amount of the remaining amount has reached the prescribed change amount.

2. The liquid supply system according to claim 1, wherein the computer-readable instructions stored in the memory further cause the processor to perform a process comprising:

in the determination processing, determining whether the change amount of the remaining amount indicated by the signal from the sensor has reached the prescribed change amount, the sensor being configured to detect the remaining amount of the liquid inside the tank.

3. The liquid supply system according to claim 1, wherein the computer-readable instructions stored in the memory further cause the processor to perform a process comprising:

error processing of performing error notification when a change amount of a main remaining amount indicated by a first signal from a first sensor and a change amount of a server remaining amount indicated by a second signal from a second sensor are different from each other in the liquid delivery processing, the first sensor being the sensor configured to detect the main remaining amount that is the remaining amount of the liquid inside the printer, the second sensor being the sensor configured to detect the server remaining amount that is the remaining amount of the liquid inside the tank.

4. The liquid supply system according to claim 1, wherein the one or plurality of tubes includes a supply tube configured to supply the liquid from the tank toward the printer, and a circulation tube configured to return the liquid from the printer toward the tank, the liquid delivery mechanism includes a supply mechanism being the liquid delivery mechanism including one or both of the pump and the valve provided in the supply tube, and configured to switch between a supply state that is the liquid delivery state of supplying the liquid from the tank toward the printer via the supply tube, and a supply stopped state that is the stopped state of stopping the liquid from being supplied from the tank toward the printer via the supply tube, and a circulation mechanism being the liquid delivery mechanism including one or both of the pump and the valve provided in the circulation tube, and configured to switch between a circulation state that is the liquid delivery state of returning the liquid from the printer toward the tank via the circulation tube, and a circulation stopped state that is the stopped state of stopping the liquid from being returned from the printer toward the tank via the circulation tube, and in the liquid delivery processing, the computer-readable instructions stored in the memory further cause the processor to perform processes comprising:

first supply processing of supplying the liquid from the tank toward the printer via the supply tube, by controlling the supply mechanism to be in the supply state based on the remaining amount indicated by the signal from the sensor, return processing of, after a start of the first supply processing, returning the liquid from the printer toward the tank via the circulation tube, by controlling the circulation mechanism to be in the circulation state based on the remaining amount indicated by the signal from the sensor, and second supply processing of, after a start of the return processing, supplying the liquid from the tank toward the printer via the supply tube, by controlling the supply mechanism to be in the supply state based on the remaining amount indicated by the signal from the sensor.

5. The liquid supply system according to claim 4, wherein the computer-readable instructions stored in the memory further cause the processor to perform a process comprising:

in the second supply processing, supplying, from the tank toward the printer via the supply tube, the liquid of an amount corresponding to a change amount of the remaining amount of the liquid inside the tank in the return processing, based on the remaining amount indicated by the signal from the sensor, the sensor being configured to detect the remaining amount of the liquid inside the tank.

6. The liquid supply system according to claim 1, wherein the sensor is a weight sensor.

7. A control method by a liquid supply system supplying a liquid to a printer, the liquid supply system including one or a plurality of tubes configuring a supply flow path of the liquid to the printer, the one or plurality of tubes being connected to a tank configured to store the liquid, the tank being provided further upstream than the printer in the supply flow path, the liquid flowing through the one or plurality of tubes between the tank and the printer, and a liquid delivery mechanism including one or both of a pump and a valve provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes, the pump being in the liquid delivery state as a result of being driven and being in the stopped state as a result of being stopped, the valve being in the liquid delivery state as a result of being open state and being in the stopped state as a result of being closed state, the control method comprising:

determination processing of determining whether a change amount of a remaining amount indicated by a signal from a sensor has reached a prescribed change amount, the sensor being configured to detect the remaining amount of the liquid inside the tank or inside the printer, and liquid delivery processing of controlling the liquid delivery mechanism to be in the liquid delivery state and the stopped state based on the remaining amount indicated by the signal from the sensor, the liquid delivery processing including switching the liquid delivery mechanism from the liquid delivery state to the stopped state when it is determined by the determination processing that the change amount of the remaining amount has reached the prescribed change amount.

8. A non-transitory computer-readable medium storing computer-readable instructions executed by a computer of a liquid supply system supplying a liquid to a printer, the liquid supply system including one or a plurality of tubes configuring a supply flow path of the liquid to the printer, the one or plurality of tubes being connected to a tank configured to store the liquid, the tank being provided further upstream than the printer in the supply flow path, the liquid flowing through the one or plurality of tubes between the tank and the printer, and a liquid delivery mechanism including one or both of a pump and a valve provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes, the pump being in the liquid delivery state as a result of being driven and being in the stopped state as a result of being stopped, the valve being in the liquid delivery state as a result of being open state and being in the stopped state as a result of being closed state, the instructions, when executed by the computer, causing the computer to perform processes comprising:

determination processing of determining whether a change amount of a remaining amount indicated by a signal from a sensor has reached a prescribed change amount, the sensor being configured to detect the remaining amount of the liquid inside the tank or inside the printer, and liquid delivery processing of controlling the liquid delivery mechanism to be in the liquid delivery state and the stopped state based on the remaining amount indicated by the signal from the sensor, the liquid delivery processing including switching the liquid delivery mechanism from the liquid delivery state to the stopped state when it is determined by the determination processing that the change amount of the remaining amount has reached the prescribed change amount.

9. A liquid supply device supplying a liquid to a printer, the liquid supply device comprising:

one or a plurality of tubes configuring a supply flow path of the liquid to the printer, the one or plurality of tubes being connected to a tank configured to store the liquid, the tank being provided further upstream than the printer in the supply flow path, and the liquid flowing through the one or plurality of tubes between the tank and the printer;

a liquid delivery mechanism including one or both of a pump and a valve provided in the one or plurality of tubes and configured to switch between a liquid delivery state of the liquid flowing between the tank and the printer via the one or plurality of tubes, and a stopped state of stopping the liquid from flowing between the tank and the printer via the one of plurality of tubes, the pump being in the liquid delivery state as a result of being driven and being in the stopped state as a result of being stopped, the valve being in the liquid delivery state as a result of being open state and being in the stopped state as a result of being closed state;

a processor; and a memory storing computer-readable instructions that, when executed by the processor, cause the processor to perform processes comprising:

determination processing of determining whether a change amount of a remaining amount indicated by a signal from a sensor has reached a prescribed change amount, the sensor being configured to detect the remaining amount of the liquid inside the tank or inside the printer, and liquid delivery processing of controlling the liquid delivery mechanism to be in the liquid delivery state and the stopped state based on the remaining amount indicated by the signal from the sensor, the liquid delivery processing including switching the liquid delivery mechanism from the liquid delivery state to the stopped state when it is determined by the determination processing that the change amount of the remaining amount has reached the prescribed change amount.

* * * * *